US009888507B2

(12) United States Patent  
Kyles et al.

(10) Patent No.: US 9,888,507 B2  
(45) Date of Patent: Feb. 6, 2018

(54) EXTREMELY HIGH FREQUENCY SYSTEMS AND METHODS OF OPERATING THE SAME

(71) Applicant: Keyssa, Inc.

(72) Inventors: Ian A. Kyles, West Linn, OR (US); Ken Kveton, Mountain View, CA (US); Mike Bourdess, Mountain View, CA (US); John Wolcott, Banks, OR (US); Steve Novak, South Lake Tahoe, CA (US); Roger D. Isaac, San Jose, CA (US); Gary D. McCormack, Tigard, OR (US)

(73) Assignee: KEYSSA, INC., Campbell, CA (US)

( * ) Notice: Subject to any disclaimer, the term of this patent is extended or adjusted under 35 U.S.C. 154(b) by 107 days.

(21) Appl. No.: 14/209,988

(22) Filed: Mar. 13, 2014

(65) Prior Publication Data

US 2014/0273856 A1    Sep. 18, 2014

Related U.S. Application Data

(60) Provisional application No. 61/799,510, filed on Mar. 15, 2013.

(51) Int. Cl.
*H04B 7/00* (2006.01)
*H04W 76/02* (2009.01)
(Continued)

(52) U.S. Cl.
CPC .......... *H04W 76/023* (2013.01); *H04B 1/401* (2013.01); *H04B 5/02* (2013.01);
(Continued)

(58) Field of Classification Search
CPC . H01L 2224/49171; H01L 2224/73265; H01L 23/3128; H04B 1/38; H04W 76/023
(Continued)

(56) References Cited

U.S. PATENT DOCUMENTS 6,015,093 A    1/2000  Barrett et al.
7,986,917 B2   6/2011  Ahlgren et al.
(Continued)

FOREIGN PATENT DOCUMENTS

CN    101087172 A    12/2007
CN    101685631      3/2010
(Continued)

*Primary Examiner* — Xin Jia  
(74) *Attorney, Agent, or Firm* — Van Court & Aldridge LLP

(57) ABSTRACT

Embodiments discussed herein refer to systems, methods, and circuits for establishing EHF contactless communications links. The EHF contactless communication link may serve as an alternative to conventional board-to-board and device-to-device connectors. The link may be a low-latency protocol-transparent communication link capable of supporting a range of data rates. The link may be established through a close proximity coupling between devices, each including at least one EHF communication unit. Each EHF unit involved in establishing an EHF communication link may progress through a series of steps before data can be transferred between the devices. These steps may be controlled by one or more state machines that are being implemented in each EHF communication unit.

34 Claims, 32 Drawing Sheets

(51) Int. Cl.
*H04B 1/401* (2015.01)
*H04B 5/02* (2006.01)
*H01L 23/31* (2006.01)

(52) U.S. Cl.
CPC ............... *H01L 23/3128* (2013.01); *H01L 2224/49171* (2013.01); *H01L 2224/73265* (2013.01); *H01L 2924/181* (2013.01)

(58) Field of Classification Search
USPC ........................................................ 455/41.2
See application file for complete search history.

(56) References Cited

U.S. PATENT DOCUMENTS

| | | | |
|---|---|---|---|
| 2006/0101298 A1* | 5/2006 | Park | G06F 1/3203 713/323 |
| 2009/0009337 A1 | 1/2009 | Rofougaran | |
| 2009/0037628 A1 | 2/2009 | Rofougaran | |
| 2010/0314445 A1 | 12/2010 | Kargl et al. | |
| 2011/0026643 A1* | 2/2011 | Ruelke | H03G 3/3068 375/319 |
| 2012/0120989 A1 | 5/2012 | Toriyama et al. | |
| 2012/0263244 A1 | 10/2012 | Kyles et al. | |
| 2012/0307932 A1 | 12/2012 | McCormack et al. | |
| 2013/0070616 A1* | 3/2013 | Lee | H04W 56/001 370/250 |
| 2014/0248801 A1* | 9/2014 | Riezebos | H04B 5/0031 439/607.01 |

FOREIGN PATENT DOCUMENTS

| | | |
|---|---|---|
| CN | 102467648 | 5/2012 |
| KR | 20110128730 A * | 11/2011 |
| WO | 2011/149253 | 12/2011 |
| WO | WO 2013/053714 * | 10/2012 |

* cited by examiner

| Transition | From | To | Condition |
|---|---|---|---|
| 1 | OFF | Power ON Reset | VDD Applied |
| 2 | Power ON Reset | TRBS_Check | Internal VDD > Threshold |
| 3 | TRBS_Check | Attentive | CP4 = 0 or 1 |
| 4 | Attentive | Beacon/Listen | Rx: Beacon != Received; Tx: NO CP5 pulse within time period while CP6 = 1 or CP6 = 0 |
| 5 | Beacon/Listen | Power ON Reset | Rx: Wake-Up Pulse; Tx: CP5 Pulse AND CP6 = 1 |
| 6 | TRBS_Check | Interface Mode | CP4 = FLOAT |
| 7 | Any State | OFF | VDD_Removed |
| 8 | Interface Mode | Data Transport | CP4 = 0 or 1 |
| 9 | Attentive | Link Training | Rx: Beacon = Received; Tx: CP6 = 1 and CP5 pulses within time period |
| 10 | Link Training | Capabilities Message | Rx: Link = Trained; Tx: CP5 = Rise |
| 11 | Capabilities Message | Hold | Rx: Message = Valid; Tx: CP5 = Rise |
| 12 | Hold | Data Transport | Rx: Wait Third Time Period; Tx: Wait Fourth Time Period |
| 13 | Data Transport | Data Transport Idle | Rx: No EHF signal activity for fifth period of time; Tx: No baseband activity for sixth period of time |
| 14 | Data Transport Idle | Data Transport | Rx: Non-idle signal received; Tx: Baseband activity; |
| 15 | Link Training | Beacon/Listen | Rx: Link Training = Time Out (variable); Tx: CP5 = Time Out (variable) OR CP6 = 0 |
| 16 | Capabilities Message | Beacon/Listen | Rx: Valid Message = Time Out OR CP5 = 0; Tx: CP5 = Time Out OR CP6 = 0 |
| 17 | Data Transport | Beacon/Listen | Tx: CP6 = 0 |
| 18 | Data Transport Idle | Beacon/Listen | Rx: No EHF signal activity for seventh period of time; Tx: CP6 = 0 OR CP5 = 0 for eighth time period |
| 19 | TRBS_Check | Data Transport | µC is wired to CP6 pin and data interface pin |
| 20 | Attentive; Link Training; Capabilities Message; Hold; Data Transport; OR Data Transport Idle | Interface Mode | CP4 = Float |

FIG. 7

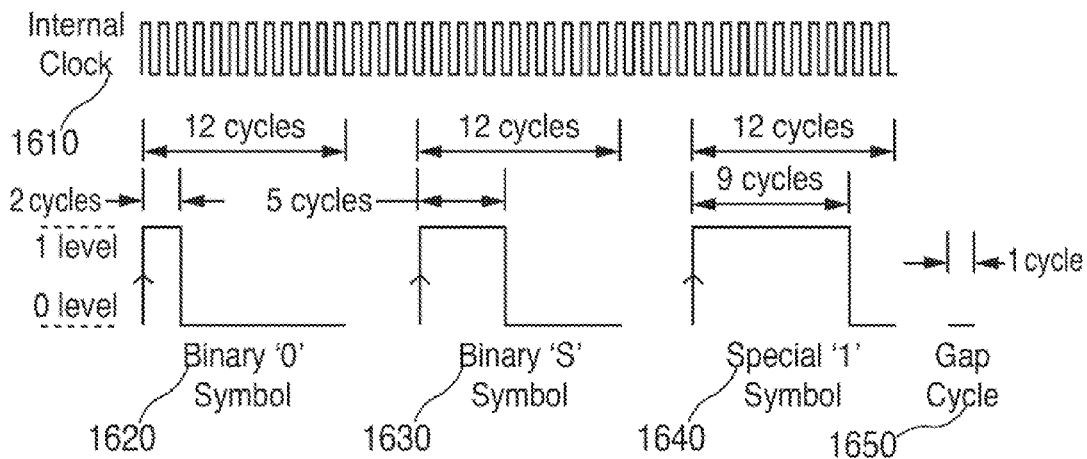
FIG. 16
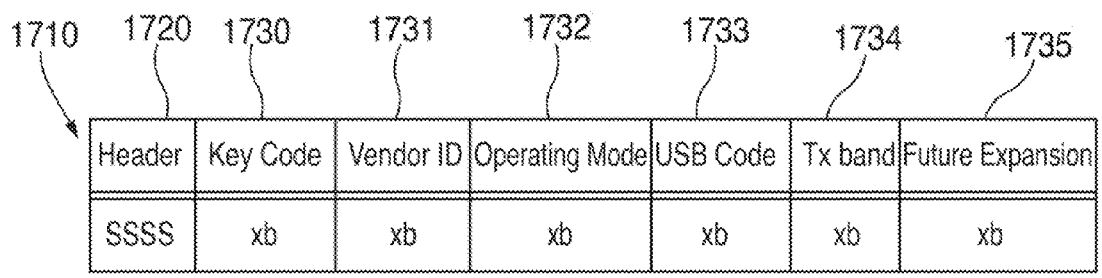
FIG. 17
| ID state | PIN Value @ Attentive | PIN Value @ Cap Mx | CapMsg USB Function |
|---|---|---|---|
| Host Only | 0 | X | 00 |
| Device Only | 1 | X | 01 |
| OTG (Host) | float | 0 or float | 10 |
| OTG (device) | float | 1 | 11 |
FIG. 20

| Received OpMode | Local OpMode | Result |
| --- | --- | --- |
| USB3 | USB3 | Valid |
| USB3 | USB2 | Invalid |
| USB3 | USB 3/2 Auto | Valid |
| USB2 | USB3 | Invalid |
| USB2 | USB2 | Valid |
| USB2 | USB 3/2 Auto | Valid |
| USB 3/2 Auto | USB3 | Valid |
| USB 3/2 Auto | USB2 | Valid |
| USB 3/2 Auto | USB 3/2 Auto | Valid |

FIG. 19

| Received Code | Local Code | Action |
| --- | --- | --- |
| 00 | 00 | Invalid; Fail out of Capabilties Message State |
| 00 | 01 | Valid; Advance to next State |
| 00 | 10 | Valid; Drive Configuration Pin to '1'; Advance to next State |
| 00 | 11 | Valid; Advance to next State |
| 01 | 00 | Valid; Advance to next State |
| 01 | 01 | Invalid; Fail out of Capabilties Message State |
| 01 | 10 | Valid; Drive Configuration Pin to '0'; Advance to next State |
| 01 | 11 | Valid; Drive Configuration Pin to '0'; Advance to next State |
| 10 | 00 | Valid; Advance to next State |
| 10 | 01 | Valid; Advance to next State |
| 10 | 10 | Valid; Drive Configuration Pin to '1'; Advance to next State |
| 10 | 11 | Valid; Advance to next State |
| 11 | 00 | Valid; Advance to next State |
| 11 | 01 | Valid; Advance to next State |
| 11 | 10 | Valid; Drive Configuration Pin to '0'; Advance to next State |
| 11 | 11 | Invalid; Fail out of Capabilties Message State |

FIG. 21

EXTREMELY HIGH FREQUENCY SYSTEMS AND METHODS OF OPERATING THE SAME

RELATED APPLICATION

This patent application claims the benefit of U.S. Provisional Patent Application No. 61/799,510, filed Mar. 15, 2013, which is incorporated by reference in its entirety.

FIELD OF THE INVENTION

The present disclosure relates to extremely high frequency ("EHF") systems and methods for the use thereof.

BACKGROUND

Electronic devices can be "connected" together to enable data transfer between the devices. Typically, the connection between the two devices can be a cabled connection or a wireless connection. A cabled connection such as USB (Universal Serial Bus) is typically point-to-point, and requires mechanical connectors at each device, and a cable between the devices. A wireless connection such as WiFi or Bluetooth can operate in a "broadcast" mode, where one device can communicate simultaneously with several other devices, over a RF (radio frequency) link, typically in the range of 700 MHz-5.8 GHz. Regardless of whether the connection is a cabled connection or a wireless connection, a link needs to be established in order to permit transfer of data to, from, and/or between devices. Another example of a wireless connection includes near-field communication (NFC), which can enable transfer of data from one source to another when both sources are in close proximity of each other.

BRIEF SUMMARY

Embodiments discussed herein refer to systems, methods, and circuits for establishing EHF contactless communications links. The EHF contactless communication link may serve as an alternative to conventional board-to-board and device-to-device connectors. The link may be a low-latency protocol-transparent communication link capable of supporting a range of data rates. The link may be established through a close proximity coupling between devices, each including at least one EHF communication unit. Each EHF unit involved in establishing an EHF communication link may progress through a series of steps before data can be transferred between the devices. These steps may be controlled by one or more state machines that are being implemented in each EHF communication unit. The state machine(s) may be referred to herein as progression of consciousness (POC) state machine(s). Each EHF communication unit may implement its own POC state machine in order to establish a link with a counterpart unit. For example, if one EHF communication unit is functioning as a transmitter unit, its counterpart unit may be a receiver unit.

Each POC state machine may collaborate to progressively transition its respective communication units through a plurality of states before establishing one or more contactless communications links. The collaboration may be necessary because the mechanism and process of establishing the contactless communications links, and enabling data transfer from a host system directly onto the contactless communications link, is performed without the intermediary (for example) of mechanical (electrical, not RF) connectors and a cable. As such, because there is no electrical connection (except perhaps for delivering power) between EHF communication units, the POC state machines may rely on a "wake up" loop (sometimes referred to herein as a closed link loop) to communicate with each other before the contactless communications link is established.

The wake up loop can be an inter-unit communications channel that includes a combination of wired and contactless paths. The wake up loop can also include as many contactless units as necessary to provide the communications channel needed to establish one or more communications links. The wake up loop may define upstream and downstream relationships among the contactless communication units. The direction of the wake up loop may be based on the transmitter/receiver designations for each of the communication units. The collaborative nature of the POC state machine may be realized in that a state change transition of a first POC state machine may propagate around the wake up loop to cause a new state change in each downstream POC state machine. Each state change transition may prompt any given communications unit to notify its immediately downstream unit of its state change, thereby prompting the POC state machine of that downstream unit to transition to a new state. Thus, in order for the first POC state machine to transition to a new state, it may have to wait for state changes to propagate all the way around the loop, back to the first POC state machine. Thus, the first POC state machine may have to wait for the state machine of the immediate upstream unit to transition to a new state, and receive notification of that transition, before the first POC state machine can transition to a new state. This propagation of new state change transitions may continue to loop around the wake up loop until one or more links are enabled to transmit data between devices.

Each communication unit executes its own POC state machine, which may include several different states. In order for the POC state machine to cause a state change transition from one state to another, one or more conditions may have to be met. Some of these conditions may be provided as notifications from source external to the communication unit or can be generated internally within the communications unit. Externally sourced notifications or signals can be received via the transceiver or pins that make up part of an integrated circuit package of the unit.

In one embodiment, a system can include first and second devices each including one or more contactless communication units. Each communication unit can be operative to execute its own state machine to enable at least one contactless communications link between the first and second devices. The state machines can collaborate to progressively transition their respective communication units through a plurality of states such that when each state machine reaches a data transport state, the at least one contactless communications link is enabled.

In another embodiment, a contactless communications receiver unit for use in establishing a contactless communications link with a first contactless communications transmitter unit and for use in communicating with at least a second contactless communications transmitter unit via at least one wired path is provided. The contactless communication receiver unit can include a plurality of pins, wherein at least one pin is used to communicate with the second transmitter unit via a wired path, a transducer for receiving extremely high frequency (EHF) contactless signals from the first transmitter unit, and circuitry. The circuitry can be operative to execute a state machine that manages a progression of consciousness of the receiver unit as it attempts to establish the contactless communications link, wherein the state machine transitions through a plurality of states in response to notifications received by the transducer; and drive a signal on the at least one pin used to communicate with the second transmitter unit in response to each state transition.

In yet another embodiment, a contactless communications transmitter unit for use in establishing a contactless communications link with a first contactless communications receiver unit and for use in communicating with a second contactless communications transmitter unit via at least one wired path is provided. The contactless communication transmitter unit can include a plurality of pins, wherein at least one pin is used to communicate with the second transmitter unit via a wired path, a transducer for transmitting extremely high frequency (EHF) contactless signals to the first receiver unit, and circuitry. The circuitry can be operative to execute a state machine that manages a progression of consciousness of the transmitter unit as it attempts to establish the contactless communications link, wherein the state machine transitions through a plurality of states in response to notifications received by the at least one pin, and transmit EHF signals, using the transducer, in response to each state transition.

The operation of one or more states of the POC state machine may vary depending on whether the POC state machine is being implemented in an EHF unit configured to operate as a receiver or a transmitter. For example, one state may be a beacon/listen state, which may enable a unit to operate in a relatively low power mode prior to advancing through additional states to establish the communication link. A transmitter unit may be configured to transmit an EHF beaconing signal when in this state, whereas a receiver unit may be configured to listen for the EHF beaconing signal. As a specific example, an apparatus can include an EHF transceiver and control circuitry coupled to the EHF transceiver. The control circuitry may be operative to control establishment of an EHF communications link with another apparatus by executing a state machine that transitions from state to state in response to satisfaction of any one of a plurality of conditions, and selectively execute one of a beaconing cycle and a listening cycle based on a configuration of the apparatus, wherein the beaconing cycle is executed if the configuration is a transmitter configuration, and wherein the listening cycle is executed if the configuration is a receiver configuration. The control circuitry may execute the selected one of the beaconing cycle and the listening cycle until the state machine transitions to a new state.

A link training state may be another state that varies depending on whether it is being implemented in a transmitter or receiver unit. Link training may enable a receiver unit to calibrate itself based on a "link training" signals transmitted by a transmitter unit. The transmitter unit may transmit the link training signals when in the link training state. The receiver unit may receive and process the link training signals and calibrate itself for receiving future EHF signals from the transmitter unit when in the link training state. As a specific example, an apparatus can include an EHF transceiver and control circuitry. The control circuitry can control establishment of an EHF communications link with another apparatus by executing a state machine that transitions from state to state in response to satisfaction of any one of a plurality of conditions, selectively execute one of a transmission of a link training pattern and a calibration of at least one parameter, wherein the transmission of the link training pattern is executed if the configuration is a transmitter configuration, and wherein the calibration of at least one parameter is executed if the configuration is a receiver configuration, and execute the selected one of the transmission and the calibration until the state machine transitions to a new state.

A capabilities messaging state may be another state that varies depending on whether it is being implemented in a transmitter or receiver unit. The capabilities message may be transmitted by a transmitter unit and received by a receiver unit. The capabilities message may include information, for example, that enables the transmitter and receiver units to validate whether they can establish a link and a protocol according to which data can be communicated. As a specific example, an apparatus can include an EHF transceiver and control circuitry. The control circuitry may control establishment of an EHF communications link with another apparatus by executing a state machine that transitions from state to state in response to satisfaction of any one of a plurality of conditions, selectively execute one of a transmission of a capabilities message and a validation of a received capabilities message, wherein the transmission of the capabilities message is executed if the configuration is a transmitter configuration, and wherein the validation of the received capabilities message is executed if the configuration is a receiver configuration, and execute the selected one of the transmission and the validation until the state machine transitions to a new state.

A power savings mode state or data transport idle state may be another state that varies depending on whether it is being implemented in a transmitter or receiver unit. The power savings state may enable an EHF communication unit to power down selective circuitry, after the EHF communication link has been established, when there is no data to be communicated over the link. The transmitter unit may transmit a "keep alive" signal to the receiver unit to prevent it from timing out and exiting out of its power savings mode. The receiver unit may be periodically turned on to monitor whether the transmitter is sending the "keep alive" signal. The transmitter and receiver units may transition to a new state (e.g., a data transport state) when they receive instructions to do so. As a specific example, an apparatus can include an EHF transceiver and control circuitry. The control circuitry may be operative to control establishment of an EHF communications link with another apparatus by executing a state machine that transitions from state to state in response to satisfaction of any one of a plurality of conditions, establish the EHF communication link with the apparatus to selectively enable one of transmission and reception of data, after the EHF communication link with the apparatus is established, monitor an absence of data being communicated over the EHF communication link, and enter into a power savings state in response to the monitored absence of data being communicated over the EHF communication link until the state machine transitions to a new state.

The communication system presented herein is unique in that the communication units have the flexibility to provide broadband communication characteristics but at the same time consume much less power with a lot less complexity and cost than existing solutions. Maximizing bandwidth usage around a common carrier frequency requires the use of multiple communication units, each of them operating as either a transmitter or a receiver at a certain period of time. Each of the units can operate in either fill duplex mode or half duplex mode with the same carrier. The use of the same carrier (or substantially similar carrier frequency) for different communication units in the same system requires spatial separation of the communication units. In order for the communication units in the system to communicate efficiently and effectively with a partner system they must be able to synchronize their operations (and/or states). The communication units in the same system may communicate control information regarding the status or state using electrical signaling, while these same units may communicate with partner communication units (in a different system) through EHF signaling. Based on the requirements of a particular system, a specific communication unit may be powered up, based on a request from the host system, and this communication unit may be responsible for initiating the bring up of the communication unit(s) in the same system and/or in the partner system. The communication units may need to pass through multiple states, where the state transitions may partly depend on the state of one or more of the other communication units. This requires synchronization of the states in all communication units. In order to achieve this, the control information may pass through the communication units in a closed loop. In addition, data from a host system that is communicated through the communication units must be communicated transparently with little or no intervention from the host system. Control information communicated between the EHF communication units over an EHF link may use similar signaling characteristics as data information that is communicated between two host systems over the EHF link. For example, the control information may be sent over a 60 GHz carrier with a modulation scheme that may be similar to the modulation scheme when data information between two host systems over the EHF link.

There are several key advantages to the communication system presented herein. By physically separating communication units in the same system and optimizing the connection distance for contactless communication, the communication units can operate over the same EHF frequency with minimal interference through spatial separation. The communication units may be simpler in design because many of the constraints from a typical wireless system (for example, using multiple bands of frequencies for communication) have been relaxed or altogether removed. For example, due to the close communication distance and minimal interference with neighboring units, the units can be designed to communicate with simple modulation of the EHF signal and no additional error detection or correction circuitry. In addition, an EHF transmit unit may be physically identical (the same silicon mask set) to an EHF receive unit and a single chip may be configured as a transmitter, a receiver, or may alternately be programmed to be either a transmitter or a receiver. By using a very similar design for all the communication units, development and implementation costs may be reduced.

A further understanding of the nature and advantages of the embodiments discussed herein may be realized by reference to the remaining portions of the specification and the drawings.

BRIEF DESCRIPTION OF THE DRAWINGS

FIG. 7 shows a chart of illustrative state change conditions corresponding to transition of the state machine of FIG. 6, according to an embodiment;

FIG. 16 shows three different and illustrative symbols that are serialized according to an internal clock, according to an embodiment;

FIG. 17 shows an illustrative format of a capabilities message according to an embodiment;

FIG. 19 shows an illustrative table showing which USB modes validly work together and which do not, according to an embodiment;

FIG. 20 shows an illustrative lookup table that may be accessed to compute the local code, according to an embodiment.

FIG. 21 shows illustrative actions that may be taken based on comparisons of the received code and the local code, according to an embodiment;

DETAILED DESCRIPTION

Figure 1:
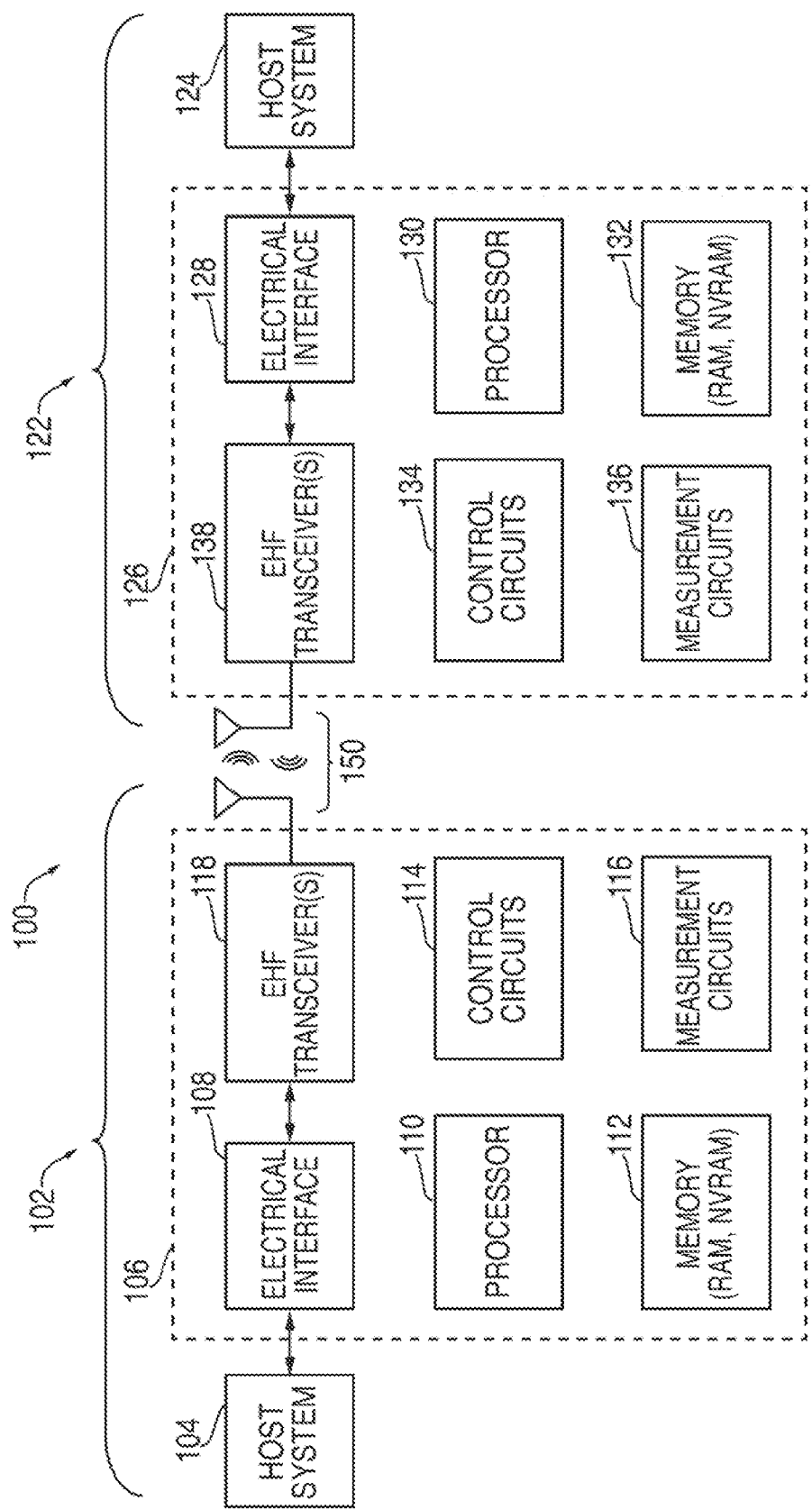
FIG. 1 illustrates a communications system, according to an embodiment.

Illustrative embodiments are now described more fully hereinafter with reference to the accompanying drawings, in which representative examples are shown. Indeed, the disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of wireless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC packages. Examples of such comm-link chips are described in detail in U.S. Patent Application Publication Nos. 2012/0263244; and 2012/0307932, both of which are hereby incorporated in their entireties for all purposes. Comm-link chips are an example of a communication device, also referred to as communication unit, whether or not they provide wireless communication and whether or not they operate in the EHF frequency band.

The acronym "EHF" stands for Extremely High Frequency, and refers to a portion of the electromagnetic (EM) spectrum in the range of 30 GHz to 300 GHz (gigahertz). The term "transceiver" may refer to a device such as an IC (integrated circuit) including a transmitter (Tx) and a receiver (Rx) so that the integrated circuit may be used to both transmit and receive information (data). Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to the implementing electromagnetic (EM) rather than electrical (wired, contact-based) connections and transport of signals between entities (such as devices). As used herein, the term "contactless" may refer to a carrier-assisted, dielectric coupling system which may have an optimal range in the zero to five centimeter range. The connection may be validated by proximity of one device to a second device. Multiple contactless transmitters and receivers may occupy a small space. A contactless link established with electromagnetics (EM) may be point-to point in contrast with a wireless link which typically broadcasts to several points.

The RF energy output by the EHF transceivers described herein may be designed to adhere to various requirements mandated by one or more governments or their agencies. For example, the FCC may promulgate requirements for certification for transmitting data in a RF frequency band.

"Standards" and related terms such as "Standards-based", "Standards-based interfaces", "Standards-based protocol", and the like may refer to wired interface standards which may include but are not limited to USB, DisplayPort (DP), Thunderbolt, HDMI, SATA/SAS, PCIe, Ethernet SGMII, Hypertransport, Quickpath, I2S, GPIO, I2C and their extensions or revisions.

FIG. 1 illustrates a communications system 100 wherein two electronic devices 102 and 122 may communicate with one another over a contactless communications links 150. Data may be transferred in at least one direction, from first device 102 which may be regarded as a "source" for sending the data to be transferred, to second device 122 which may be regarded as a "destination" for receiving the data which is transferred. With reference to FIG. 1, the transfer of data from first device 102 to second device 122 may be described. However, it should be understood that data may alternatively or additionally be transferred from second device 122 (acting as a "source" for sending the data) to first device 102 (acting as a "destination" for receiving the data), and that often information may be exchanged in both directions between devices 102 and 122 during a given communications session.

For illustrative clarity, devices 102 and 122 will be described as "mirror images" of one another, but it should be understood that the two devices 102 and 122 may be different than each other. For example, one of the devices may be a laptop computer, the other device may be a mobile phone. Some examples of electronic devices which may benefit from the techniques disclosed herein may include cell phones (or handsets, or smart phones), computers, docks (docking stations), laptops, tablets, or comparable electronic device, to name but a few.

First electronic device 102 may include a host system 104 and a contactless communication unit (which may be referred to as "smart" contactless connector, a communication subsystem, "smart connector", "contactless connector", or simply "connector") 106. The unit 106 associated with the electronic device may be generally capable of performing at least one of establishing and managing operation of contactless link 150 with unit 126, of second device 122, monitoring and modifying data passing through unit 106 onto link 150, and interfacing with and providing application support for host system 104. These functions of unit 106, with regard to interacting with link 150, the data and host system 104 may be described and elaborated upon and discussed in greater detail hereinbelow (or elsewhere in this disclosure).

Unit 106 associated with first device 102 may include some or all of the following elements: electrical interface 108, processor 110 and associated memory 112, control circuits 114, measurement circuits 116, and one or more transceivers 118. The operation of these various elements (110-118) may be described and elaborated upon and discussed in greater detail hereinbelow (or elsewhere in this disclosure).

Second electronic device 122 may include host system 124 and a contactless communication unit (which may be referred to as "smart" contactless connector, or "communication unit", or "smart connector", or "contactless connector", or simply "connector") 126. Connector 126 associated with the electronic device may be generally capable of establishing and managing operation of contactless link 150 with unit 106, of first device 102, monitoring and modifying data passing though the unit 126 onto link 150, and interfacing with and providing application support for host system 124. These functions of unit 126, with regard to interacting with link 150, the data and the host system 124 may be described and elaborated upon and discussed in greater detail hereinbelow (or elsewhere in this disclosure).

Unit 126 associated with second device 122 may include some or all of the following elements an electrical interface 128, processor 130 and associated memory 132, control circuits 134, measurement circuits 136, and one or more transceivers 138. The operation of these various elements (130-138) may be described and elaborated upon and discussed in greater detail hereinbelow (or elsewhere in this disclosure).

Units 106 and 126 may operate without intervention from the host processors (in the host systems 104 and 124, respectively), and may take control of the host system 104 and 124, respectively, or portions thereof. Units 106 and 126 may open/activate applications, return status/power levels, connection parameters, data types, info on devices/systems that are connected, content info, amount and type of data being transferred, including device configuration based on connection type, link management, quota information, channel control, and the like.

The dashed-line rectangles shown (in the figure) around the units 106 and 126 may simply represent "partitioning" of functions, separating (distinguishing) units 106 and 126 from host system 104 and 124, respectively. The antennae shown (symbolically) outside of the dashed-line rectangles may be considered to be within the functional blocks of units 106 and 126, but may be disposed either internal or external to a communications chip constituting the contactless connector. The dashed-line rectangles shown (in the figure) around units 106 and 126 may also represent non-conducting barriers (housings, enclosures, or the like, not shown), such as of plastic or acrylic enclosing units 106 and 126 or entire devices 102 and 122, respectively, as described hereinabove.

Electrical interfaces 108 and 128 may include communications port(s)/channel(s) to communicate with host systems 104 and 124, respectively. Host systems 104 and 124 may have their own processors and associated circuitry (not shown).

Processors 110 and 130 may be embedded microprocessors, or microcontrollers, or state machines, may run management OS for the connection, and may have built-in authentication/encryption engines. Processors 110 and 130, either alone or in combination with other elements presented herein, may be operative to manage the communications link, to monitor data passing through the units and over the communications link, or to provide application support for the host system, or to execute one or more state machines, or variations thereof as may become evident from the several functional descriptions set forth herein. In a broader sense, units 106 and 126 are capable of performing one of more of (at least one of) the various functions described herein.

Memory 112 and 132 may be RAM (random access memory), NVRAM (non-volatile RAM), or the like, and may include registers containing configuration, status, permissions, content permissions, keys for authentication/encryption, and the like.

Control circuits 114 and 134 may include any suitable circuitry capable of monitoring the state of the link and/or actively appending to or changing data concurrently ("on-the-fly") as it goes through unit 106 or 126, respectively.

Measurement circuits 116 and 136 may include any suitable circuitry capable of observing (monitoring) the connection state/status, the connection type and the data being transmitted. Sensors (not shown) may be included to monitor signal strength, ambient environmental conditions, and the like. Signal-to-noise ratio can be used as an indicator of signal quality.

Transceivers 118 and 138 may include any transceivers (and associated transducers or antennas) suitable for converting between electrical signals (for the host system) and electromagnetic (EM) signals (for the contactless communications link), such as have been described hereinabove. Transceivers 118 and 138 may each be a half-duplex transceiver which can asynchronously convert a baseband signal into a modulated EHF (extremely high frequency) carrier at 30-300 GHz, or higher, such as 60 GHz carrier frequency, which is radiated from an internal or external antenna (shown schematically only), or can receive and demodulate the carrier and reproduce the original baseband signal. The EHF carrier may penetrate a wide variety of commonly-used non-conductive materials (glass, plastic, etc.).

It should be understood that if only one-way communication is required, such as from first device 102 to second device 122, transceiver 118 could be replaced by a transmitter (Tx) and transceiver 138 could be replaced by a receiver (Rx).

Transmit power and receive sensitivity for transceivers 118 and 138 may be controlled to minimize EMI (electromagnetic interference) effects and simplify FCC certification, if required.

Transceivers 118 and 138 may be implemented as IC chips comprising a transmitter (Tx), a receiver (Rx) and related components. Transceiver chip(s) may be packaged in a conventional manner, such as in BGA (ball grid array) format. The antenna may be integrated into the package, or may be external to the package, or may be incorporated onto the chip itself. An exemplary unit 106, 126 may include one, two, or more transceiver chips. Some features or characteristics of the transceivers 118 and 138 may include low latency signal path, multi-gigabit data rates, link detection and link training. The signals transmitted by transceivers 118 and 138 may be modulated in any suitable manner to convey the data being transferred from one device to the other device, some non-limiting examples of which are presented herein. Modulation may be OOK (on/off keying), ASK, PSK, QPSK, QAM or other similar simple modulation techniques. Signals may be encoded and packetized and transmitted by one transceiver (such as 118), and received and unpacketized and decoded by another transceiver (such as 138). Out-of-band (OOB) signaling or other suitable techniques may be used to convey information other than or related to the data being transferred between the two devices.

Transceivers 118 and 138, or individual transmitters and receivers, which may be implemented as chips, may be factory-serialized, so that the chips and their transmissions may be 'tagged' (fingerprinted), which may enable a later forensic analysis to be performed for digital rights management (DRM). For example, protected (premium) content could be freely (unimpeded) transferred from one device to another, but the transaction could be traced to the specific devices involved, so that the participants in the transaction can be held accountable (such as, billed). Premium protected content may be modified, data appended thereto, and can be logged with chip ID, user ID, or by other means.

Communications link 150 may be a "contactless" link, and the first and second units 106 and 126 may be "contactless" connectors, as described herein. Differences between units 106 and 126 disclosed herein and conventional mechanical connectors may be immediately apparent, and may be described herein. The units may be considered to be communication subsystems of a host device. In this regard, differences between the contactless connectors 106 and 126 disclosed herein and controllers such as Ethernet (Standard) controllers may not be immediately apparent in that both may handle data flow between a host system and a communications link. However, a distinction between the contactless connectors disclosed herein and exemplary Standards controllers is that the contactless connectors disclosed herein both set up the contactless communications link and transfer data from a host system directly onto the contactless communications link, without the intermediary (for example) of mechanical (electrical, not RF) connectors and a cable. Further distinctions may be made in the way that the contactless connectors disclosed herein are capable of operating independently and transparently from the host system, without requiring host awareness or interaction.

Data transfer between electronic devices 102 and 122 may be implemented over a "contactless" radio frequency (RF) electromagnetic (EM) communications link (interface) 150, which is handled substantially entirely by the units 106 and 126 of first and second devices 102 and 122, respectively. Signals flowing between the devices 102 and 122 occurs electromagnetically over a non-electrical (dielectric) medium such as an air gap, waveguide, plastics (polyethylene, thermoplastic polymers, polyvinylidene difluoride, fluoropolymers, ABS, and other plastics), including combinations of these materials The EHF signal can pass through other dielectric materials such as cardboard. The EHF signal can pass through a series of different dielectric materials and/or waveguides.

Due to the high data rate enabled by the EHF contactless communication, large data files, such as movies, audio, device images, operating systems, and the like may be transferred in very short periods of time in contrast with existing technologies such as NFC. As an example, a 1 Gigabyte data file may be transferred in as little as 2 seconds. The electromagnetic communication may typically be over an air gap may be limited to a short range, such as 0-5 cm. A dielectric medium such as a dielectric coupler, may be used to extend the range of the contactless link between the devices 102 and 122 to several centimeters (cm), meters, or more.

The communications link may include a dielectric medium that may include one or more of an air gap, a waveguide, and plastics. Alternatively, the communications link may be a slot antenna in a conductive medium, the slot antenna directing the contactless connectivity in a desired direction. A device (at least the contactless connector) may be substantially fully enclosed by a conductive medium other than at a location where it is desired to emit and receive EHF radiation from a partner device (at least the contactless connector thereof) which may also be similarly substantially fully enclosed by a conductive medium.

It should be understood that in this, and any other embodiments of contactless links discussed herein, an overall communications system may be implemented as a combination of contactless and physical links. Furthermore, some of the techniques described herein may be applied to transferring data over a physical link, such as a cable and connectors. Similarly, some of the techniques described herein may be applied to transferring data over a wireless link, such as WiFi or Bluetooth. In the main, hereinafter, the use of a contactless link for transferring data between the two devices will be described.

One or both of devices 102 and 122 may have two (or more) transceivers. Having two (or more) transceivers may support a feedback loop, latency, changes, full duplex operation, and simultaneously establishing a second communications link (such as for communicating with the host system). An exemplary "data flow" may proceed as follows. Data originating from host system 104 (or data originating at unit 106) may be provided by unit 106, via its transceiver 118, onto the communications link 150. The data passes through (or over) communications link 150. Data received from the communications link 150 by the transceiver 138 of unit 126 may be provided to host system 124 (or may remain in with unit 126). Data may flow in the reverse direction, from host system 124 via unit 126 (or originating at unit 126) onto the contactless link 150 to unit 106 which may pass the data to the host system 104.

Figure 2:
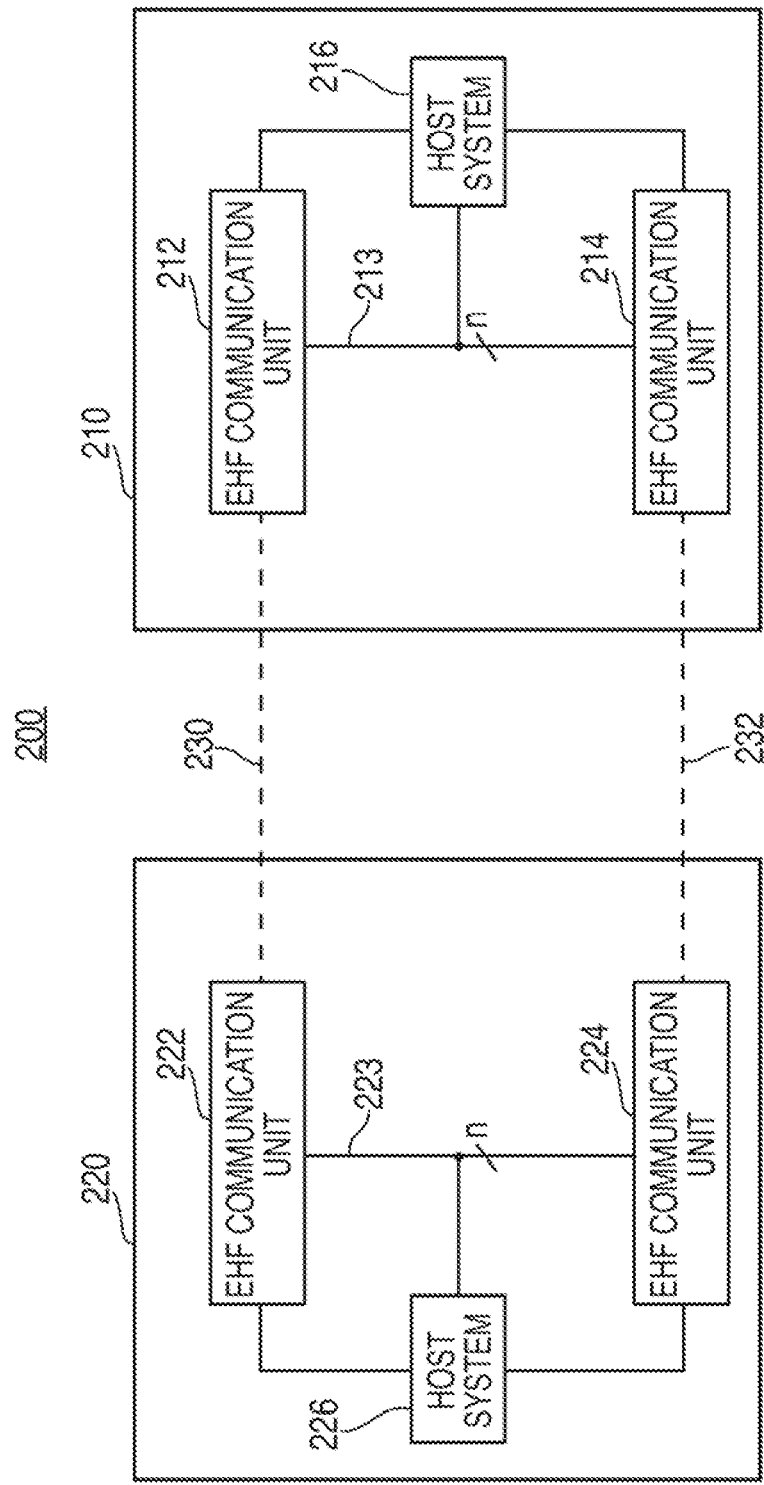
FIG. 2 illustrates a communications system in which two electronic devices communicate with one another over two or more contactless communications links, according to an embodiment.

FIG. 2 illustrates a communications system 200 wherein two electronic devices 210 and 220 may communicate with one another over two or more contactless communications links, according to an embodiment. System 200 may be similar to system 100 in many respects, but for illustrative and simplified discussion purposes, shows that each device includes two EHF communication units. Moreover, any EHF communication unit in system 200 may be the same or substantially the same as any EHF communication unit in system 100. As such, a more simplified representation of units 106 and 126 are shown in FIG. 2. If desired, each device can include three, four, five, or more EHF communication units. First device 210 may include EHF communication unit 212, EHF communication unit 214, and host system 216. One or more wired paths 213 may directly connect EHF communication units 212 and 214 together. Host system 216 may communicate with EHF communication units 212 and 214. In some embodiments, EHF communication units 212 and 214 may communicate with each other through host system 216. In other embodiments, host system 216 may be able to drive a signal on at least one of wired paths 213. Similarly, second device 220 may include EHF communication unit 222, EHF communication unit 224, and host system 226. One or more wired paths 223 may directly connect EHF communication units 222 and 224 together. Host system 226 may communicate with EHF communication units 222 and 224. In some embodiments, EHF communication units 222 and 224 may communicate with each other through host system 226. In other embodiments, host system 226 may be able to drive a signal on at least one of wired paths 223. Host systems 216 and 226 may be similar to host systems 104 and 124, both of which include circuitry specific to their respective devices and thereby enable devices 210 and 220 to operate for their intended functionality.

In some embodiments, each of EHF communication units 212, 214, 222, and 224 can be the same as EHF communication unit 106 or 126, discussed above. As such, EHF communication units 212, 214, 222, and 224 include transceivers capable of being configured to transmit and/or receive EHF signals. For example, in one approach, units 212 and 224 can be configured to receive EHF signals and units 214 and 222 can be configured to transmit EHF signals. Thus, in this approach, a contactless communications link 230 may exist between EHF communication units 212 and 222, and contactless communications link 232 may exist between EHF communication units 214 and 224. As shown, units 212 and 222 may work together as a coupled pair of units that communicate via link 230, and units 214 and 224 may work together as another coupled pair of units that communicate via link 232. If one or more additional coupled pairs of units were to be included in system 200, then additional communications links would also exist.

Embodiments discussed herein refer to systems, methods, and circuits for establishing the contactless communications links among coupled pairs of EHF communication units. In order for devices 210 and 220 to communicate with each other using one or more contactless links, the EHF units responsible for establishing those links may have to progress through a series of steps before data can be transferred between the devices. These steps may be controlled by one or more state machines that are being implemented in each contactless communication unit. Collectively, regardless of whether one or more state machines are used to establish a link, the state machine(s) may be referred to herein as a progression of consciousness (POC) state machine. Each contactless communication unit may implement its own POC state machine in order to establish a link with a counterpart unit.

Each POC state machine may collaborate to progressively transition their respective communication units through a plurality of states before enabling one or more contactless communications links. The collaboration may be necessary because the mechanism and process of establishing the contactless communications links, and enabling data transfer from a host system directly onto the contactless communications link, is performed without the intermediary (for example) of mechanical (electrical, not RF) connectors and a cable. As such, because there is no electrical connection (except perhaps for delivering power) between, for example, units 212 and 222, the POC state machines may rely on a "wake up" loop (sometimes referred to herein as a closed link loop) to communicate with each other before the contactless communications link is established. In some embodiments, the POC state machine may collaborate with the state machine of the host system. For example, an entry into power up or power down state may be directed by the host system.

The wake up loop can be an inter-unit communications channel that includes a combination of wired and contactless paths. The wake up loop can also include as many contactless units as necessary to provide the communications channel needed to establish one or more communications links. In some embodiments, only two units can be used. A wake up loop using only two units may require selective gating of each unit's transceiver so that a loop can exist over a single contactless path. In other embodiments, as that shown in FIG. 2, at least four units can be used to define a wake up loop. As shown, the wake up loop in system 200 can include unit 212, wired path 213, unit 214, contactless path 232, unit 224, wired path 223, unit 222, and contactless path 230. Thus, in this arrangement, although units 212 and 222 may be operative to establish link 230, they may depend on the wake up loop to communicate with each other to establish link 230. For example, assume that unit 222 operates as a transmitter unit and unit 212 operates as a receiver unit. Since unit 222 is a transmitter unit, it may be able to transmit signals directly with unit 212 via link 230. However, because unit 212 is operating as a receiver unit, it is not able to transmit signals to unit 222 via the same link 230. Instead, unit 212 may communicate with unit 222 indirectly using a combination of wired and contactless paths in the wake up loop. In this example, unit 212 may communicate with unit 222 via wired path 213, unit 214, link 232, unit 224, and wired path 223. Thus, in order for a coupled pair to communicate signals back and forth among each other, the coupled pair may leverage the wake up loop (e.g., the wired paths connected to another coupled pair, and the contactless path existing between that other coupled pair).

The wake up loop may define upstream and downstream relationships among the contactless communication units. The direction of the wake up loop may be based on the transmitter/receiver designations for each of the communication units. For example, in system 200, assuming units 214 and 222 are transmitters, and units 212 and 224 are receivers, the wake up loop may progress in a clockwise direction. In a clockwise oriented wake up loop, unit 214 may be immediately downstream from unit 212, and unit 222 may be immediately upstream from unit 212. As another example, assuming units 214 and 222 are receivers, and units 212 and 224 are transmitters, the wake up loop may progress in a counter-clockwise direction.

The collaborative nature of the POC state machine may be realized in that a state change transition of a first POC state machine may propagate around the wake up loop to cause a new state change in each downstream POC state machine. Each state change transition may prompt any given communications unit to notify its immediately downstream unit of its state change, thereby prompting the POC state machine of that downstream unit to transition to a new state. Thus, in order for the first POC state machine to transition to a new state, it may have to wait for state changes to propagate all the way around the loop, back to the first POC state machine. Thus, the first POC state machine may have to wait for the state machine of the immediate upstream unit to transition to a new state, and receive notification of that transition, before the first POC state machine can transition to a new state. This propagation of new state change transitions may continue to loop around the wake up loop until one or more links are enabled to transmit data between devices. In order to begin the wake up loop, a host system may assert one or more signals to one or more EHF communications units. The POC state machines of the targeted EHF communication units may transition to a new state or may begin beaconing or listening as described below in response to the signals from the host system.

As discussed above, each communication unit executes its own POC state machine. That POC state machine may include several different states (discussed below). In order for the POC state machine to cause state change transitions from one state to another, one or more conditions may have to be met. Some of these conditions may be provided as notifications from sources external to the communication unit or can be generated internally within the communications unit. Externally sourced notifications can be received via the transceiver or pins that make up part of an integrated circuit package of the unit. In order to provide a basis for discussing where such notifications can be received and generated, reference is now made to FIGS. 3-5.

Figure 3:
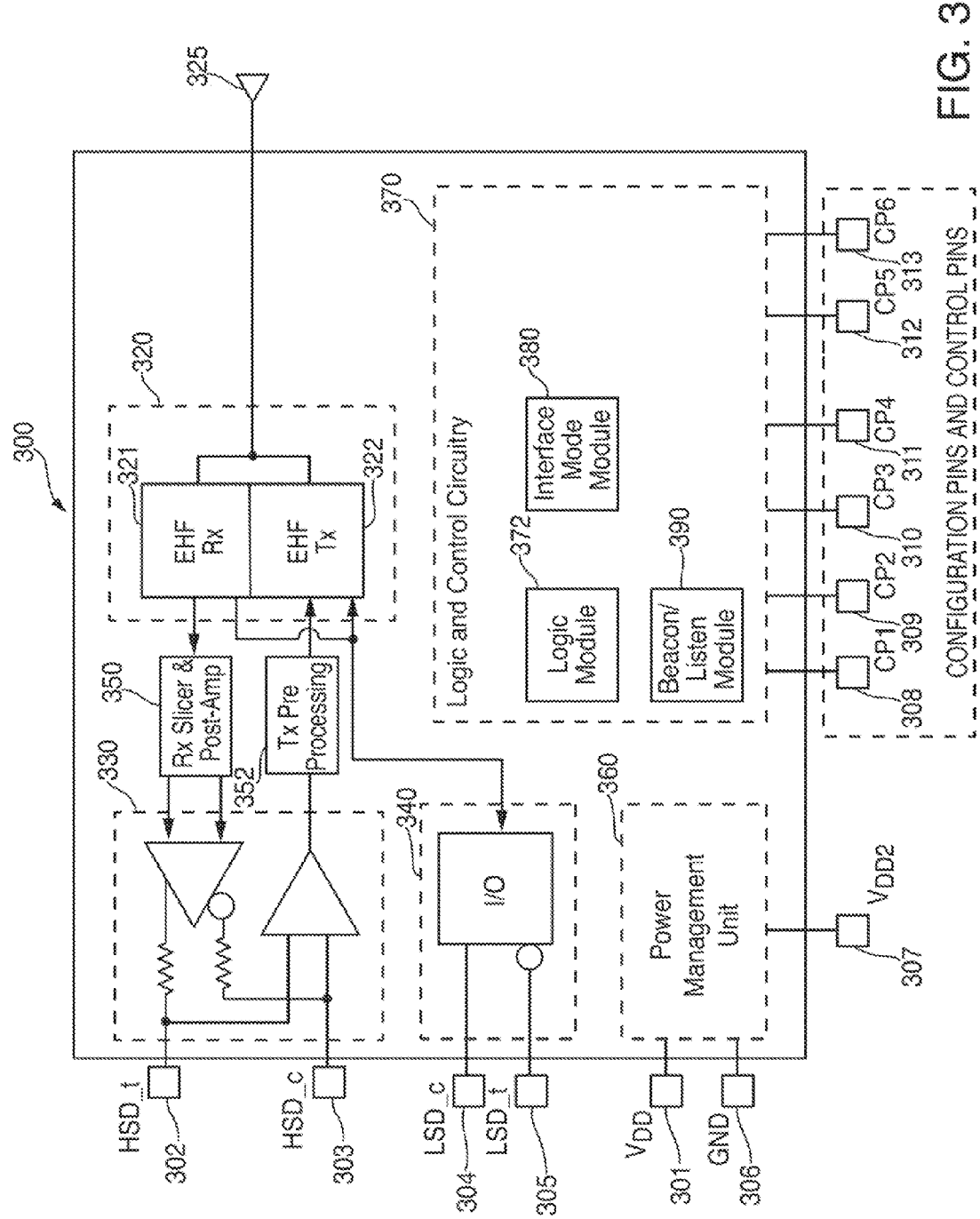
FIG. 3 is an illustrative schematic diagram of an EHF communication unit, according to an embodiment.

FIG. 3 shows an illustrative block diagram of EHF contactless communication unit 300 according to an embodiment. Unit 300 may be, for example, an integrated circuit including several pins. As shown, unit 300 may include pins 301-313, EHF transceiver 320, antenna 325, high-speed circuitry 330, low-speed circuitry 340, receiver slicer and post-amp circuitry 350, transmitter pre-processing circuitry 352, power management circuitry 360, and logic and control circuitry 370. Logic and control circuitry 370 may include several modules, which may represent hardware and/or software components for operating specific functions of unit 300. For example, logic and control circuitry may include logic module 372, interface mode module 380, and beacon/listen module 390. $V_{DD}$ pin 301 may be coupled to an external source for powering unit 300. $V_{DD2}$ pin 307 may be an optional pin as shown, or it may be internally bonded to $V_{DD}$ pin 301. Ground pin 306 may be coupled to a ground source (not shown). High-speed circuitry 330, low-speed circuitry 340, receiver slicer and post-amp circuitry 350, and transceiver pre-processing 352 may be referred to collectively herein as baseband circuitry. Power management circuitry 360, logic and control circuitry 370, logic module 372, interface module 380, and beacon/listen module 390 may be referred to herein as control circuitry.

High-speed differential ("HSD") pins 302 and 303 may function as input and/or output pins for high-speed circuitry 330. High-speed circuitry 330 may be operative to process signals according to various protocols, including, for example, USB, SATA, PCIe, and Display Port. Low-speed differential ("LSD") pins 304 and 305 may function as input and/or output pins for low-speed circuitry 340. Low-speed circuitry 340 may be operative to process signals according to various protocols, including for example USB high-speed/full-speed, Display Port Auxiliary, I2S, GPIO, I2C, and other low speed signaling schemes. In some embodiments, low-speed circuitry 340 may process protocols that operate at speeds that are slower relative to protocols processed by high-speed circuitry 340. In some embodiments, high and low speed circuitry 330 and 340 may provide baseband functionality.

Transceiver 320 may be coupled to antenna 325, high-speed circuitry 330, and low-speed circuitry 340. Transceiver 320 may include an EHF receiver 321 and an EHF transmitter 322. Unit 300 may be designated to operate as either a transmitter unit (in which case EHF transmitter 322 is selected for operation) or a receiver unit (in which case EHF receiver 321 is selected for operation). EHF receiver unit 321 may be coupled to high-speed circuitry 330 via receiver slicer and post-amp circuitry 350. Receiver slicer and post-amp circuitry 350 may assist high-speed circuitry 330 in processing high-speed protocols. The output of EHF receiver 321 or receiver slicer and post-amp circuitry 350 may be coupled to circuitry 340. Circuitry 340 may operate as a bidirectional data transfer block either in half-duplex mode or full-duplex mode acting as buffer between the data being transferred between electrical interface 304/305 and EHF transceiver 320. EHF transmitter 322 may be coupled to high-speed circuitry 330 and low-speed circuitry 340.

Logic and control circuitry 370 may be operative to control operation of unit 300 according to various embodiments. In some embodiments, logic module 372 may operate a progression of consciousness state machine that manages the establishment of a contactless link with another unit. Logic and control circuitry 370 may communicate with transceiver 320, high-speed circuitry 330, low-speed circuitry 340, and receiver slicer and post amp circuitry 350. Logic and control circuitry 370 can use interface module 380 to operate unit 300 in a serial interface control mode, such as when using the serial peripheral interface protocol (SPI). The serial interface control mode may be used to perform various diagnostic tests, such as a laboratory and automatic test equipment ("ATE") test, and to perform advanced control and manufacturing trim. When unit 300 is not operating in the serial interface control mode, it may operate in a pin-strapped control mode. In this mode, the operating state of unit 300 is controlled by static settings of one or more of pins 301-313, and particularly with respect to settings of pins 308-313. Logic and control circuitry 370 may be coupled to pins 308-313, and may be configured to operate unit 300 based on signals provided on one or more of pins 308-313. Pins 308-313 may be referred to herein collectively as configuration and control pins, and have pin designations CP1-CP6. Some of the pins may act as status or indicator pins, and some may serve as input pins, output pins, or both input and output pins.

The configuration and control pins may indicate which data transport mode should be used for transporting data across a contactless communication link established using unit 300. In particular, CP2 pin 309 may be a first data transport selection pin, and CP3 pin 310 may be a second data transport selection pin. Pins 309 and 310 may be set to a logic HIGH, logic LOW, or left to FLOAT. CP1 pin 308 may function as another data transport selection pin or as an identification pin. CP1 pin 308 may be driven to one of HIGH, LOW, and FLOAT with a high/low/Z driver. When CP1 pin 308 is left to FLOAT, the impedance on the pin may be used to identify which data transport should be used.

CP4 pin 311 may be set to specify whether unit 300 is to function in a transmitter mode, a receiver mode, or a control mode, which would utilize interface circuitry 380. CP5 pin 312 may be used for inter unit communications. For example, unit 300 may be able to communicate with another unit (not shown) via CP5 pin 312. Referring briefly to FIG. 2, wired path 213 may be coupled to respective CP5 pins on both units 212 and 214. This inter unit communication may be used to establish wired portions of a wake up loop among a set of contactless units. CP6 pin 313 can be used as part of a beacon/listen state machine, which may be controlled by beacon/listen module 390, and which also may be a subset of the POC state machine. For example, when CP6 pin 313 is driven HIGH, communication unit 300 may be turned ON and begins operating according to the beacon/listen state machine.

Beacon/Listen module 390 may include circuitry for operating a beaconing/listening state machine. Depending on whether unit 300 is configured to operate as a transmitter or a receiver dictates whether the beacon/listen state machine operates a beacon state machine or a listen state machine. The beacon state machine may be implemented when unit 300 is configured for operation as a transmitter and the listen state machine may be implemented when unit 300 is configured for operation as a receiver. Beacon/Listen module 390 may use relatively low power consuming circuitry when power is applied to $V_{DD}$ pin 301. Its power consumption may be relatively low compared to the power requirements of logic module 372. As will be explained in more detail below, unit 300 may initially cycle through the beaconing/listening state machine portion of the POC state machine to conserve power, and then operate according to a relatively higher power consuming portion of the POC state machine.

Power management circuitry 360 may be operative to regulate power received via pin 301 and provide regulated power at one or more different power levels, including appropriate voltage levels, to components within unit 300. For example, power management circuitry 360 may provide power to beacon/listen circuitry 390 when unit 300 is operating according to the beaconing/listening state machine.

Figure 4:
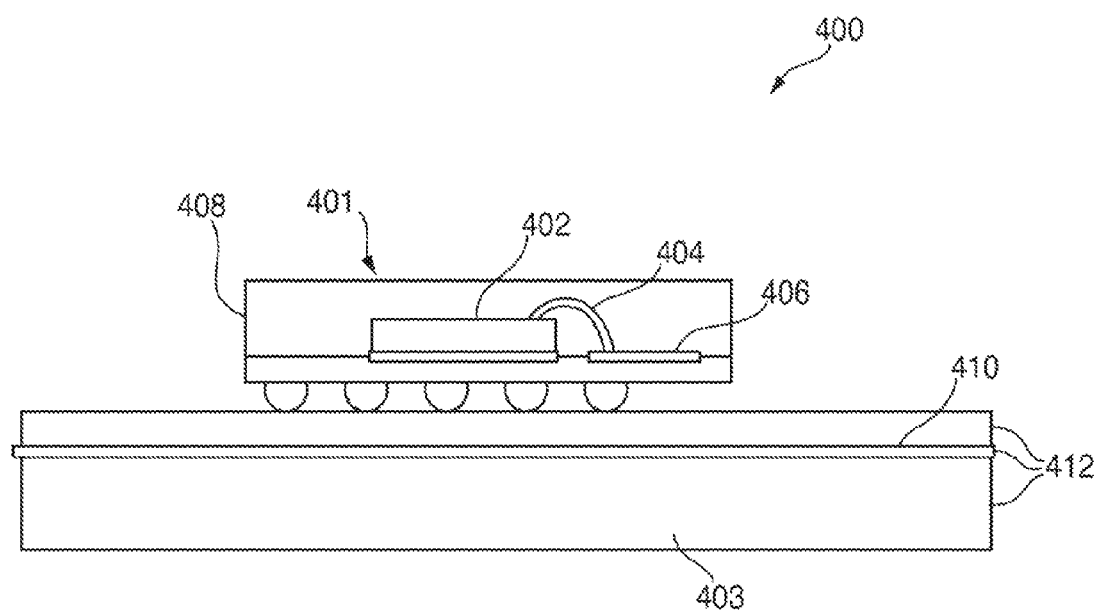
FIG. 4 is an illustrative side view of an EHF communication unit, according to an embodiment.

FIG. 4 is a side view of an exemplary EHF communication circuit 400 showing a simplified view of some structural components. As illustrated, the communication circuit may include an integrated circuit package 401 that includes die 402 mounted on connector printed circuit board (PCB) 403, a lead frame (not shown), one or more conductive connectors such as bond wires 404, a transducer such as antenna 406, and an encapsulating material 408.

Die 402 may include any suitable structure configured as a miniaturized circuit on a suitable die substrate, and is functionally equivalent to a component also referred to as a "chip" or an "integrated circuit (IC)." The die substrate may be formed using any suitable semiconductor material, such as, but not limited to, silicon. Die 402 may be mounted in electrical communication with the lead frame. The lead frame (similar to lead frame 518 of FIG. 5) may be any suitable arrangement of electrically conductive leads configured to allow one or more other circuits to operatively connect with die 402. The leads of the lead frame may be embedded or fixed in a lead frame substrate. The lead frame substrate may be formed using any suitable insulating material configured to substantially hold the leads in a predetermined arrangement.

Further, the electrical communication between die 402 and leads of the lead frame may be accomplished by any suitable method using conductive connectors such as, one or more bond wires 404. Bond wires 404 may be used to electrically connect points on a circuit of die 402 with corresponding leads on the lead frame. In another embodiment, die 402 may be inverted and conductive connectors including bumps, or die solder balls rather than bond wires 404, which may be configured in what is commonly known as a "flip chip" arrangement. Transducer 406 may be any suitable structure configured to convert between electrical and electromagnetic signals. In some embodiments, transducer 406 is an antenna. Transducer 406 in conjunction with the circuitry on die 402 may be configured to operate in an EHF spectrum, and may be configured to transmit and/or receive electromagnetic signals, in other words as a transmitter, a receiver, or a transceiver. In an embodiment, transducer 406 may be constructed as a part of the lead frame. IC package 401 may include more than one transducer 406. In another embodiment, transducer 406 may be separate from, but operatively connected to die 402 by any suitable method, and may be located adjacent to die 402. For example, transducer 406 may be connected to die 402 using bond wires (similar to 520 of FIG. 5). Alternatively, in a flip chip configuration, transducer 406 may be connected to die 402 without the use of the bond wires (see 520). In other embodiments, transducer 406 may be disposed on die 402 or on PCB 412.

Encapsulating material 408 may hold the various components of IC package 401 in fixed relative positions. Encapsulating material 408 may be any suitable material configured to provide electrical insulation and physical protection for the electrical and electronic components of the IC package. For example, encapsulating material 408 may be a mold compound, glass, plastic, or ceramic. Encapsulating material 408 may be formed in any suitable shape. For example, encapsulating material 408 may be in the form of a rectangular block, encapsulating all components of the IC package except the unconnected leads of the lead frame. One or more external connections may be formed with other circuits or components. For example, external connections may include ball pads and/or external solder balls for connection to a printed circuit board.

IC package 401 may be mounted on a connector PCB 403. Connector PCB 403 may include one or more laminated layers 412, one of which may be a PCB ground plane 410. PCB ground plane 410 may be any suitable structure configured to provide an electrical ground to circuits and components on the IC package. With the placement of the ground layer, at an appropriate distance from the antenna, the electromagnetic radiation pattern may be directed outwards from the substrate.

Figure 5:
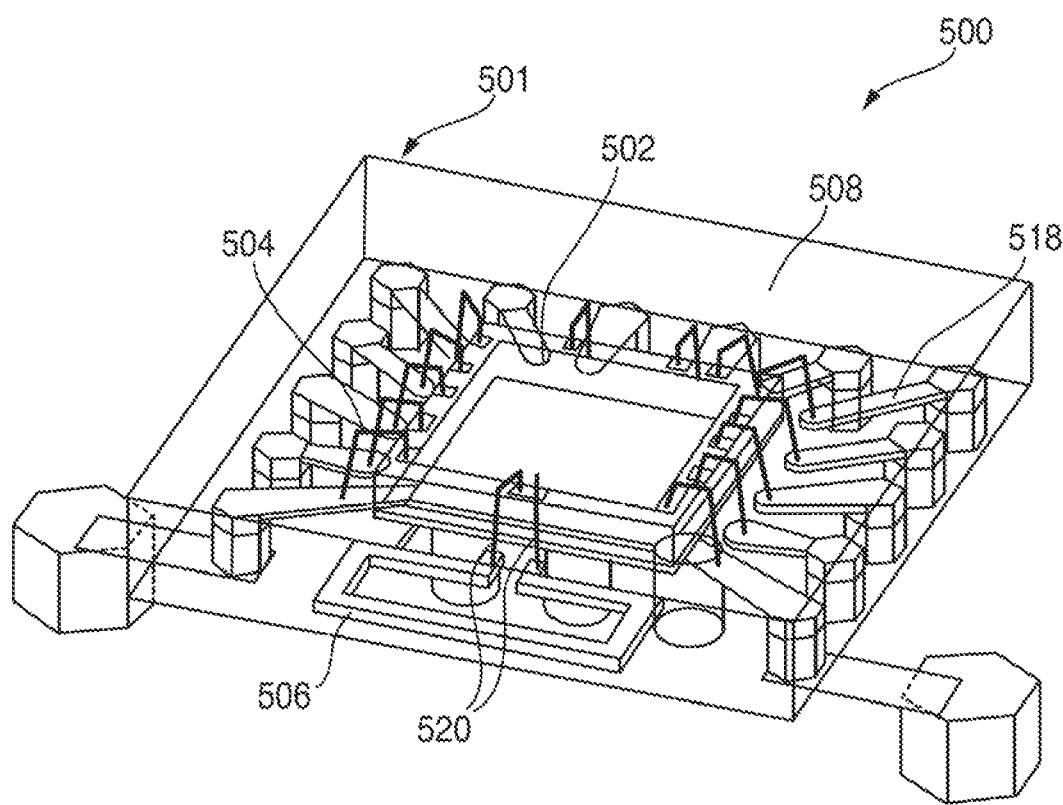
FIG. 5 is an isometric view of an EHF communication unit, according to an embodiment.

FIG. 5 is a simplified isometric view of another example of a communication circuit 500 showing some structural components. As illustrated, communication circuit 500 may include an IC package 501 that may in turn include a die 502, a lead frame 518, one or more conductive connectors such as bond wires 504, a transducer 506, one or more bond wires 520, and an encapsulating material 508. Die 502, lead frame 518, one or more bond wires 504, transducer 506, bond wires 520, and an encapsulating material may be functionality similar to components such as die 402, bond wires 404, transducer 404, and encapsulating material 408 of IC package 401, respectively, as described in FIG. 4. Further, communication circuit 500 may include a connector PCB similar to PCB 403, not shown).

In FIG. 5, it may be seen that die 502 is encapsulated in encapsulating material 508, along with the bond wires 504 and 520. In this embodiment, the IC package may be mounted on the connector PCB. The connector PCB may include one or more laminated layers, one of which may be a PCB ground plane. The PCB ground plane may be any suitable structure configured to provide an electrical ground to circuits and components on the PCB. With the placement of the ground layer, at an appropriate distance from the antenna, the electromagnetic radiation pattern may be directed outwards from the substrate.

Figure 6:
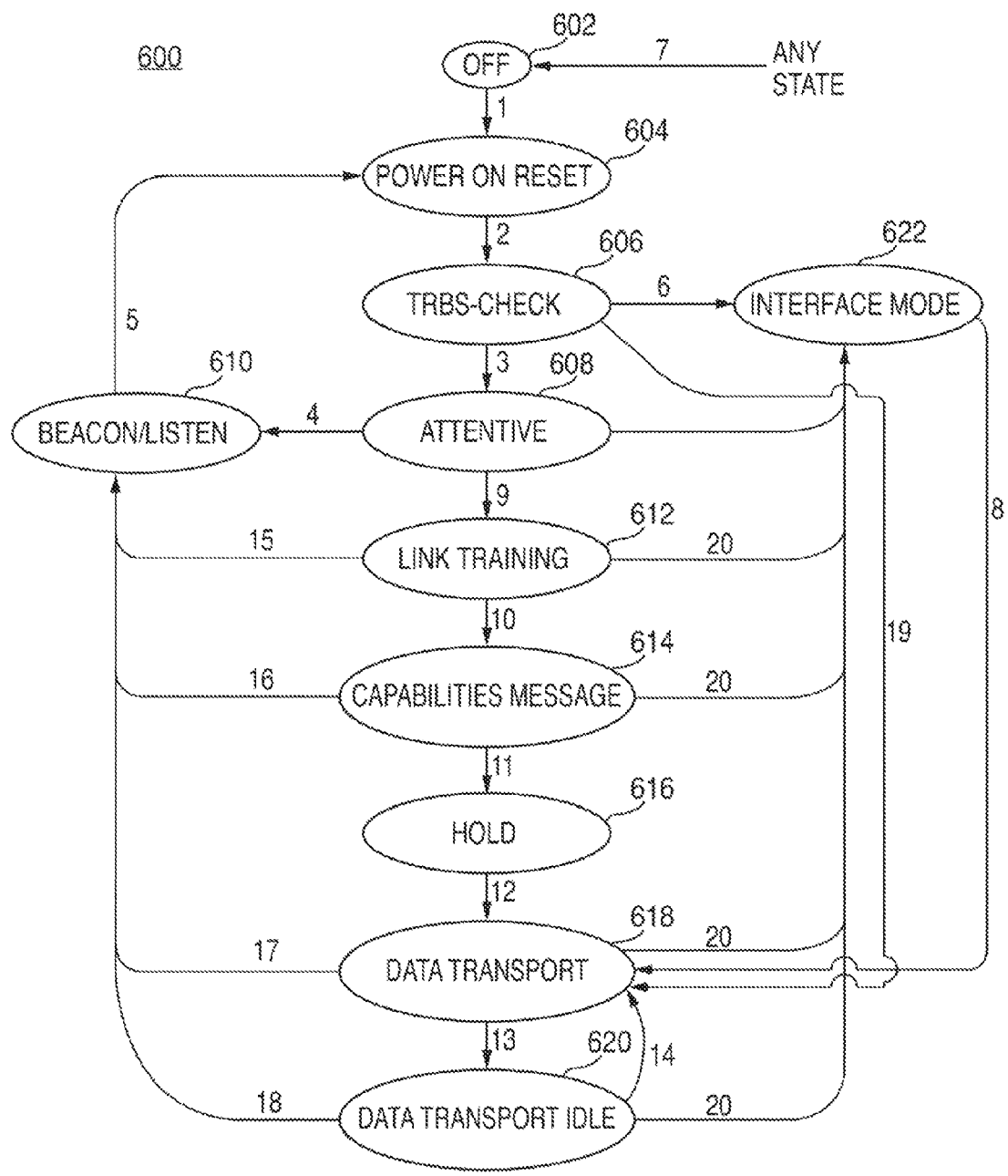
FIG. 6 shows an illustrative flowchart showing different states of a state machine, according to an embodiment.
Figure 8:
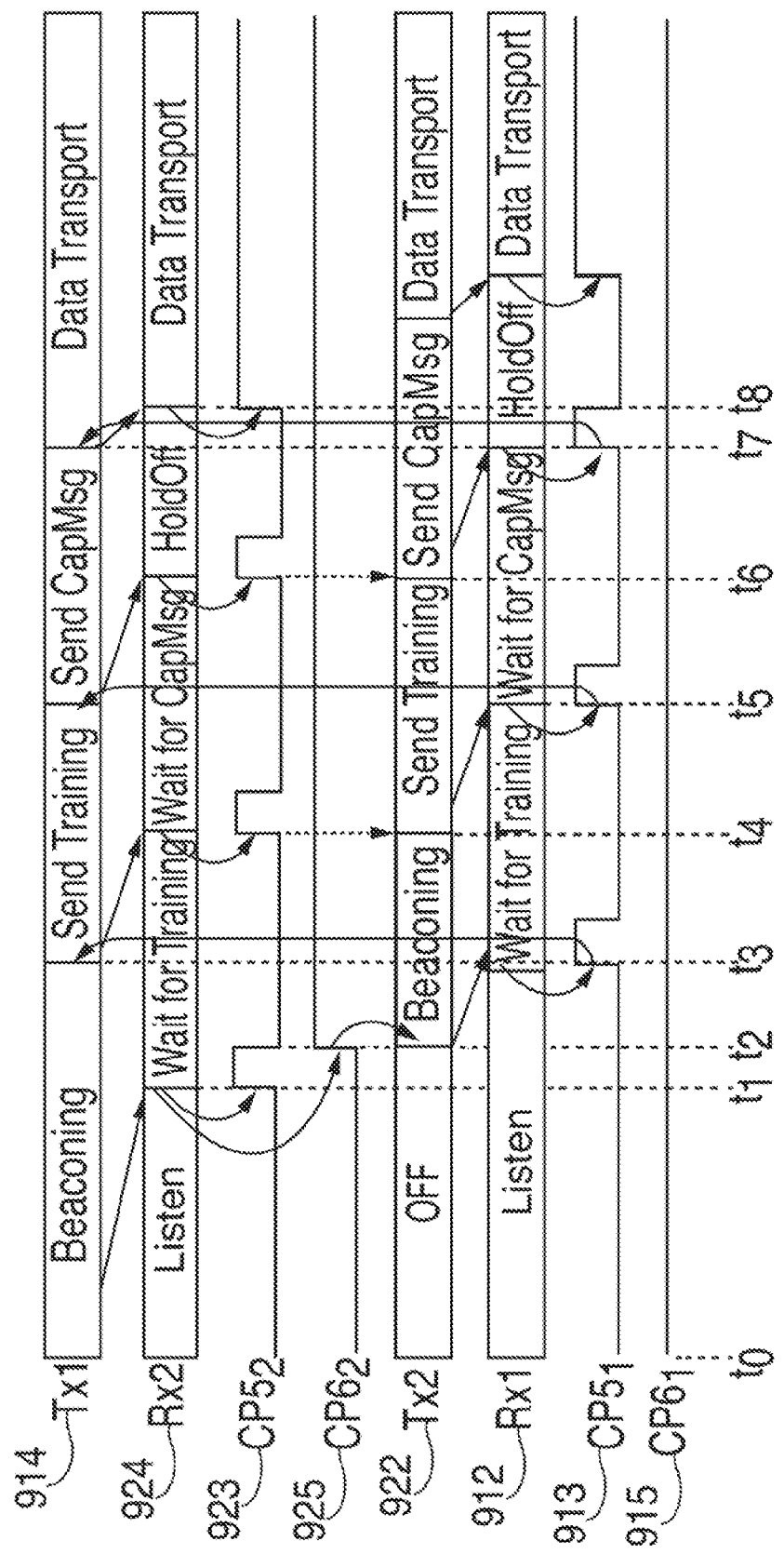
FIG. 8 is an illustrative timing diagram of state changes and signal states, according to an embodiment.
Figure 9:
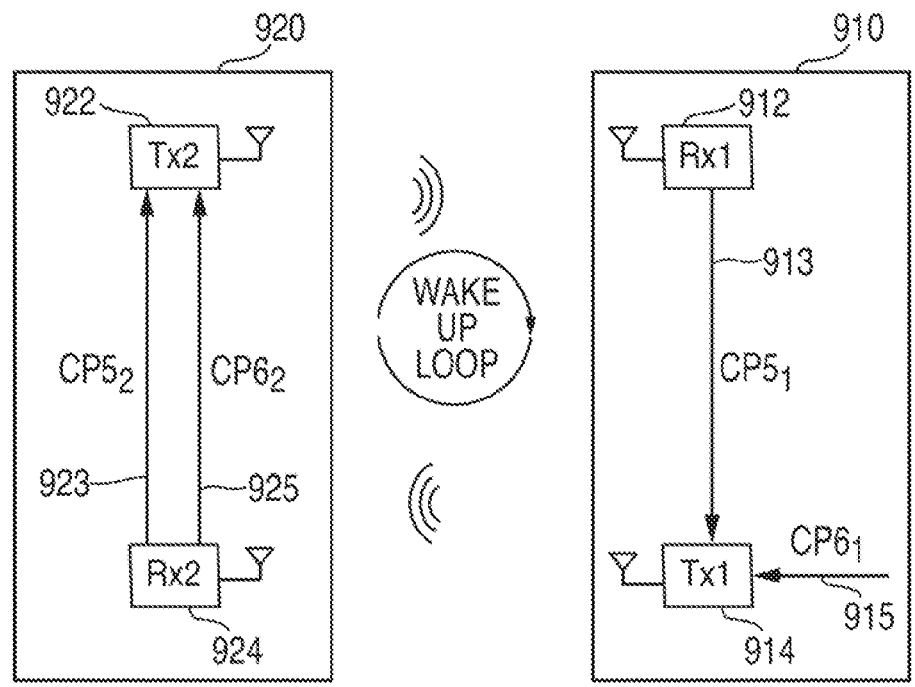
FIG. 9 is an illustrative system including several EHF communication units arranged in a wake up loop, according to an embodiment.

Referring now collectively to FIGS. 3, 6, 7, 8, and 9 the progression of consciousness state machine of an EHF communication unit is discussed. FIG. 6 shows an illustrative flowchart of various states of the POC state machine according to an embodiment. Each state change transition is associated with a number. That number corresponds to one or more conditions that need to be met to satisfy state machine transitions. The transition number and associated condition(s) are shown in FIG. 7. The conditions for satisfying one or more of the states may differ depending on whether the EHF communication unit is a transmitter or a receiver. The table of FIG. 7 reflects these differences and does so by prefacing transmitter specific conditions with a "Tx:" and prefacing receiver specific conditions with a "Rx:". If no Tx or Rx preface is used, then the condition applies to transmitter and receiver units. FIG. 8 is a graphical illustration showing state transitions of each EHF communication unit arranged in a wake up loop as shown in FIG. 9, including signals applied to the CP5 and CP6 pins of those communication units. It is understood that the progression of consciousness (POC) state machine can be implemented in any communication unit, regardless of which transport mode it supports or which wake up loop configuration is used. The wake up loop configuration of FIG. 9 being used is being referenced in connection to the POC state machine discussion, but it is understood that the POC state machine may be used in the wake up loop configurations of FIGS. 10 and 11.

The POC state machine is operative to handle both the pin-strapped and serial interface control modes of any EHF communication unit. As discussed above, the mode of operation can be set by the states of various control (or configuration) pins, such as, for example, CP1 pin 308, CP2 pin 309, CP3 pin 310, and CP4 pin 311. When an EHF communication unit is configured for a pin strap mode of operation, one or more of the control pins may specify which transport mode the unit should operate in according to when a communications link is established. The POC state machine may manage the unit's progression of consciousness as it "wakes up" to establish a communications link. As will be explained below, the POC state machine "wakes up" the unit by transitioning from state to state until it reaches a data transport state. The transition from one state to another may depend on the satisfaction of one or more conditions, and the notification of a state change or satisfaction of a condition may be transmitted in a loop like manner around the wake-up loop. Some of the conditions for executing state change transitions may vary depending on which transport mode is selected.

The notification of condition satisfaction is made during the wake-up loop and communicated among the EHF communication units. As the closed looped link is established, each unit in the link progressively "wakes up" and transitions to new states in a loop-like manner. This loop-like sequence of state changes is referred to herein as a progression of consciousness. Thus, in a progression of consciousness link awaking, a state change of an EHF communication unit may depend on a state change of an upstream EHF communication unit. In particular, the upstream EHF communication unit may be the immediately preceding EHF communication unit in the closed loop. Some of the conditions for executing state change transitions may vary depending on which transport mode is selected. For example, when a first EHF communication unit transitions from one state to another, it may transmit a signal to a downstream EHF communication unit. This transmitted signal may affect a future state of the first EHF communication unit. That is, the transmitted signal may induce a state change in one or more downstream EHF units in the wake-up loop, which results in a future state change from the first EHF communication unit.

FIG. 9 shows an illustrative full duplex link of units showing contactless EHF couplings and CP5 connections according to an embodiment. As shown, first device 910 includes receiver unit 912 and transmitter unit 914, and second device 920 includes transmitter unit 922 and receiver unit 924. Units 912, 914, 922, and 924 may have the same pin configuration and functional blocks as unit 300 of FIG. 3. Receiver unit 912 may be operative to receive contactless EHF signals from transmitter unit 922, and transmitter unit 914 may be operative to transmit contactless EHF signals to receiver unit 924. Thus, receiver unit 912 and transmitter unit 922 may form a first contactlessly coupled pair, and receiver unit 924 and transmitter unit 914 may form a second contactlessly coupled pair. In addition, receiver unit 912 may communicate with transmitter unit 914 via wired path 913, and receiver unit 924 may communicate with transmitter unit 922 via wired path 923. Wired path 913 (also labeled as $CP5_1$) may be coupled to respective CP5 pins of both units 912 and 914, and wired path 923 (also labeled as $CP5_2$) may be coupled to respective CP5 pins of both units 922 and 924. Thus, communication between first device 910 and second device 920 can be achieved via the first and second contactlessly coupled pairs and communication among units within any device can be achieved via wired pathways (e.g., pathways connected to CP5 pins). FIG. 9 also shows that the CP6 pin 915 (labeled as $CP6_1$) for transmitter 914 is being driven by circuitry other than receiver unit 912 (e.g., such as a host system), and that the CP6 pin 925 (labeled as $CP6_2$) for transmitter unit 922 is being driven by receiver unit 924.

A wake up loop of FIG. 9 may begin with transmitter unit 914, and proceed to receiver unit 924 via contactless EHF signals being emitted by transmitter unit 914. The loop continues from receiver unit 924 to transmitter unit 922 via wired path 923 and/or wired path 925. From transmitter unit 922, the loop continues to receiver unit 912 via contactless EHF signals being emitted by transmitter unit 922. The loop is completed via wired path 913, which couples receiver unit 912 to transmitter unit 914. Thus, in one embodiment, the closed loop link of FIG. 9 is a clockwise loop starting with transmitter unit 914 and ending with receiver unit 912. Thus, in this embodiment, receiver unit 924 is immediately downstream of transmitter unit 914, and transmitter unit 914 is immediately upstream of receiver unit 924. In another embodiment, the closed loop link can start with transmitter unit 922 and end with receiver unit 924 in a clockwise loop that includes receiver unit 912 and transmitter unit 914. In this embodiment, transmitter unit 922 may be the first EHF unit to be activated in the link, in which case the $CP6_2$ pin may be activated by the host system of device 920. In yet another embodiment, the closed loop link can move in a counter-clockwise direction. In such an embodiment, devices 910 and 920 would be transposed (e.g., device 910 would be placed left of device 920).

POC state machine 600 can include the following states: OFF state 602, power ON reset state 604, CP4_check state 606, attentive state 608, beacon/listen state 610, link training state 612, capabilities messaging state 614, hold state 616, data transport state 618, and data transport idle state 620.

Actions taken by POC state machine 600 in response to transitioning to each state may vary depending on whether the unit executing the POC state machine is functioning as a transmitter unit or a receiver unit.

POC state machine 600 includes a beaconing/listening state machine that cycles among states 604, 606, 608, and 610 until conditions satisfy a transition to link training state 612. The beaconing/listening state machine may be referred to generally as a "link discovery" state machine. These states (e.g., states 604, 606, 608, and 610) may also be referred to herein as initial states or initialization states. Link discovery may be implemented by having a transmitter device transmit a beacon signal, periodically, for a short duration of time, instead of being enabled continuously. Similarly, a receiver unit may be enabled to listen for the beacon, for a short duration of time, instead of being enabled continuously. A ratio of the transmit and receive durations of time can be established to ensure periodic overlap (i.e., that the receiver will be activated to detect the beacon within a reasonable number of periods). If a transmitter beacon is within an appropriate range to establish a link, the transmitter's beacon will be picked up by an active receiver. This periodic beaconing and listening approach allows for conservation of power (and extended battery life).

State machine 600 may begin in OFF state 602 and may exist in this state when no power is applied to the unit's $V_{DD}$ pin. An EHF communication unit can transition from OFF state 602 to power ON reset state 604 when power (e.g., $V_{DD}$) is applied to the unit's $V_{DD}$ pin. For example, transmitter unit 914 may transition to power ON reset state 604 when an external power source is applied to $V_{DD}$ pin 301. As its name implies, power ON reset state 604 includes powering ON of the unit and a reset of the unit. As the unit receives power via its $V_{DD}$ pin, its internal $V_{DD}$ pin may also receive power. When a power level on the internal $V_{DD}$ pin reaches or exceeds a threshold (e.g., 80% of full supply level), the unit may be reset. The POC state machine transitions to TRBS-Check state 606 when the internal $V_{DD}$ exceeds the threshold. During reset, one or more or all of the unit's outputs may be tri-stated (not driven or floating). Example output pins may include high-speed input/output pins 302/303, low-speed input/output pins 304/305, CP5 312, CP6 313, and CP1 308.

In TRBS-Check state 606, the unit checks whether its CP4 pin (e.g., CP4 pin 311) is HIGH, LOW, or FLOATING. As discussed above, the status of the CP4 pin can dictate whether the unit will operate as a transmitter or a receiver, or whether the unit is to undergo testing in a serial interface control mode. If the CP4 pin is HIGH or LOW, the POC state machine transitions to attention state 608, as indicated by transition 3. If the device is configured to go directly to Data Transport state 618 (bypassing states 608, 612, 614, and 616), the POC state machine may go directly to Data Transport state 618 from TRBS-Check state following arrow 19 after the determination of the state of the CP4 pin. After the CP4 pin determination is made, the POC state machine may delay transition to state 608 by a first period of time if the CP4 pin specifies the unit should operate as a transmitter, and by a second period of time if the CP4 pin specifies the unit should operate as a receiver. The second time period may be greater than the first time period. These transition delays may assist in link discovery. If the CP4 pin is FLOATING, the POC state machine may undergo transition 6.

In attentive state 608, the unit may activate circuitry other than that necessary to operate the beacon/listen state machine to evaluate whether to advance its state of consciousness (in which case it proceeds to link training state 612) or function in the link discovery cycle (in which case, state machine 600 proceeds to beacon/listen state 610). The conditions for determining whether POC state machine 600 proceeds to state 610 via transition 4 or state 612 via transition 9 differ depending on whether the unit is a receiver or a transmitter.

Receiver unit conditions for both transitions are now discussed. The receiver unit may monitor for the presence of a beacon signal being emitted by a transmitter within an attentive state time period, which is controlled by Beacon/Listen module 390 of FIG. 3. If a beacon signal is detected within the attentive state time period, then the POC state machine may transition to link training state 612, via transition 9. Detection of any EHF signal, which may need to be larger than a minimum magnitude threshold, by the receiver unit may qualify as a valid beacon signal since the receiver unit has not yet been trained. Such training may be performed when the POC state machine advances to link training state 612. Also in response to detecting a beacon signal within the attentive state time period, the receiver unit may pulse its CP5 pin (used in output mode) and set its CP6 pin (used in output mode) to HIGH. For example, receiver unit 924 may monitor for the presence of a beacon signal being emitted by transmitter unit 914. This is shown in FIG. 8, where in response to detecting the beacon signal from transmitter unit 914, receiver unit 924 pulses its CP5 pin 923 at time, $t_1$, and then sets its CP6 pin 925 to HIGH at time, $t_2$.

If no beacon signal is detected within a Wake-Up time period, which is set by module 390, then the POC state machine advances to beacon/listen state 610, via transition 4. Once the POC state machine is in listen state 610, various circuitry other than that needed to run beacon/listen state machine may be powered OFF and may remain powered OFF until a Wake-Up pulse is asserted by beacon/listen module 390. The Wake-Up pulse may cause the POC state machine to undergo transition 5, which transitions from state 610 to power ON reset state 604. In addition, the Wake-Up pulse restarts the Wake-Up time period, during which the POC state machine progresses through power ON reset state 604, TRBS-Check state 606, and attentive state 608, before returning to listen state 610, or proceeding to link training state 612 if a beacon signal is detected.

Transmitter unit conditions for transitions 9 and 4 are now discussed. The transmitter unit may monitor status of its CP5 and CP6 pins to determine how to make a state change transition when in attentive state 608. The POC state machine may transition to link training state 612 (via transition 9) when its CP6 pin is HIGH and the CP5 pin pulses within a time period. For example, transmitter 914 may transition to link training state 612 in response to a pulse on $CP5_1$ pin 913 when $CP6_1$ 915 is HIGH. This can be seen in FIG. 8 where transmitter unit 914 transitions to link training state 612 at time, $t_3$, (shown as "send training" in FIG. 8) in response to a pulse on $CP5_1$ 913 when $CP6_1$ 915 is HIGH. Similarly, transmitter 922 may transition to link training state 612 when $CP5_2$ pin 923 pulses when $CP6_2$ 925 is HIGH at time, $t_4$.

POC state machine 600 may transition to beacon state 610 (via transition 4) when the CP6 pin is LOW or if there is no CP5 pin pulses within a time period while CP6 pin is HIGH. Once the POC state machine is in beacon state 610, it may remain in this state until there is an CP5 pulse and its CP6 pin is HIGH. Consequently, the occurrence of an CP5 pulse while CP6 is HIGH may also cause the POC state machine to quickly step through states 604, 606, and 608 to arrive at link training state 612. While a transmitter unit is in Beacon/Listen state 610 and CP6 is HIGH, it will periodically wake up additional circuitry in the transmitter unit and send a maximum powered EHF pulse for a first pre-determined time period. Once this time-period has elapsed, the transmitter unit will disable the additional circuitry and will wait for a second pre-determined time period until repeating the EHF pulse.

In link training state 612, transmitter unit 914 initiates training by transmitting a training pattern to receiver unit 924 to identify the optimum settings for one or both of the transmitter and receiver units. The training pattern may include an alternating High and Low sequence of bits or symbols (or High and Idle symbol or a combination thereof) of a pre-defined frequency, synchronization symbol(s), and/or a clock pattern, repeated for a certain predetermined period of time or until transmitter unit 914 receives an acknowledgement of training completion from receiver unit 912. The training pattern may also include a fixed sequence of bits or symbols to aid the receiver in calibrating its parameters. The symbols may be multi-level signals or two level signals. The symbols may also refer to multi-level signals that are transmitted in quadrature (In-phase and Quadrature phase input signals that are transmitted using Quadrature modulation techniques, e.g. QAM, QPSK). As shown in FIG. 8, the acknowledgement loop begins with the receiver unit 924 completing the training of its parameters and subsequently asserting the $CP5_2$ pin 923 while keeping $CP6_2$ pin 925 HIGH, at time, $t_4$. This event triggers the transmitter unit 922 to initiate transmission of the training pattern to the receiving unit 912. After the receiving unit 912 completes training of its parameters it asserts $CP5_1$ pin 913, at time, $t_5$. This event serves as an acknowledgement of the completion of the link-training phase. Referring to FIG. 8, transmitter unit 914 transitions to state 614 at time, $t_5$, and transmitter unit 922 transitions to state 614 at time, $t_6$.

During link training, the transmitters may optimize the accuracy of the amplitude of the transmitted carrier. For example, the transmitted carrier amplitude may be calibrated to one of several references so that the transmitted power or amplitude remains in a targeted range. The reference could be a stable signal parameter in the transmitter unit. For example, a reference voltage derived from a bandgap could serve as an ideal reference. In one example, the EHF signal mapping may use a full carrier (e.g., 100% of predetermined or programmed carrier amplitude) for a logic 1, a partial carrier (fraction of a predetermined or programmed carrier amplitude) for a logic 0, and no carrier for an Idle state. The size of the partial carrier may be programmable to any one of several different thresholds (e.g., 25%, 37.5%, 50%, or other percentage of a predetermined or programmed carrier amplitude). The carrier amplitude in one or more of these states may need to be calibrated based on the reference to generate carrier amplitudes that are optimized for accuracy. This may enable the transmitter to transmit multiple amplitude carrier signals thereby increasing bandwidth efficiency and/or enabling the receiver to detect the transmitted symbols with greater reliability.

During link training, the receiving units may calibrate one or more of its parameters to optimize the performance of the contactless link while reliably recovering the logic symbols, possibly with a certain error criteria. In an example, similar to the one provided above for the transmitter unit, the receiver unit may need to detect symbols from an EHF signal that may be of different carrier amplitudes—logic 1 symbol may refer to a full carrier amplitude, logic 0 for a partial carrier amplitude and Idle symbol for no carrier. The receiver may not have accurate information to be able to detect these symbols reliably. Therefore, it may have to perform a calibration sequence to be able to detect these symbols with sufficient margin.

Calibration may be performed by executing one or more of the following approaches. For example, in one approach, the reference levels for detecting the levels of the demodulated signal (or baseband signal) may be calibrated to provide maximum margin for symbol detection. In another approach, the amplitude of the signal envelope can be tracked and the gain of the signal path can be calibrated to meet a signal amplitude target. In yet another approach, if slicers use clocks for sampling of data, then clock phase adjustment calibration can be performed to optimize the sampling point of baseband symbols. Additional calibration approaches may include transmission of a clock pattern (possibly from a host system or generated on die of the one or more communication units) that may be used by the receiver units to compare the clock frequencies and calibrate the phase or clock frequency of the frequency generator; synchronization symbols may be used to identify frame or packet boundaries.

Additional parameters may be calibrated in the transmitter and/or receiver during link training without limiting the scope of the invention. A transmitter unit can send "link training" information to its counterpart receiver unit. The link training information may be a specific data pattern that enables the counterpart receiver unit to optimize itself for receiving data from the transmitter unit. In effect, the receiver unit uses the received link training information to calibrate itself to the transmitter unit so that it can accurately map incoming EHF signals to a logic 1 state, logic 0 state, or Idle state. Link training state 612 may involve calibrating the sensitivity of the receiver units to be able to detect the EHF signal reliably, for example, by meeting bit-error rate criteria. This may involve calibration of various parameters in the RF analog front-end which may include the LNA gain, slicer reference levels or slicer sensitivity, sensitivity of the squelch detector, and clock phase adjustment.

In capabilities message state 614, a transmitter unit sends a capabilities message to its counterpart receiver unit. The transmitter unit may send this message repeatedly until its CP5 pin is pulsed or until a timer times out. The message may specify information such as the transport mode, ID codes, etc. The receiver unit will monitor the received contactless signals for the capabilities message, and when the message is received, it may validate it against one or more validating parameters (e.g., transport mode, key information such as vendor IDs, and readiness state). If the message is validated, the receiver unit may pulse its CP5 pin. If no validated message is received within a time limit, then the receiver unit may revert back to state 610. The capability message may include information regarding the transport mode protocol.

The capabilities message may be communicated using any one of several different approaches. For example, in one approach, the capabilities message sent by the transmitter unit may embody a series of pulse-width-coded (PWC) symbols. Additional details regarding use of PWC symbols to communicate the capabilities message is discussed below in connection with the description accompanying FIGS. 16-21. In another approaches, the capabilities message may be communicated using packet transfers. The capability messaging may be performed in terms of packet transfers that are of a predetermined format. A single messaging packet may include a packet header and a packet body. The packet header may include one or more synchronization symbols, packet type information, vendor ID information, length of packet information while the body of the packet may include information regarding the transport mode protocol, error checking codes, data patterns that may aid the receiver in optimizing settings and other information that may be relevant to improving the capabilities of the EHF link. The messaging may be performed using multiple packets that may or may not be of the same type. In this case, the packet header may include information regarding the contents of a particular packet.

A receiver unit may perform transition 11 (i.e., transition from capabilities message state 614 to hold OFF state 616) when the receiver determines that it has validated a message received from a transmitter unit. For example, receiver unit 924 may transition to the hold OFF state at time, $t_6$, and receiver unit 912 may transition to hold OFF at time, $t_7$.

Hold OFF state 616 is operative as a transition delay mechanism in delaying execution of transition 12. Hold OFF state 616 may be included as part of POC state machine 600 to prevent the capabilities message from being erroneously processed by a receiver unit. In particular, it may prevent the receiver unit from transmitting the capabilities message as its output. For receiver units, hold OFF state 616 may delay transition 12 by a third time period, and for transmitter units, hold OFF state 616 may delay transition 12 by a fourth time period. The fourth time period may be relatively negligible compared to the third time period. For example, in one embodiment, transmitter units may spend one clock cycle at state 616, whereas receiver units may wait multiple clocks at state 616. This disparity in hold time may provide sufficient time for the for state changes to propagate around the wake up loop, thereby enabling the receiver units to ignore the capabilities message being transmitted by their counterpart transmitter units until the transmitter units transition to a data transport state. This is illustrated in FIG. 9 where, for example, transmitter unit 914 is transmitting its capabilities message while its counterpart receiver unit 924 is in its hold OFF state. Although receiver unit 924 could have transitioned to data transport state at time, $t_6$, that transition is delayed by hold OFF state 616 to enable transmitter unit 914 to transition to the data transport state at time, $t_8$.

Data transport state 618 may represent the state in which the communication unit is ready to transmit and/or receive data according to a transport mode. As discussed above, the transport mode may be based on the states of CP1 pin 308, CP2 pin 309, CP3 pin 310, and CP4 pin 311. In some embodiments, when a receiver unit enters into state 618, it may drive its CP5 pin HIGH. This is shown in FIG. 8, for example. In other embodiments, for example, when the transport mode is USB 2.0, the CP5 wired path may be used for interchip communication and thus may not be driven HIGH.

POC state machine 600 may transition to data transport idle state 620 when conditions of transition 13 are satisfied. Data transport idle state 620 may enable the communications unit to enter into a quick entry/exit low power state for one or more transport modes. A receiver unit may enter into state 620 after it does not detect any EHF signaling activity (i.e., its counterpart transmitter unit does not transmit any data) after a fifth period of time. A transmitter unit may enter into state 620 after it does not detect any activity on its baseband inputs (e.g., pins 302-305) after a sixth period of time. In some embodiments, the fifth and sixth periods of time may be the same.

During data transport idle state 620, both the receiver and transmitter unit may power cycle various components OFF to save power, but turn those component ON to check whether the unit needs to exit idle state 620 and return to state 618 or another state. For example, a transmitter unit may power cycle its transceiver, but may supply power to its input buffer to detect input signals. The transmitter may power cycle its transceiver to transmit a "keep alive pulse" to its counterpart receiver unit so that the receiver unit knows not to transition away from state 620. The "keep alive pulse" may be a series of "1's" every clock cycle for a fixed period of time. The receiver unit may power cycle its transceiver so that it can detect the "keep alive pulse."

POC state machine 600 may transition to data transport state 618 from data transport idle state 620 when the conditions of transition 14 are satisfied. A transmitter unit may transition to state 618 when it receives a signal on its input buffer. A receiver unit may transition to state 618 when it receives a non-Idle signal from its counterpart transmitter. A non-Idle may be a signal other than the keep alive pulse. Upon receipt of an EHF signal from the transmitter unit, the receiver unit may be inhibited from powering down until the EHF signal is classified as a keep-alive or wake-up signal.

Transitions 9-14, discussed above, referred to state change transition that result in progression of consciousness advancements of the POC state machine. Transitions 15-18, which are now being discussed, refer to state change transitions that restart the progression of consciousness. That is, if any of transitions 15-18 are implemented by POC state machine 600, POC state machine 600 may re-enter into a beacon/listen state machine at state 610. In transition 15, a receiver unit may advance to state 610 if insufficient training signals have not been received within a period of time. In other words, transition 15 may occur if the link training times out. In transition 15, a transmitter unit may advance to state 610 if its CP5 pin is not pulsed within a time period or if its CP6 pin goes LOW.

In transition 16, a receiver unit may change from state 614 to state 610 if a valid message is not received within a time period or it CP6 pin goes LOW, and a transmitter unit may change from state 614 to state 610 if its CP5 pin is not pulsed within a time period or if its CP6 pin goes LOW. In transition 17, a transmitter unit may change from state 618 to state 610 if CP6 goes LOW, and a receiver unit may change from state 618 to state 610 for different conditions including but not limited to keep-alive or wake-up signal is not received, if the connection is broken due to a weak EHF signal, the data transport traffic is idle for a period of time. In transition 18, a receiver unit may change from state 620 to state 610 if no EHF signal activity occurs within a seventh period of time. In some embodiments, the seventh period of time may be greater than the fifth period of time. A transmitter unit, in transition 18, may change from state 620 to state 610 if its CP6 pin goes LOW or if its CP5 pin goes LOW for an eighth time period.

Transition 19 refers to a state change in which a generic low speed data transport mode of operation is needed that bypasses the progression of consciousness. The POC state machine may undergo transition 19 based on the specific register settings of logic and control circuitry 370 at the moment of the transition. These register settings may have been updated during the serial interface control mode state 622 or during the pin-strapped control mode. Transition 19 may occur when a microcontroller is connected to the CP6 pin and one of the low speed data pins (e.g., pins 304 or 305). In this transition, the EHF communication unit may be used as a stand-alone link that is managed by a microcontroller.

Transitions 6-8 and 20 refer to state changes associated with the serial interface control mode according to various embodiments. In one embodiment, if the CP4 pin is FLOATING at CP4_Check state 606, the POC state machine may transition to serial interface control mode 622 via transition 6. Once in the serial interface control mode 622, the pin-strapped mode is locked out and the communications unit is configured to inhibit an auto-sleep or low power mode by setting a "stay awake bit" HIGH. The "stay awake bit" is an internal bit in logic and control circuitry 370 that is updated by the serial interface control, thereby not requiring a dedicated pin for controlling this bit. For example, through an SPI pin interface several on-chip register bits can be updated or read which may include the "stay awake bit". Once the "stay awake bit" is HIGH and the CP4 pin goes LOW or HIGH, the POC state machine transitions to data transport state 618 via transition 8, thereby bypassing states 608, 612, 614, and 616. If, while in serial interface control mode state 622, the power is removed, the POC state machine may transition to OFF state 602 via transition 7.

If, at any point, the state of the CP4 pin goes to FLOATING while the POC state machine in is in any one of states 608, 612, 614, 618, or 620, the POC state machine may transition to interface mode state 622. It is understood that the various states and arrangement of POC state machine 600 are merely illustrative and that additional states may be added and some states may be omitted.

It is further understood that although POC state machine 600 is implemented by one particular EHF communication unit, that state machine 600 may depend on similar state machines being implemented in other EHF communication units to advance through its states to arrive at the data transport state. Thus, regardless of how many EHF communication units are being used to establish one or more EHF communication links, the interdependency of the state machines may result in a syncing of state machines. Thus, so long as all of the state machines remain in sync, each state machine may progress its consciousness. However, if one of the state machines falls out of sync, this may cause all of the state machines to fall out sync, thereby resulting in a restart of the wake up link progression. For example, if one of the state machines fails to advance to a next state, and transitions back to beacon/listen state 610, all of the other state machines may also transition back to beacon/listen state 610. Transitioning back to state 610 can effectively reset each of the state machines, thereby restarting the process of establishing one or more EHF communication links and preventing false progressions in state change advances.

Figure 10:
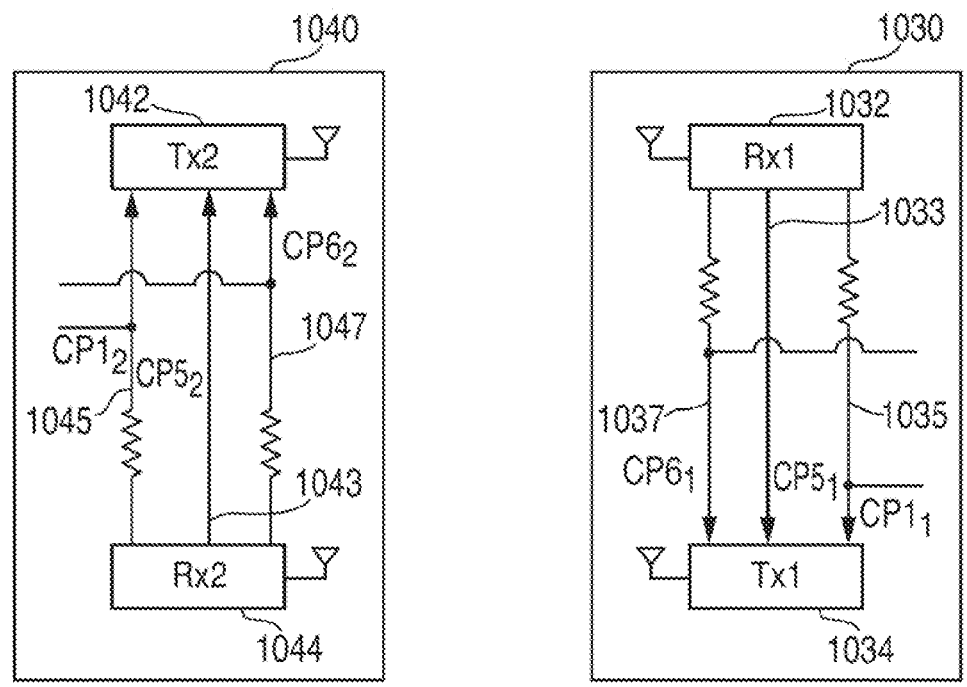
FIG. 10 is another illustrative system including several EHF communication units arranged in a wake up loop, according to an embodiment.

FIG. 10 shows another illustrative full duplex closed loop link of units showing contactless EHF couplings and CP5 connections according to an embodiment. The link arrangement of FIG. 10 is similar to that of FIG. 9, but is setup for a USB On-the-Go (OTG) configuration. As shown, first device 1030 includes receiver unit 1032 and transmitter unit 1034, and second device 1040 includes transmitter unit 1042 and receiver unit 1044. Receiver unit 1032 may be operative to receive contactless EHF signals from transmitter unit 1042, and transmitter unit 1034 may be operative to transmit contactless EHF signals to receiver unit 1044. CP5 communications paths 1033 and 1043 may exist between respective EHF communication units as shown. In addition, the CP1 pins of units 1032 and 1034 may be connected together via wired pathway 1035 that includes a resistor or other impedance element, and the CP1 pins of units 1042 and 1044 may be connected together via wired pathway 1045 that includes a resistor or other impedance element. The CP6 pins of units 1032 and 1034 may be connected together via wired pathway 1037 that includes a resistor or other impedance element, and the CP6 pins of units 1042 and 1044 may be connected together via pathway 1047 that includes a resistor or other impedance element.

In the OTG configuration, devices 1030 and 1040 may need to determine which device will be the host and which will be the client. This may be accomplished by having one or both devices assert a signal on the CP1 pins. In some configurations, CP1 may be set HIGH, indicating that it is a USB device. In other configurations, CP1 may be set LOW, indicating that it is a USB host. In still yet other configurations, CP1 may be floated, indicating that it is a USB OTG device. As shown, pathways 1035 and 1045 may be coupled to respective controllers (not shown) that may each assert (or not assert) that signal. Depending on the capabilities message exchange, the CP1 pin of an USB OTG device may be pulled LOW by the receiver unit, indicating that it is a USB host or the CP1 pin may be pulled HIGH by the receiver unit, indicating that it is a USB device. If a capabilities message indicates that both devices are configured as a USB host or as a USB device, the POC state machine will exit to the Beacon/Listen state via transition 16. If a capabilities message indicates that a USB OTG device is connected to a USB host, the CP1 of the receiving device will be pulled HIGH indicating that it should be configured as a USB device. If a capabilities message indicates that a USB OTG device is connected to a USB device, the CP1 of the receiving device will be pulled LOW indicating that it should be configured as a USB host. As also shown, pathways 1035 and 1045 may be coupled to their respective devices.

When devices 1030 and 1040 attempt to form a link, one device may assert the CP6 pin on its transmitter unit and the other device may leave the CP6 pin floating. As shown, pathways 1037 and 1047 are coupled to respective controllers (not shown). In one embodiment, a controller associated with device 1030 may drive the CP6 pin HIGH on transmitter unit 1034 to initiate a link, and a controller associated with device 1040 may leave the CP6 pin floating on transmitter unit 1042. In this embodiment, the CP6 pin may be driven by receiver unit 1044. Thus, in this embodiment, the wake up loop can start at transmitter unit 1034 and move clockwise to receiver unit 1044, transmitter unit 1042, and continue at receiver unit 1032. In the same manner, a wake up loop can start in FIG. 9 at transmitter unit 914 and move clockwise to receiver unit 924, transmitter unit 922, and continue at receiver unit 912.

Figure 11:
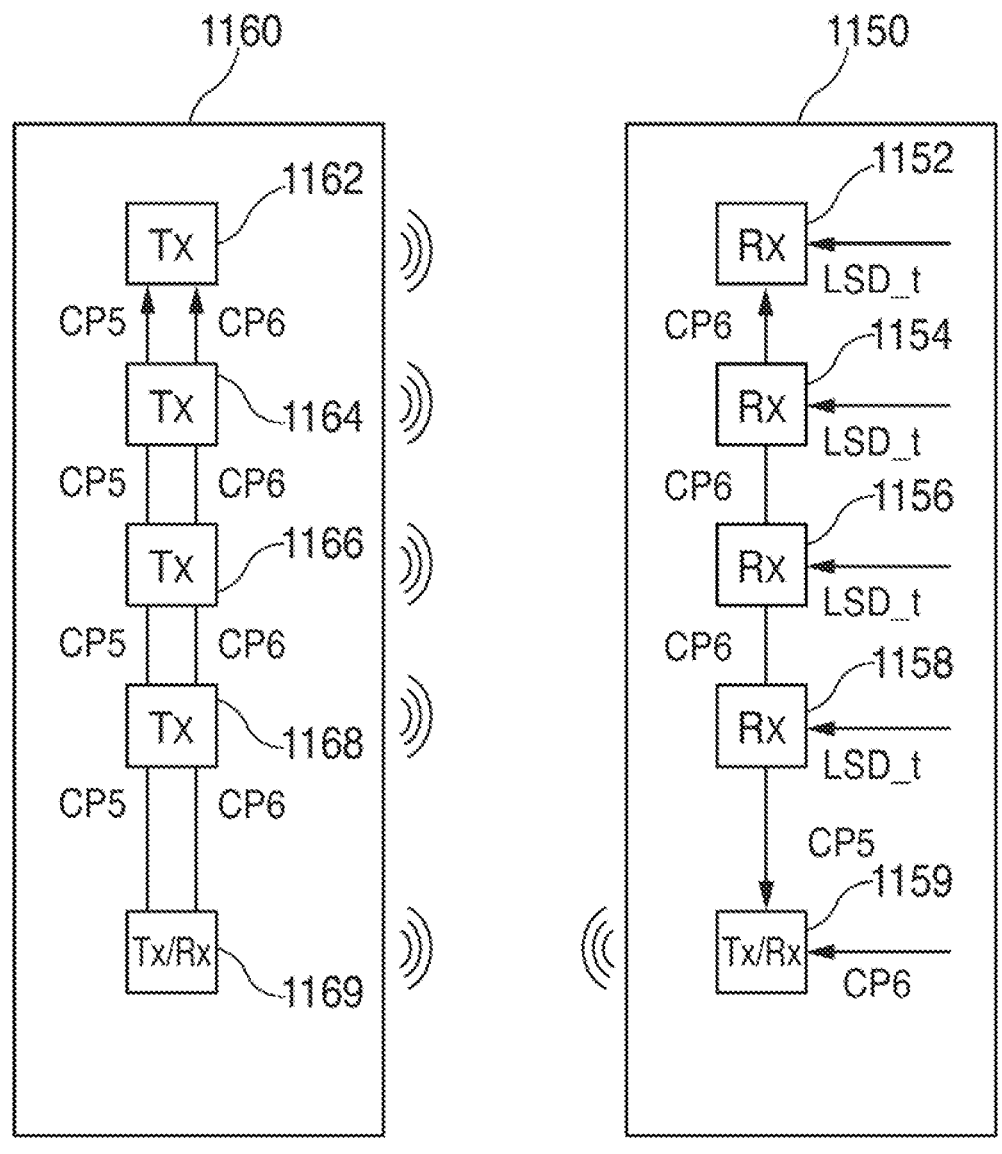
FIG. 11 is yet another illustrative system including several EHF communication units arranged in a wake up loop, according to an embodiment.

The wake up loops of FIGS. 9 and 10 are both single lane full duplex links. If desired, multiple lane links can be achieved by using multiple instances of the single lane full duplex links of FIG. 9 or FIG. 10. For example, a two lane link can be achieved by using two instances of the full duplex links of FIG. 9. FIG. 11 shows an illustrative multi-lane link according to an embodiment. In some embodiments, the link of FIG. 11 may be a multi-lane DisplayPort link. As shown, device 1150 can include receivers units 1152, 1154, 1156, and 1158, and transmitter unit 1159, and device 1160 can include transmitter units 1162, 1164, 1166, and 1168, and receiver unit 1169. In device 1160, CP5 and CP6 pins of receiver unit 1169 are fanned out to each of transmitter units 1162, 1164, 1166, and 1168. In device 1150, the CP5 pins of receiver unit 1158 and transmitter unit 1159 are coupled together, and the CP6 pin of transmitter unit can be driven by a controller (not shown). The wake up loop of FIG. 11 may start with transmitter unit 1159, and proceed clockwise to receiver unit 1169, and then the loop proceeds to each of transmitter units 1162, 1164, 1166, and 1168 substantially simultaneously, followed by and ending substantially simultaneously with receivers units 1152, 1154, 1156, and 1158. Receiver unit 1158 may be the sole unit that communicates with transmitter unit 1159 via the CP5 pins. For simplicity, only a few of the interconnected signals are shown to prevent overcrowding of FIG. 11.

Figure 12:
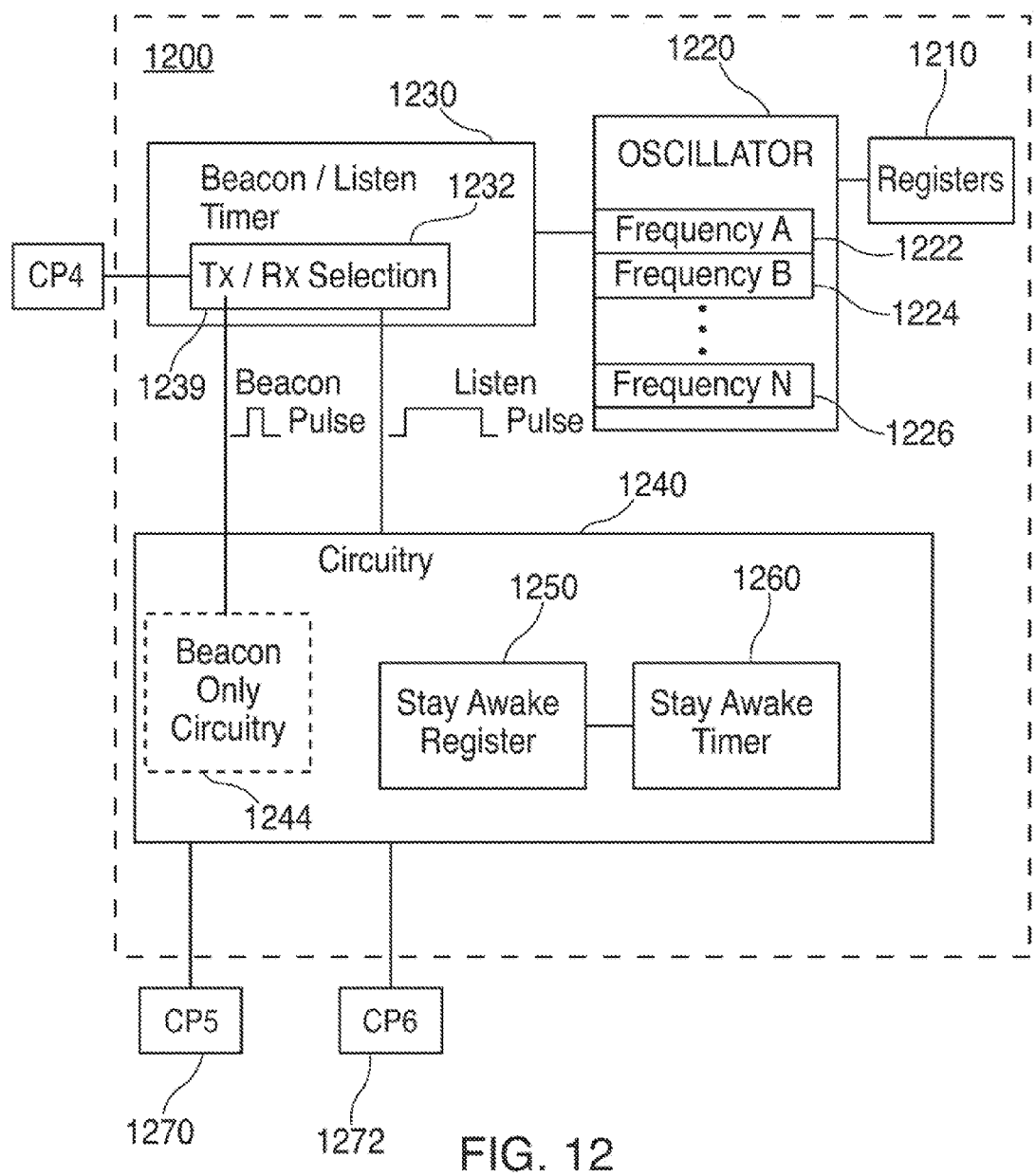
FIG. 12 shows an illustrative schematic showing circuitry that may be used in executing the beacon/listen cycle according to an embodiment.
Figure 13A:
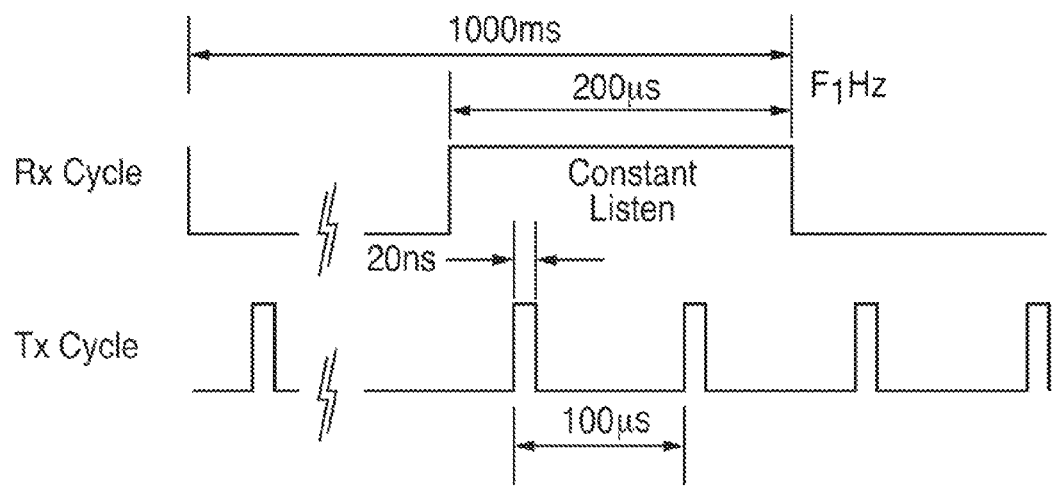
FIGS. 13A-13D show illustrative beaconing and listening timing diagrams, each operating according to different clocking speeds, according to various embodiments.
Figure 13B:
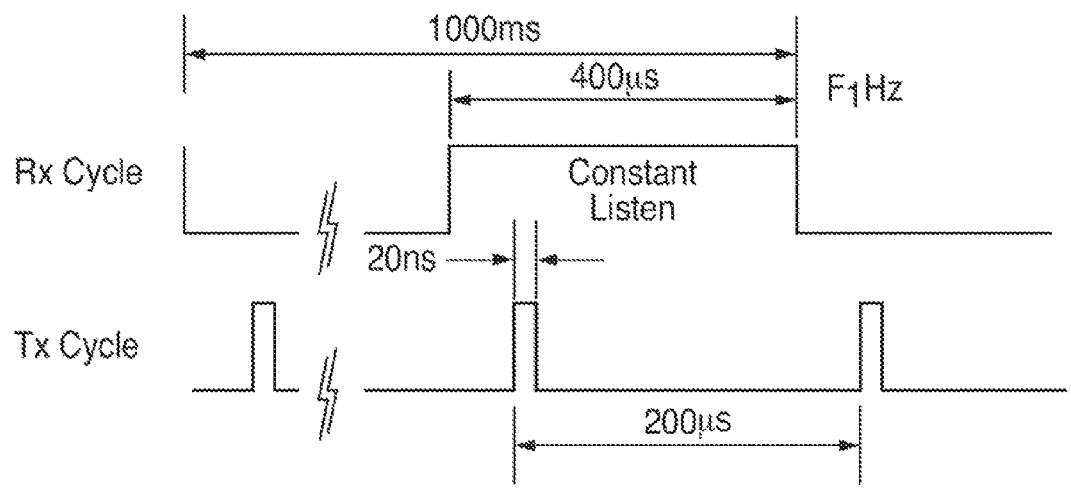
Figure 13C:
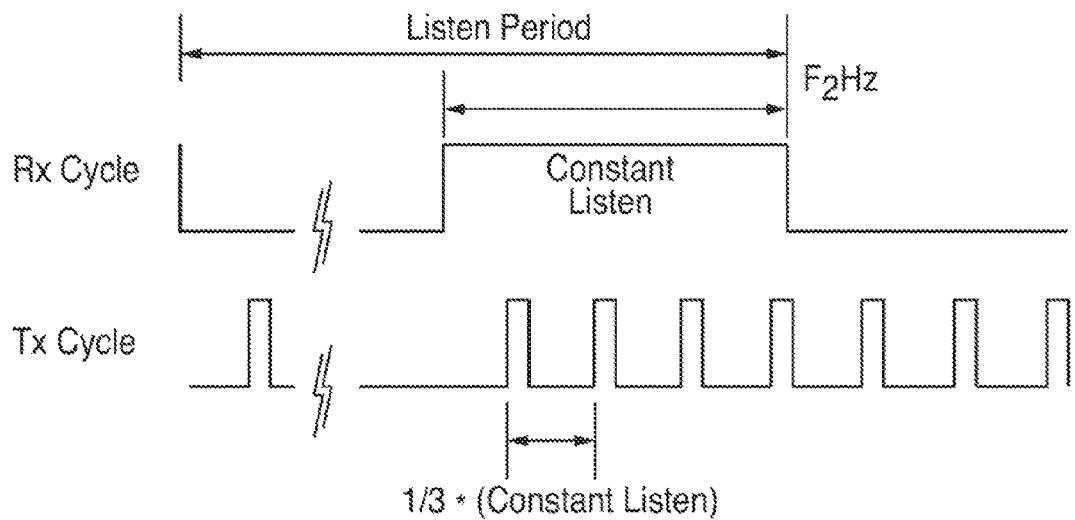
Figure 13D:
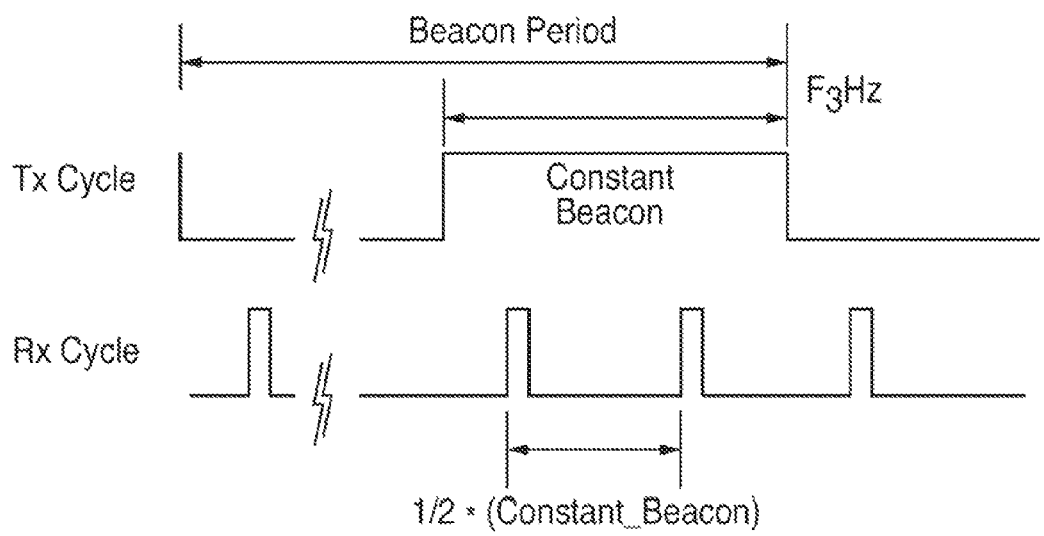
Figure 14:
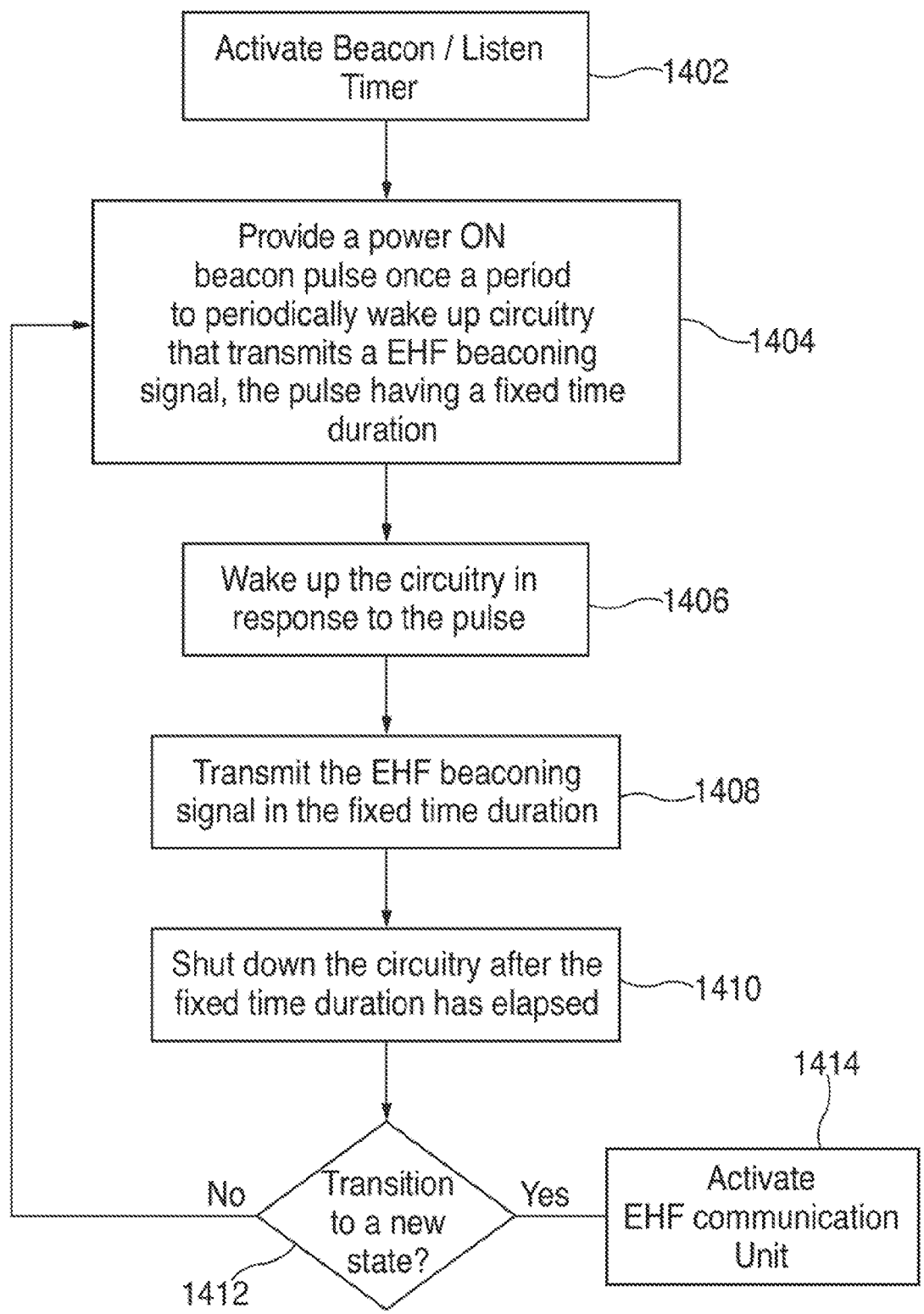
FIG. 14 shows an illustrative flowchart of steps that can be performed by a transmitter unit that is beaconing according to an embodiment.
Figure 15:
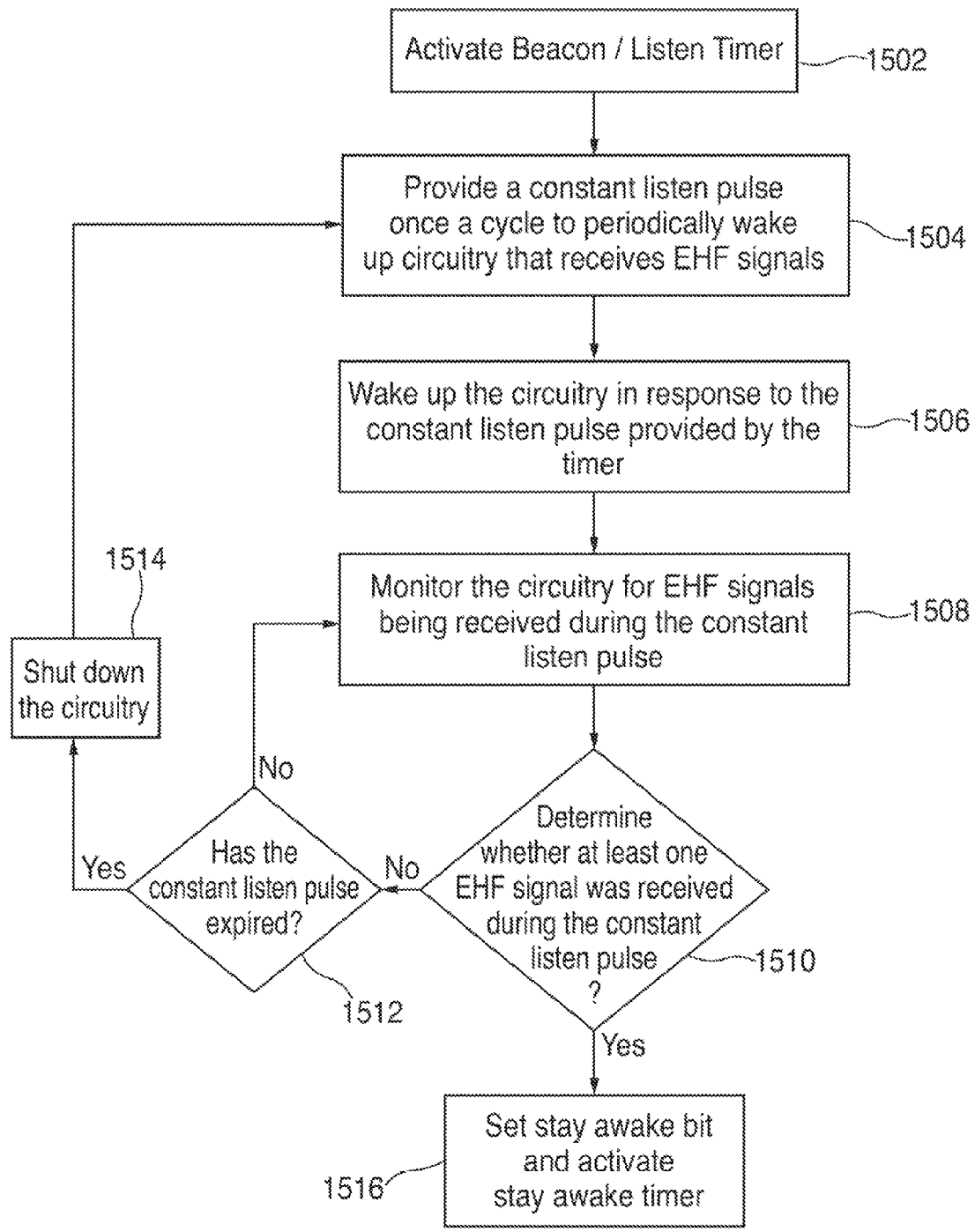
FIG. 15 shows an illustrative flowchart of steps that can be performed by a receiver unit that is listening for a beacon signal according to an embodiment.

Reference is now made to FIGS. 12-15 to discuss various implementations of the beacon/listen cycle of a POC state machine. In particular, the following discussion describes in more detail how circuitry within an EHF communication unit is used to implement the beacon/listen cycle (e.g., state 610 of FIG. 6). FIG. 12 shows an illustrative schematic showing circuitry of unit 1200 that may be used in executing the beacon/listen cycle according to an embodiment. FIGS. 13A-13D show illustrative beaconing and listening timing diagrams, each operating according to different clocking speeds, according to various embodiments. FIG. 14 shows an illustrative flowchart of steps that can be performed by a transmitter unit that is beaconing according to an embodiment. FIG. 15 shows an illustrative flowchart of steps that can be performed by a receiver unit that is listening for a beacon signal according to an embodiment.

FIG. 12 is shown to include register 1210, oscillator 1220, beacon/listen timer 1230, beacon/listen circuitry 1240, register 1250, stay awake timer 1260, control/configuration pins 1270, 1272, and 1274. Register 1210 can be programmed with data that can be loaded into oscillator 1220, for example, during the attentive state (e.g., attentive state 608). Oscillator 1220 can operate according to any one of several different frequencies based on the data received from register 1210. For example, oscillator 1220 may select one of frequencies 1222, 1224, or 1226 to drive beacon/listen timer 1230. The selected frequency may control the clocking speed of timer 1230. It will be appreciated that increases in clocking speed frequency can result in faster operation, along with increased power consumption, and that decreases in clocking speed frequency can result in slower operation, but with decreased power consumption. The selection of a frequency may depend on the end use application of unit 1200. It will be further appreciated that oscillator 1220 can be part of or included within timer 1230. The beacon/listen timers for a set of EHF communication devices may be pre-programmed or may be set by the system prior to entering the beacon/listen mode.

Beacon/listen timer 1230 may provide a power ON beacon pulse or a power ON listen pulse, depending on whether unit 1200 is configured to operate as a transmitter or a receiver. The duration of the beacon pulse or the listen pulse determines the duration in which the device 1200 operates as a transmitter or a receiver, respectively. If unit 1200 is configured to operate as a transmitter, timer 1230 may provide the power ON beacon pulse, and if operating as a receiver, timer 1230 may provide the power ON listen pulse. For example, unit 1200 may be configured based on the state of configuration pin 1274. In some embodiments, the state on pin 1274 may be used to select an appropriate output of selector 1232.

The beacon/listen timer may generate a power ON beacon pulse of a fixed time duration (e.g., 20 ns) during which various circuitry is activated to transmit an EHF beacon signal every fixed number of clock cycles (e.g., 100 clock cycles). The power ON beacon pulse may cause beacon only circuitry 1244 to be powered ON. Beacon only circuitry 1244 may only include the circuitry components necessary to transmit an EHF beacon signal. This may include, for example, EHF transmitter 322 of FIG. 3. This fixed time duration of the beacon pulse can be the same time duration regardless of the frequency set by oscillator 1220. For example, in one specific embodiment, the fixed time duration can be about 20 ns, and the fixed number of clock cycles can be 100. Timing diagrams showing the power ON beacon pulse according to the parameters of this specific embodiment are shown in FIGS. 13A-13D. In particular, the beacon pulses are shown in the Tx Cycle.

The power ON listen pulse may set a fixed time duration during which various circuitry is activated to listen for an EHF beacon signal. In some embodiments, the entire EHF communication unit may be activated to monitor for the presence of an EHF beacon signal. The beacon/listen timer may generate a power ON listen pulse for a first number of clock cycles (e.g., 200 clock cycles) out of every second number of clock cycles (e.g., 1,000,000 clock cycles). The second number of clock cycles may be orders of magnitude greater than the first number of clock cycles to minimize power consumption. Timing diagrams showing the power ON listen pulse according to the parameters of this specific embodiment are shown in FIGS. 13A-13D. In particular, the listen pulses are shown pulse in the Rx cycle.

A timing relationship can exist between the beacon and listen pulses to promote beacon detection between coupled EHF communication devices. For example, the beacon pulse may be asserted at least once during every listening pulse. In other examples, the beacon pulse may be asserted at least twice during every listening pulse. This may be accomplished by setting the fixed number of clock cycles of the beacon pulse to be a fraction of the first number of clock cycles of the listening pulse. Referencing the illustrative numbers discussed above, the fixed number is 100 clock cycles and the first number is 200 clock cycles. Thus, the fixed number is one-half of the first number, thereby ensuring that at least two 20 ns beacon pulses will occur every listening pulse. It may be desirable for the beacon pulse to be asserted at least twice during every listening pulse to account for potential variations in clocking speeds of the clocks operating in the transmitting and receiving units. For example, if only one beacon pulse is transmitted for each listen pulse, and the clocks in both units are not operating in sync with each other, there is a potential for the beacon pulse to be transmitted outside of the listen pulse. However, by increasing the frequency in which beacon pulses are transmitted, the can ensure that at least one beacon pulse will be transmitted during the listen pulse, even if the clocks in both units are operating at slightly different speeds (e.g., within 20% of each other).

The timing relationship of the beacon pulse and the listen pulse can be reversed such that the transmitter unit has a relatively long beacon pulse and the receiver unit has a relatively short listen pulse. In other words, the receiver and transmitter cycles can be transposed to achieve the same result. This is illustrated in FIG. 13D.

FIG. 13A, for example, shows the timing diagram of the power ON beacon pulse and the power ON listen pulse when the beacon/listen timer is set to operate at a clock speed of $F_1$ Hz. $F_1$ Hz is set to 1 MHz in this example. The timing diagram of FIG. 13A may adhere to the above-described example in which the power ON beacon pulse can be set to have a fixed time duration pulse length of 20 ns every 100 clock cycles. The period of the beacon ON pulse can be about 100 μs. The power ON listening pulse of FIG. 13A can have a period of about 1000 ms and a constant listen duration of about 200 μs. As shown, at least two beacon pulses exist within the constant listen duration.

FIG. 13B, for example, shows timing diagrams of the power ON beacon pulse and the power ON listen pulse when the beacon/listen timer is set to operate at a clock speed of $F_1$ Hz. $F_1$ Hz is set to 1 MHz in this example. As shown, the period and constant listen duration of the listening pulse can be same as that in FIG. 13A, but the period of the beacon ON pulse be same as the constant listen period. Thus, FIG. 13B shows an example where only one beacon pulse can be detected during the listen pulse.

FIG. 13C, for example, shows timing diagrams of the Rx and Tx cycles operating at a clock speed of $F_2$ Hz, and wherein the Rx/Tx relationship is set such at least three beacon pulses can be transmitted during the listen pulse. As shown, the listen pulse can have a period, $Listen_{period}$, and a constant listen duration. The period of the beacon ON pulse can be a fraction of the constant listen duration, shown here to be $1/3^{rd}$ (e.g., $1/3$*Constant_Listen) of the constant listen duration. Thus, in this timing diagram example, three beacon pulses may exist for every listen pulse.

FIG. 13D, for example, show timing diagrams of the Rx and Tx cycles operating at a clock speed of $F_3$ Hz. FIG. 13D illustrates alternative roles of the Rx and Tx cycles, at least compared to the roles those cycles perform in FIGS. 13A-13C. As shown, the Tx cycle may provide a beacon pulse having a constant beacon duration (shown as Constant Beacon) every beacon period (shown as Beacon Period). The Rx cycle may have listen pulse that pulses at a fraction of the constant beacon duration. For example, as shown, the fraction may be one-half such that the listen pulse of a fixed duration (e.g., 20 ns) is provided every $1/2$*Constant_Beacon. This ratio is illustrative, but may ensure that the receiver unit listens for a beacon pulse while the transmitter unit is providing its beacon pulse.

Reference is now made to FIG. 14. Starting at step 1402, the beacon/listen tinier may be activated. The beacon/listen tinier may be activated when the POC state machine enters into the beacon/listen state (e.g., state 610). At step 1404, the beacon/listen tinier can provide a power ON beacon pulse once a period to periodically wake up the circuitry that transmits an EHF beaconing signal, the pulse having a fixed time duration. For example, beacon only circuitry 1244 may be periodically woken up. At step 1406, the circuitry that transmits an EHF beaconing signal may be woken up in response to power ON beacon pulses received from the beacon/listen timer. The power ON beacon pulse may, for example, be any one of the beacon pulses shown in FIGS. 13A-13D. As shown, any one of these beacon pulses has a fixed time duration during which the pulse is HIGH. At step 1408, an EHF beacon signal may be transmitted for a fixed time duration of the power ON beacon pulse. At step 1410, the circuitry may be shut down after the fixed time duration has elapsed. For example, beacon only circuitry 1244 may be put back to sleep.

At step 1412, the EHF communication circuit may check to whether to transition to a new state. It may do this by determining if its CP5 pin has gone HIGH. If CP5 has not gone HIGH, the process may loop back to step 1404, thereby enabling the beaconing loop to continue to transmit EHF beacon signals. Moreover, a determination that CP5 has not gone HIGH may maintain the POC state machine in beacon state 610. If, however, CP5 does go HIGH, the process may proceed to step 1414, which may cause the EHF communication unit to activate. For example, all of circuitry 1240 may be activated. Moreover, when CP5 goes HIGH, the POC state machine may progress through states 604, 606, 608, and transition to link training state 612.

It is understood that the steps shown in FIG. 14 are merely illustrative and that additional steps may be added, one or more steps can be omitted, and that the execution order of the steps may vary. For example, the determination of whether CP5 goes HIGH can be made at any point during the process of FIG. 14.

Reference is now made to FIG. 15. Starting at step 1502, the beacon/listen tinier may be activated. The beacon/listen tinier may be activated when the POC state machine enters into the beacon/listen state (e.g., state 610). At step 1504, the beacon/listen tinier can provide a power ON listen pulse on a periodic basis to wake up circuitry that listens for an EHF beacon signal. For example, circuitry 1240 may be periodically woken up. At step 1506, the circuitry may be woken up in response to the constant listen pulse received from the beacon/listen timer. The constant listen pulse may, for example, be any one of the constant listen duration portions of the pulses shown in FIGS. 13A-13D. When circuitry 1240 is woken up, the POC state machine may transition from state 610 to states 604 and 606, and end up in state 608. At step 1508, the EHF communication unit may monitor the circuitry for an EHF signal being received during the constant listen duration. The EHF communication unit may listen for the beacon signal while it is in the attentive state (e.g., state 608) and may continue to listen for such signals until the power ON listen pulse expires.

At step 1510, a determination is made as to whether at least one EHF signal is detected during the constant listen pulse. If no EHF beacon signal is detected, the process may proceed to step 1512, where a determination is made as to whether the power ON listen pulse has expired. If the listen pulse has not expired, the process may loop back to step 1508. If the listen pulse has expired, the process may proceed to step 1514, which may shut down the circuitry that listens for an EHF beacon signal. The process may loop back to step 1504 when the beacon/listen timer is ready to turn the circuitry back ON. At step 1514, the POC state machine may transition to a listen state (e.g., listen state 610).

If, at step 1510, an EHF signal is detected, the process may proceed to step 1516, which may set a stay awake bit (e.g., a bit in stay awake register 1250) and activate a stay awake timer (e.g., timer 1260). Moreover, the POC state machine may transition to the link training state in response to an EHF beacon signal detection.

Stay awake timer 1260 may set a time limit duration for which the POC state machine can exist in any one or more states. The actual time limit may be set by stay awake register 1250. For example, when the POC state machine is in the link training state, the POC state machine may transition back to the beacon/listen state if the stay awake timer times out before the POC state machine transitions to the capabilities message state.

Reference is now made to FIGS. 16-21 to discuss one of several different approaches for communicating a capabilities message in accordance with various embodiments. When an EHF communication unit is operating as a transmitter unit in the capabilities message state, it may transmit a repeating stream of messages until it receives a rising edge on its CP5 pin or if some other condition occurs. A receiver unit, when operating in the capabilities message state, may wait to receive at least 2 consecutive copies of a valid message before transitioning to the next state. The message may be transmitted as pulse-width-coded (PWC) symbols and serialized according to a clock running within the unit. Each symbol can span a fixed number of clock cycles, begin with a rising edge, end with a falling edge, and terminate with a 0 level. FIG. 16 shows three different and illustrative symbols that are serialized according to internal clock 1610.

FIG. 16 shows symbols 1620, 1630, and 1640 each including a rising edge, a falling edge, and terminating with a 0 level. For illustrative purposes, each symbol may span 12 clock cycles, though it will be appreciated that the symbols may span any suitable number of clock cycles. The symbols can be expressed according to a binary value in each clock cycle. For example, symbol 1620 may express a binary '0' symbol, symbol 1630 may express a binary 'S' symbol, and symbol 1640 may express a binary '1' symbol. Symbol 1620 may include two clock cycles of 1 level binary values, followed by ten clock cycles of 0 level binary values such that a binary '0' symbol can be represented by 110000000000. Symbol 1630 may include five clock cycles of 1 level binary values, followed by seven clock cycles of 0 level binary values such that a binary 'S' symbol can be represented by 111110000000. Symbol 1640 may include nine clock cycles of 1 level binary values, followed by three clock cycles of 0 level binary values such that a binary '1' symbol can be represented by 111111111000. Symbols may be gapped by gap cycle 1650, which may not represent a symbol, but can be expressed as a 0 level between symbol expressions. Each gap cycle 1650 may span, for example, one clock cycle. It is understood the binary expression of each symbol is merely illustrative and that any binary expression may be used for any symbol. It should be understood that other variations of capability messaging is possible. For example, unique control symbols or characters may be sent in the form of digital bits without specifically using PWC.

The receiver units may be tolerant in accepting clock cycle mismatches of a fixed percentage of symbols being transmitted by a respective transmitter unit. In a system in which there is no common clock or clock recovery mechanism, the tolerance in clock cycle mismatches allows a transmitter and receiver to be mismatched in clock frequencies and still reliably communicate. For example, a receiver unit may interpret received messages having 1-3 level 1 clock cycles as a 1620 symbol, 4-6 level 1 clock cycles as a 1630 symbol, and 7-11 level 1 clock cycles as a 1640 symbol.

FIG. 17 shows an illustrative format of a capabilities message according to an embodiment. Capabilities message 1710 can include several fields that can be populated with various symbols. As shown, message 1710 can include header field 1720, which may be populated with a fixed number of symbols, and several message fields 1730-1735, each of which may be populated with various sized bit lengths of symbols. Header field 1720 may mark the start of a message. As an illustrative example, four 'S' symbols may define a header. Each of message fields 1730-1735 can be represented by any number of bits, shown as X in the FIG. As an example, message fields 1730-1735 may include 16 bits, 16 bits, 16 bits, 2 bits, 2 bits, and 28 bits, respectively. The bit lengths are merely illustrative and any bit length may be used for any one of fields 1730-1735. Message field 1730 may specify a key code, which may represent a cipher, an encryption code, or other security related code that may be verified by a counterpart device. Message field 1731 may specify vendor identification. The vendor identification may be stored in a register, read only memory, non-volatile memory, or some other permanent storage mechanism within the EHF communication unit. Message field 1732 may specify an operating mode of the EHF communication device. The operating mode may specify the data transport mode (e.g., USB, PCI express, etc.) of the EHF communication device that is set by the states on one or more of the configuration pins (e.g., pins 308-311). In some embodiments, the operating mode may be defined according to configuration pin settings of FIG. 3. Message field 1733 may specify a particular USB mode functionality (e.g., whether unit is a host or a slave and on-the-go USB functionality). Message field 1734 may specify a transmission band, which may refer to the specific carrier frequency or carrier frequency offset. Message field 1735 may be a future expansion field that can be used to communicate additional capabilities information for a future application. If desired, message field 1735 may be split into two or more fields for future use. It is understood that some of the fields may not be used for certain applications, that some fields may not exist, and other fields may be included that are not part of capabilities message 1710.

Figure 18:
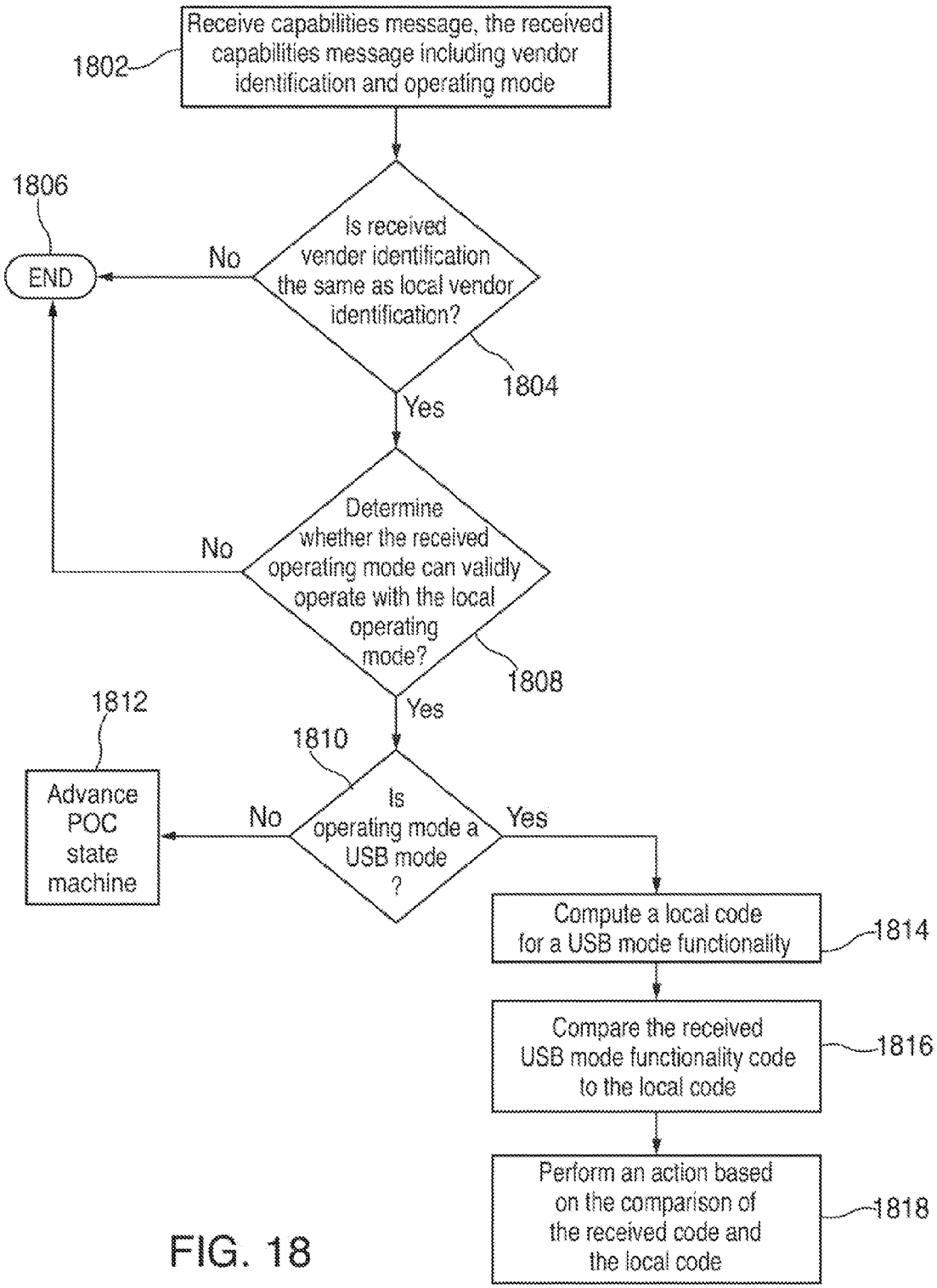
FIG. 18 shows an illustrative flowchart of steps that may be taken by a receiver unit that is processing a received capabilities message according to an embodiment.

FIG. 18 shows an illustrative flowchart of steps that may be taken by a receiver unit that is processing a received capabilities message according to an embodiment. Beginning with step 1802, a capabilities message may be received. The capabilities message may be transmitted by a counterpart transmitter unit according to capabilities messaging format, such as that illustrated above in connection with FIG. 17. As such, the received capabilities message may include a key code, vendor identification, and an operating mode. If the operating mode is a USB mode, the capabilities message may also include USB functionality information. The receiver unit may have stored therein, or programmed therein, its own local capabilities message information. For example, the receiver unit may have vendor information, operating mode information, and optional USB functionality information. At step 1804, a determination is made as to whether the received vendor identification is the same as the local vendor identification. If they are not the same, the process proceeds to step 1806, and if they are same the process proceeds to step 1808. At step 1806, verification of the capabilities message may cease, thereby causing the POC state machine to exit out of its progression and restart.

At step 1808, which is the next step once the vendor identification is verified in step 1804, a determination is made as to whether the received operating mode can validly operate with the local operating mode. In some applications, the received operating mode and local operating mode may be the same, which would result in a valid operation among the received and local operating modes. In other applications, the received and local operating modes may be different, such as is the case with various USB modes. Some different USB modes may validly work together and others may not. FIG. 19 shows an illustrative table showing which USB modes validly work together and which do not. The EHF communication unit may access this table when making the determination at step 1808. As shown in FIG. 19, there is a Received Mode column, a Local Mode column, and a Result column. The result column indicates whether the USB modes identified in the same row can validly work together. The USB modes can include USB 2.0, USB 3.0, and USB 3/2 Auto. USB 3/2 Auto may be switchable USB mode that automatically resolves to use either USB 2.0 or USB 3.0 depending on various factors, as determined by the USB specification.

Referring back to FIG. 18, if, at step 1808, the determination is that both modes cannot validly work together, the process proceeds to step 1806, where the capabilities verification ends. If the determination is that both modes can operate together, the process proceeds to step 1810. At step 1810, a determination is made as to whether the operating mode is a USB mode. If the operating mode is not a USB mode, the process proceeds to step 1812. At step 1812, the received capabilities message may be considered verified and the POC state machine may be advanced to the next transition state (e.g., hold off state, followed by the data transport state). If, at step 1810, it is determined that the operation mode is a USB mode, the process may proceed to step 1814.

At step 1814, the receiver unit may compute a local code for its USB functionality mode. This local code may represent whether the device is a USB client, USB host, USB OTG client, or USB OTG host. This local code may occupy the USB functionality field of a capabilities message. The receiver may calculate its local code by sampling the states of one of the configuration pins (e.g., pin 308) during different stages of the POC state machine and comparing the sampled states to compute the local code. For example, the unit may register the state of one of the configuration pins (e.g., pin 308) during the attentive state and the capabilities message state. The registered states are compared to compute the local code. FIG. 20 shows an illustrative lookup table that may be accessed to compute the local code. Referring now to FIG. 20, values are shown for the configuration pin in the attentive state and the capabilities message state. The values can include 0, 1, FLOAT, and X, which may be akin to a don't care. Thus, as shown, when the pin is 0 at attentive, the computed code may be 00. In another case, when the pin is 1 at attentive, the computed code may be 01. In these two cases, the value of the pin at capabilities message state is not taken into account. If the pin is FLOAT at attentive state and 1 at capabilities message state, then the computed code may be 11. If the pin is FLOAT at attentive state and 0 or FLOAT at capabilities message state, then the computed code may be 10. The computed code can specify the USB mode functionality of the EHF communication unit and it's active connection to a host device. For example, local code of 00 may indicate USB host only mode, a local code of 01 may indicated a USB client only mode, a local code of 10 may indicate an on-the-go Host mode, and a local code of 11 may indicate an on-the-go client mode.

It should be appreciated that a transmitter unit may access the same table as shown in FIG. 20 to determine its USB mode functionality. Upon computing its USB mode functionality, it may include the appropriate code in the capabilities message it transmits to the receiver unit. In particular, it may include that code in message field 1733 of message 1710.

Referring back to FIG. 18, at step 1816, the received USB mode functionality code is compared to the local USB functionality code. Then, at step 1818, an action may be performed based on the comparison of the received code and the local code. For example, FIG. 21 shows illustrative actions that may be taken based on comparisons of the received code and the local code. As shown, some of the comparison results can result in determination of an invalid capabilities message, which can cause the POC state machine to drop out of the capabilities message state and revert back to beacon/listen state. As also shown, some of the comparisons can result in determination of a valid capabilities message. Responsive to a valid capabilities message, the POC state machine may advance to the next state (e.g., hold off state and/or data transport state). Some actions may also include driving one of the configuration pins (e.g., pin 308) to a logic 0 or 1.

It is understood that the steps shown in FIG. 18 are merely illustrative and that the order in which steps are performed can be rearranged, additional steps may be added, and steps may be omitted. For example, steps may be added to compare a received key code to a local key code to assess the validity of the received capabilities message. In addition, additional authentication may be performed during the capabilities message state.

Reference is now made to FIGS. 22-29 for additional discussion on the data transport modes in accordance with various embodiments. As discussed above, the data transport mode for an EHF communication chip is set based on the states of its configuration and control pins (e.g., pins 308-313). When several of such EHF communications chips are used in conjunction with each other, they may enable chip-to-chip contactless communication according to the selected data transport mode. FIGS. 22-29 show different connection diagrams for implementing various data transport modes. Each of the communication units shown in these FIGS. may include an EHF communication unit such as that shown in FIG. 3, and as such, similar component and pin designations may be referred to during the discussion of these FIGS.

Figure 22A:
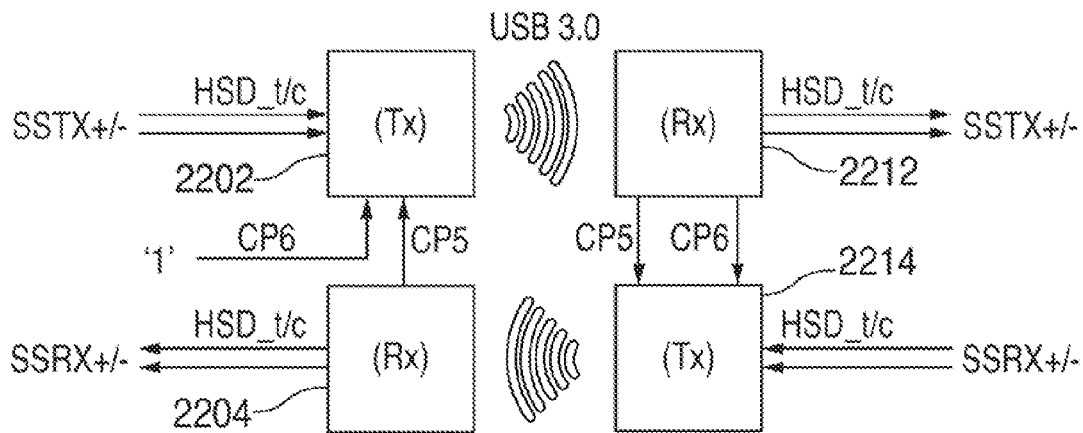
FIGS. 22A-22C show different connection diagrams for EHF chips configured to operate according to one of several different USB modes according to various embodiments.
Figure 22B:
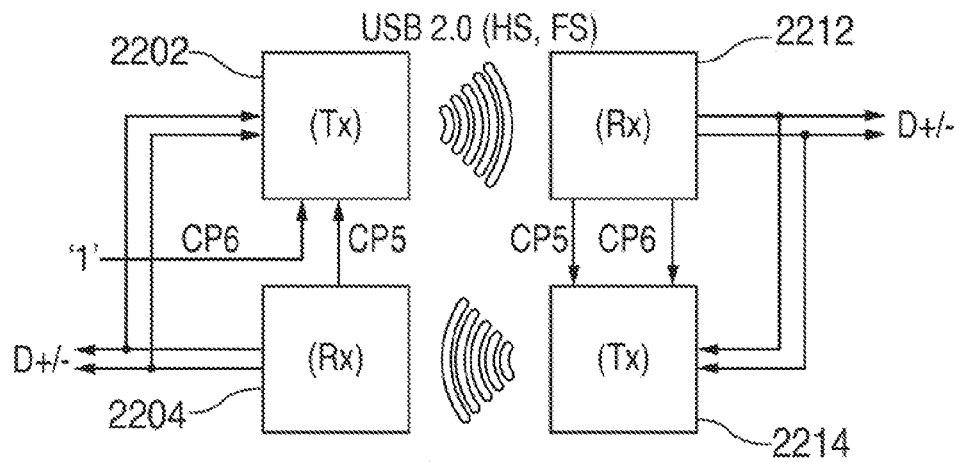
Figure 22C:
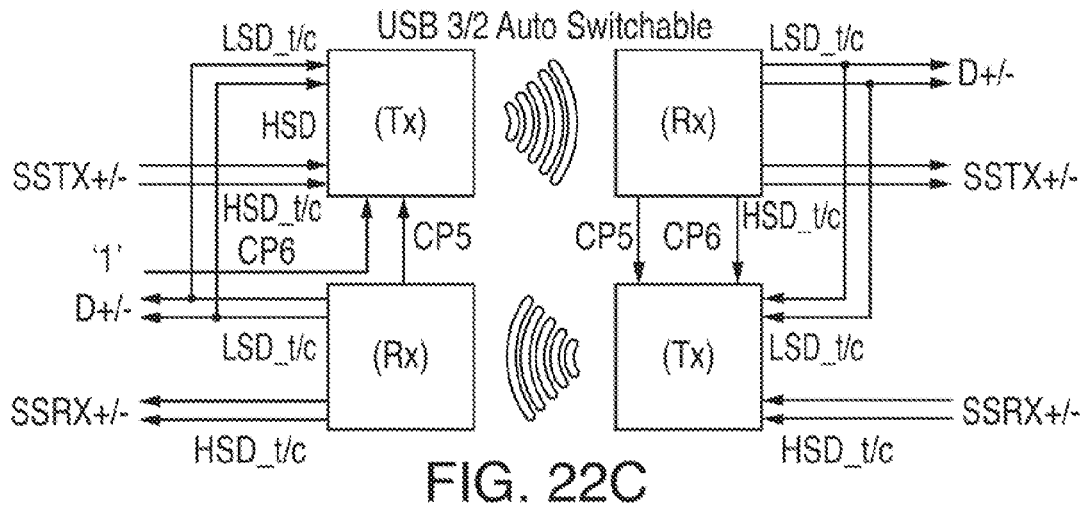

FIGS. 22A-22C show different connection diagrams for EHF chips configured to operate according to one of several different USB modes according to various embodiments. FIG. 22A shows an illustrative connection diagram for a USB 3.0 transport mode. As shown, the high speed data pins are being utilized by each EHF unit. In particular, Super Speed (SS) transmission data, shown as SSTX+/−, may be provided to transmitter unit 2202 via those high speed pins. Unit 2202 may contactlessly transmit that data to receiver unit 2212, which outputs that data via its high speed pins. Super Speed (SS) receive data, shown as SSRX+/−, may be provided to transmitter unit 2214 via high speed pins. Transmitter unit 2214 may contactlessly transmit that received data to receiver unit 2204, which outputs that data via its high speed pins. The CP5 and CP6 pins can be wired as shown.

FIG. 22B shows an illustrative connection diagram for a USB 2.0 data transport mode. As shown, the low speed data pins are being utilized by each EHF unit. In particular, transmission data, shown as D+/−, may be provided to transmitter unit 2202 via those low speed pins. Unit 2202 may contactlessly transmit that data to receiver unit 2212, which outputs that data via its low speed pins. Receiver data, shown as D+/−, may be provided to transmitter unit 2214 via low speed pins. Transmitter unit 2214 may contactlessly transmit that received data to receiver unit 2204, which outputs that data via its low speed pins. The low speed pins, CP5 pins and, CP6 pins can be wired as shown.

FIG. 22C shows an illustrative connection diagram for a USB 3.0/2.0 Auto Switchable data transport mode. As shown, the connection diagram may be a combination of both USB 3.0 and 2.0 transport modes. The high speed pins, low speed pins, CP5 pins and, CP6 pins can be wired as shown. In this mode, either USB 3.0 or USB 2.0 may be selected for data transport, depending on the result of the capabilities message and other input parameters.

Figure 23A:
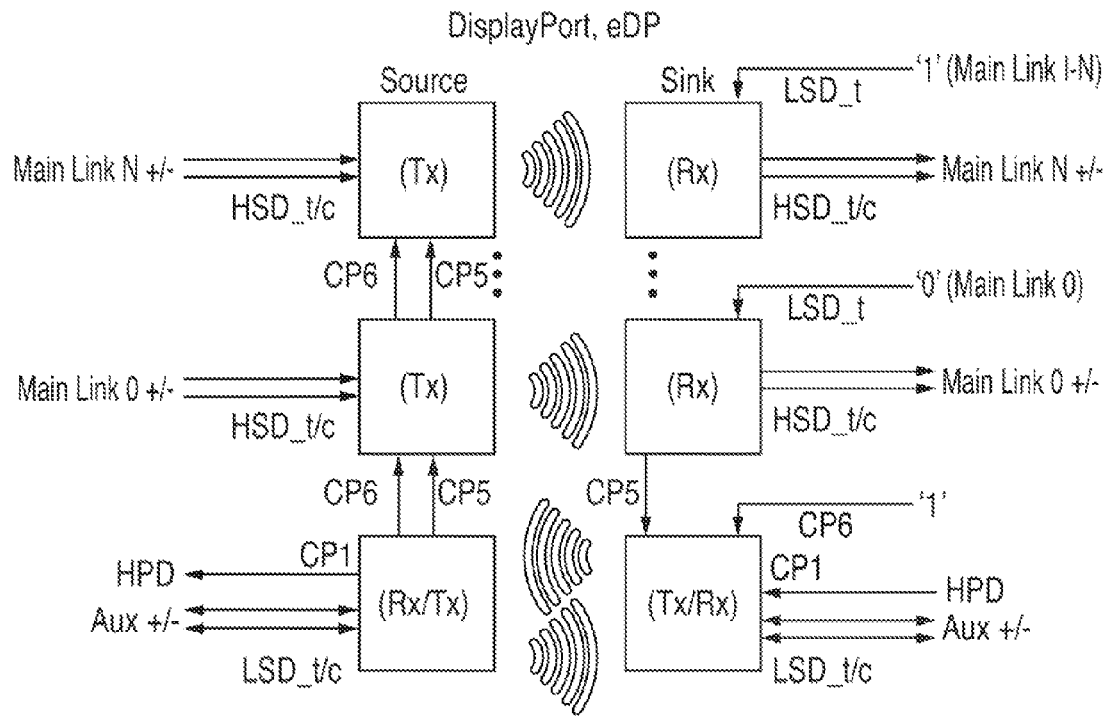
FIGS. 23A and 23B show different connection diagrams for EHF chips configured to operate according to one of several different Display Port modes according to various embodiments.
Figure 23B:
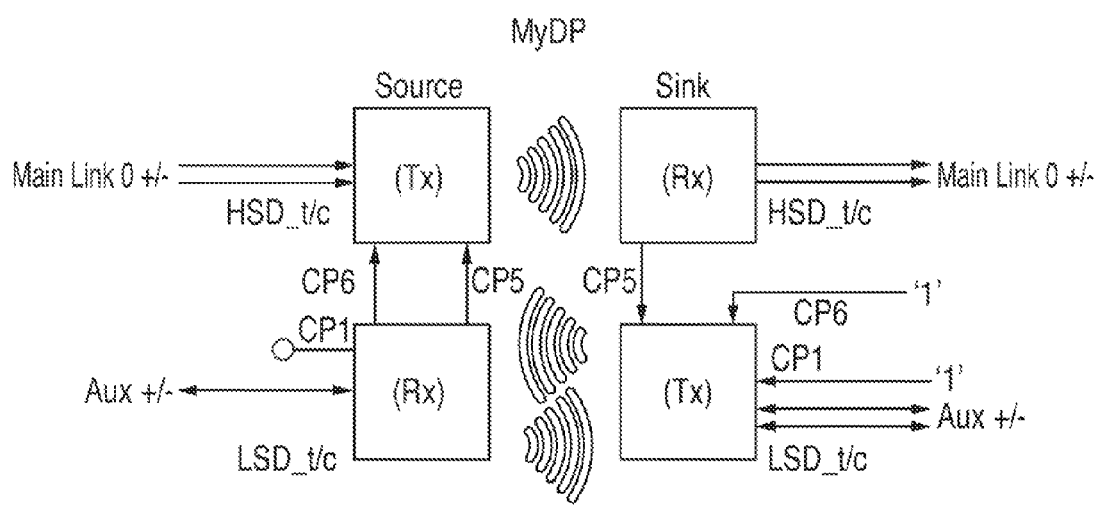

FIGS. 23A and 23B show different connection diagrams for EHF chips configured to operate according to one of several different Display Port modes according to various embodiments. FIG. 23A shows an illustrative connection diagram for a DisplayPort transport mode and an embedded DisplayPort mode. The EHF chips can be designated as a source or sink, as identified by one of the configuration pins (e.g., CP4 pin 311). Any suitable number of EHF chips (e.g., typically 4 chips) may serve as main links and another EHF chip may serve as an auxiliary link. Only two main links are shown and each may receive and/or output data on its high speed pins. Data may pass transparently over the high speed pins. On the sink side, the main link 0 may have its low speed data pin tied to "0" and the main links 1-3 may have their low speed data pins tied to "1". The CP6 and CP5 pins may be connected as shown.

The auxiliary link may operate in a half-duplex, direction-reversing mode of operation. EHF units using the auxiliary link may use their low speed data pins for data I/O and one of their configuration pins (e.g., CP1 pin 308) for a hot plug detect (HPD).

FIG. 23B shows an illustrative connection diagram for a MyDP transport mode. The connection diagram for a MyDP shows a single Main link and an auxiliary link. The main links are tied to the high speed pins (of the host device), as shown. The sink side of the auxiliary link has one of its configuration pins (e.g., CP1 pin 308) tied to logic HIGH and the auxiliary data tied to both low speed pins. The source side of the auxiliary link has one of its configuration pins (e.g., CP1 pin 308) left floating and the auxiliary data is tied to just one low speed pin. The CP5 and CP6 pins can be connected as shown.

Figure 24:
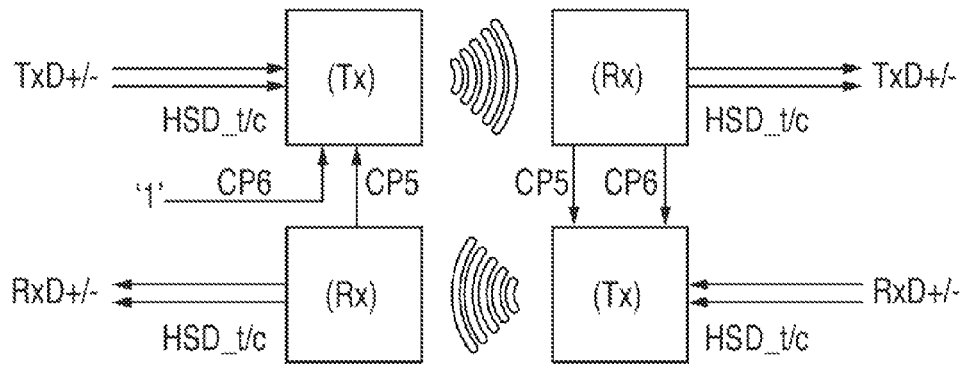
FIG. 24 shows a connection diagram for EHF chips configured to operate according to a SATA or SAS data transport mode, according to an embodiment.

FIG. 24 shows a connection diagram for EHF chips configured to operate according to a SATA or SAS data transport mode. As shown, the connection diagram is similar to the USB 3.0 connection diagram of FIG. 22A, with differences in data being provided to and/or outputted from the EHF communication units.

Figure 25:
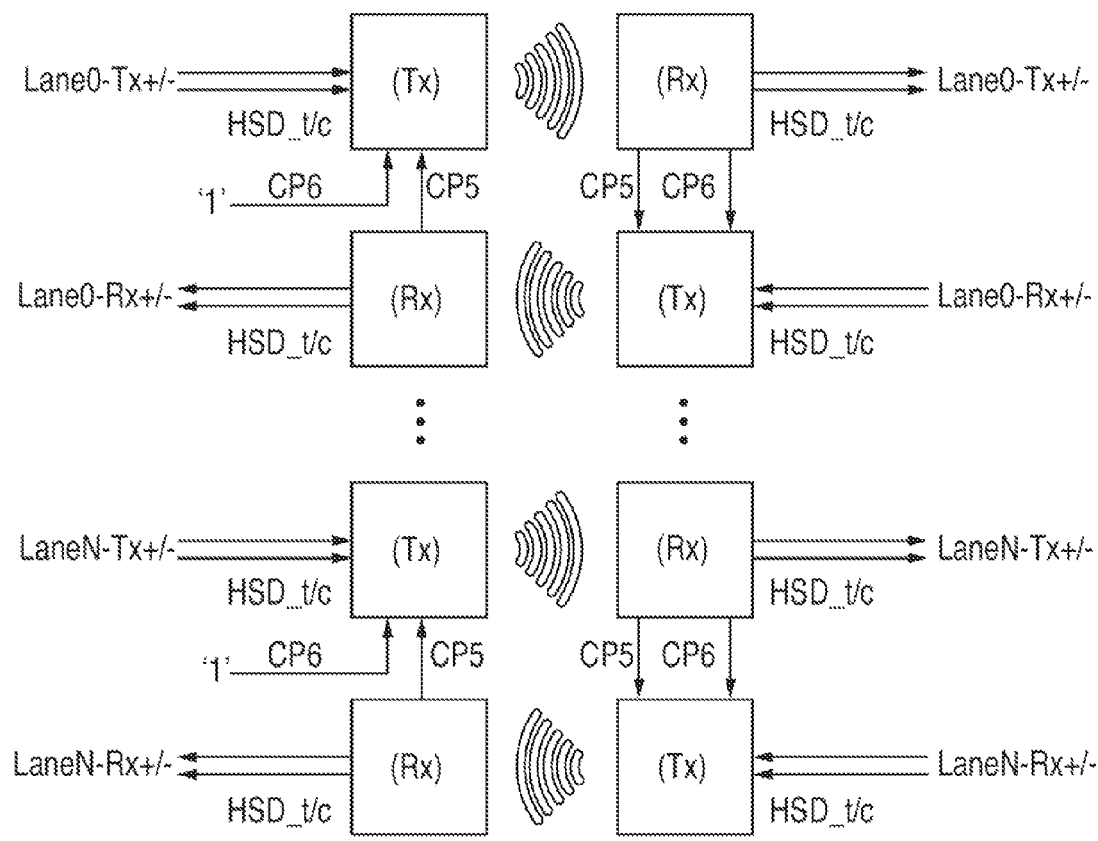
FIG. 25 shows a connection diagram for EHF chips configured to operate according to a multi-lane data transport mode, according to an embodiment.

FIG. 25 shows a connection diagram for EHF chips configured to operate according to a multi-lane data transport mode, such as PCIe. As shown, the connection diagram is similar to the USB 3.0 connection diagram of FIG. 22A, with differences in data being provided to and/or outputted from the EHF communication units, and that multiple instances of the same groups of units are being used. As shown, N lanes of data may be implemented using PCIe transport mode, and each lane may require it own full duplex set of EHF units.

Figure 26:
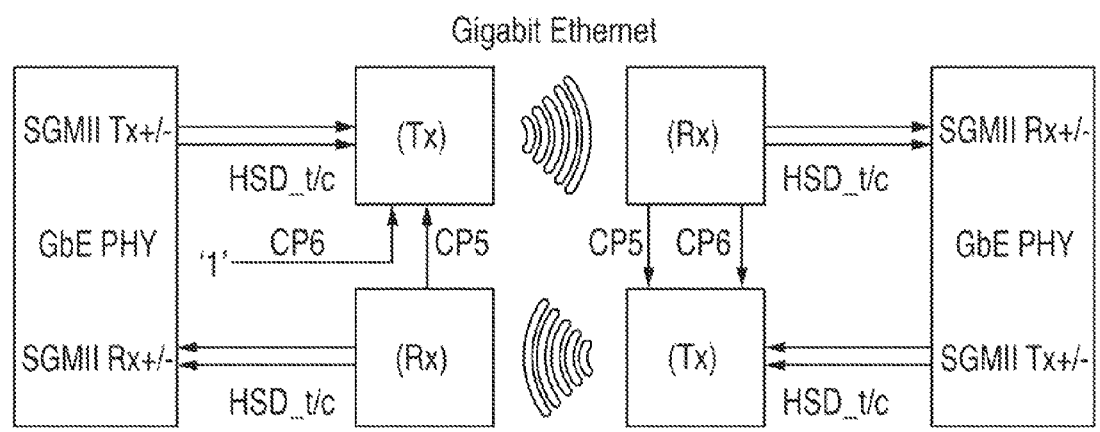
FIG. 26 shows a connection diagram for EHF chips configured to operate according to an Ethernet data transport mode, according to an embodiment.

FIG. 26 shows a connection diagram for EHF chips configured to operate according to an Ethernet data transport mode, such as the Gigabit Ethernet using the SGMII (serial gigabit media independent interface). As shown, the connection diagram is similar to the USB 3.0 connection diagram of FIG. 22A, with differences in data being provided to and/or outputted from the EHF communication units. In addition, FIG. 26 shows the physical layer of the Ethernet.

Figure 27:
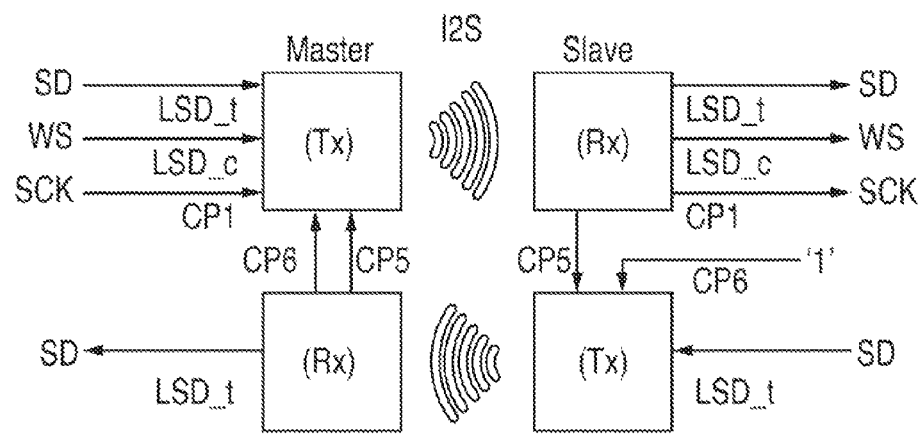
FIG. 27 shows a connection diagram for EHF chips configured to operate according to a I2S data transport mode, according to an embodiment.

FIG. 27 shows a connection diagram for EHF chips configured to operate according to an I2S data transport mode. As shown, the units may be associated with a master or a slave. For example, the master may be associated with devices such as a media player or a telephone, and the slave may be associated with devices such as headphones, a microphone, or a headset. A master transmitter unit may receive serial clock (SCK), serial data (SD), and word sync (WS) signals on its configuration pin (e.g., CP1 pin 308) and low speed pins, respectively. The slave receiver unit may output those same signals to the output pins. The SD and WS signals are clocked into a register with the SCK signal in the slave device, and the register may be asynchronously over-sampled with an internal clock in the slave device.

A slave transmitter unit may transmit SD signals (e.g., input signals or microphone signals) received on one of its low speed data pins to a master receiver unit. The slave transmitter unit and the master receiver unit, as shown here, may operate according to a generic low speed mode, which may be a mode for asynchronously transmitting data. Moreover, in the generic low speed mode, data may be passed transparently through the EHF communication units. In the transmitter device, data is received on one of the low speed data pins and mapped to a 2 level EHF signaling with '1' mapped to full carrier and '0' mapped to partial carrier. A receiver device may receive the 2 level EHF signal and reproduce the original binary stream on one of its low speed data pins.

Figure 28A:
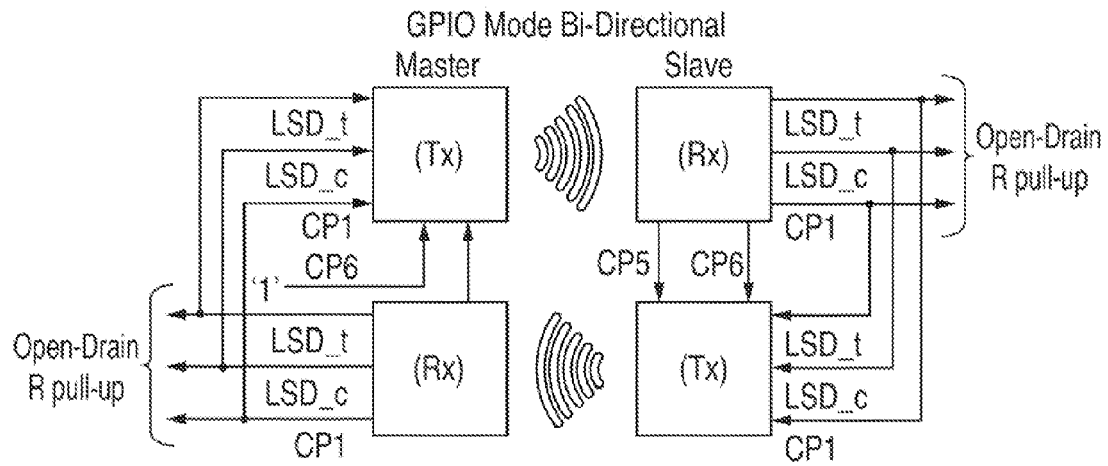
FIGS. 28A-28C show different connection diagrams for EHF chips configured to operate according to a GPIO or I2C transport mode according to various embodiments.
Figure 28B:
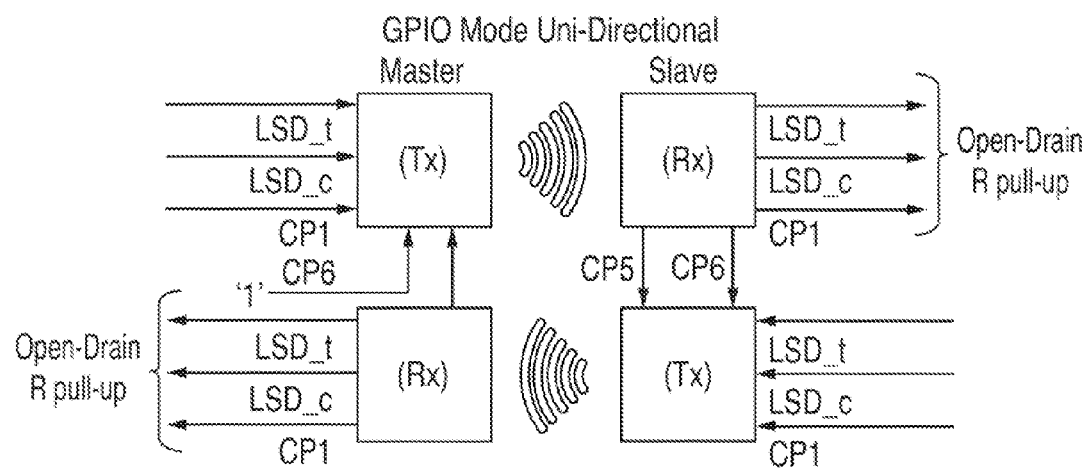
Figure 28C:
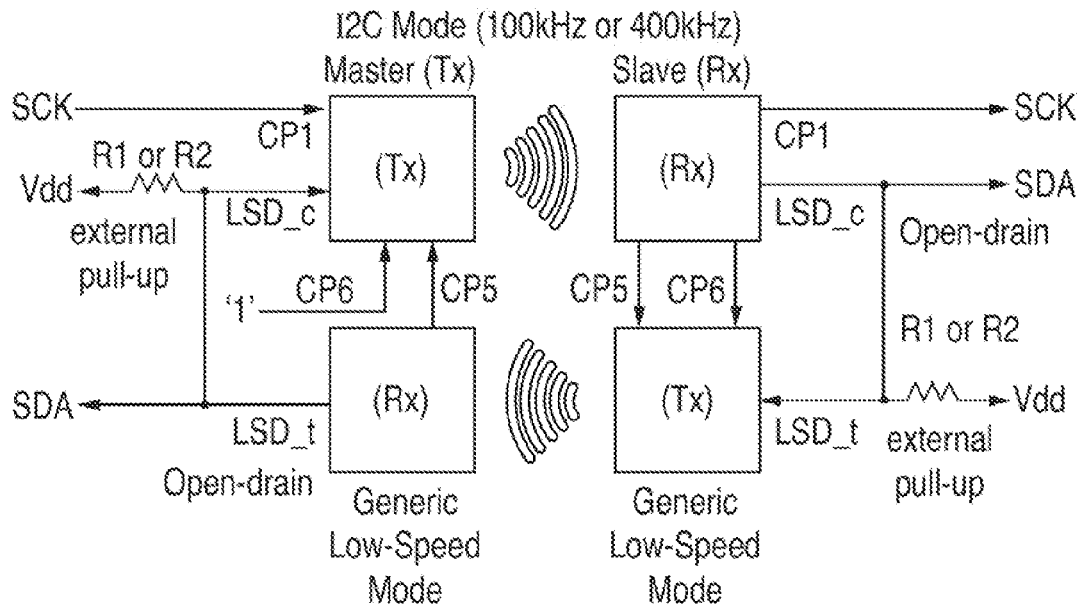

FIGS. 28A-28C show different connection diagrams for EHF chips configured to operate according to a GPIO or I2C transport mode according to various embodiments. In particular, FIG. 28A shows a connection diagram of EHF units wired for a bi-directional GPIO transport mode and FIG. 22B shows a connection diagram of EHF units wired for unidirectional GPIO transport mode. In both of these modes, the low speed pins and one of the configuration pins (e.g., CP1 pin 308) are used as I/O pins. The I/Os of the receiver units in the host device (not shown) may behave as open-drain outputs with fixed resistance internal pull-ups. The I/Os of the transmitter units in the host device (not shown) may function as 2 state inputs.

FIG. 28C shows a connection diagram of EHF units wired for a I2C transport mode. This mode may operate similar to the GPIO mode, but only one of the low speed pins is used and the same configuration pin is used. In addition, external resistance pull-ups (e.g., R1 or R2) can be used in lieu of the internal resistance pull-ups. A complete link may be formed using the units in I2C mode to transport SDA (data) and SCK (clock) master-to-slave, and units in a generic low-speed mode to transport SDA from slave-to-master. In order for the generic low speed mode to be used in support of a I2C transport mode, the low speed pin (e.g., LSD_c pin) on the receiver unit may function as a open-drain output that connected to the input open-drain low speed data pin (e.g., LSD_t pin) of the transmitter unit. These pins may be connected together and externally connected to $V_{DD}$ through a resistor.

Figure 29:
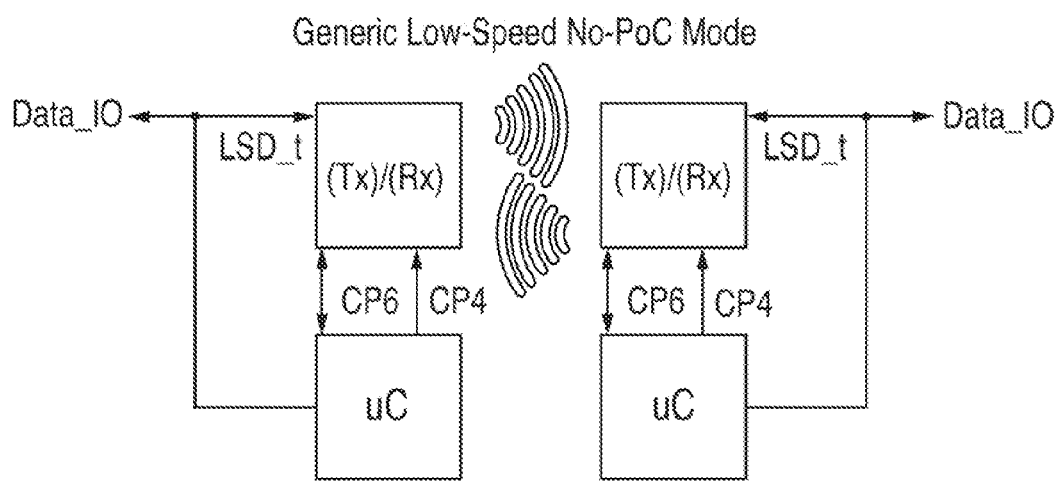
FIG. 29 shows a connection diagram for EHF chips configured to operate according to a generic data transport mode that does not require a progression of consciousness, according to an embodiment.

FIG. 29 shows a connection diagram for EHF chips configured to operate according to a generic data transport mode that does not require a progression of consciousness. This mode may function similar to a generic low speed mode, except that the POC state machine may transition from the CP4 state (e.g., CP4 state 606) to the data transport state (e.g., state 618), thereby bypassing the attentive, link training, and capabilities message states. Such a transition is akin to transition 19 of FIG. 6. In addition, there may be no exit from the data transport state except for a transition to the OFF state. This mode may be used as a stand-alone link that is managed by a microcontroller. The CP6 input may enable EHF on a transmitter unit, and may indicated presence of EHF (either a 0 or a 1) on a receiver unit. For example, when CP6 is HIGH on a transmitter unit, data may be sent as 1 or 0 via EHF signaling, otherwise an EHF Idle signal may be transmitted. The EHF idle signal may be similar to the "keep alive pulse" as discussed above.

Figure 30:
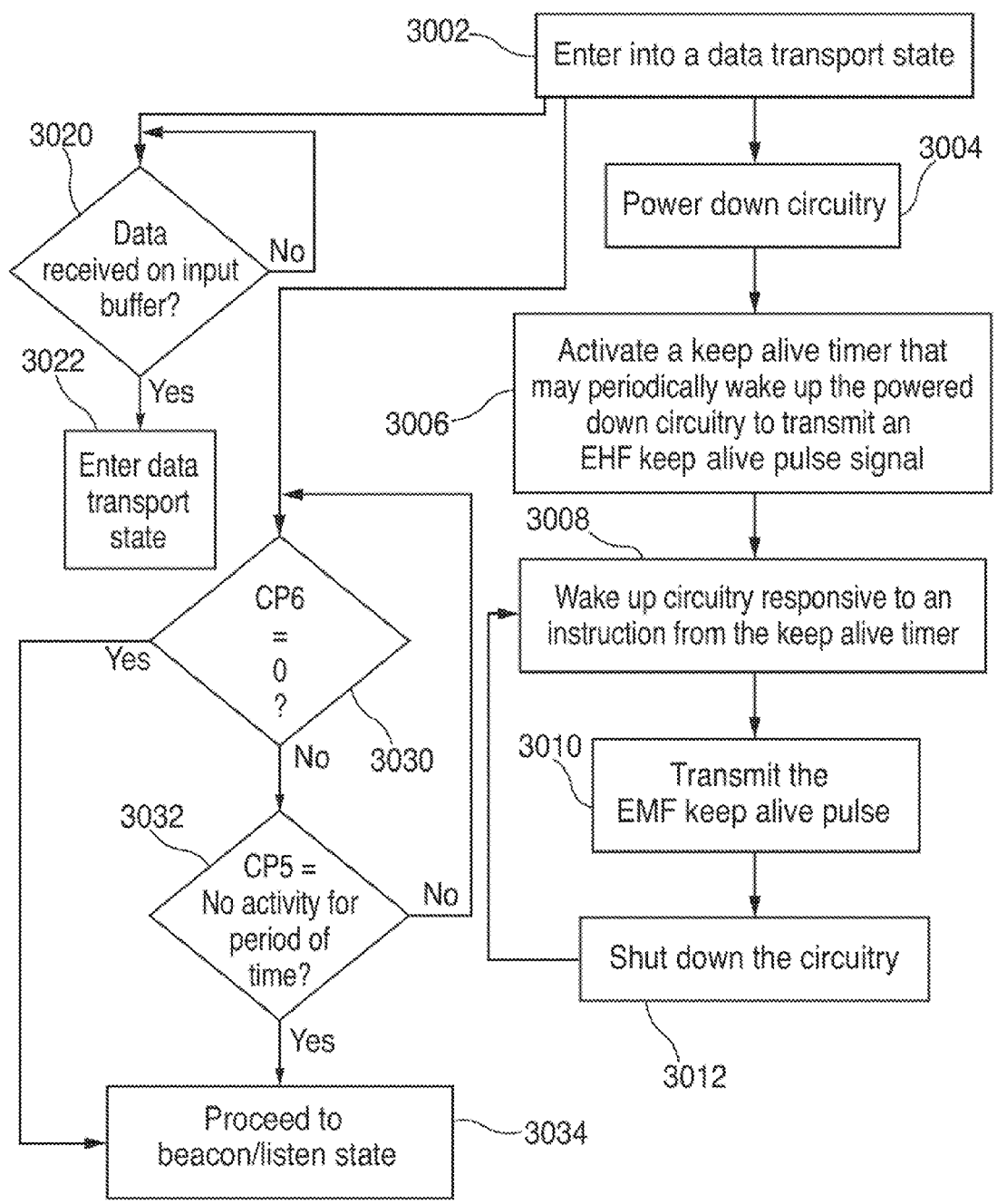
FIG. 30 shows an illustrative flowchart of steps that may be taken by a transmitter unit during a data transport idle state, according to an embodiment.
Figure 31:
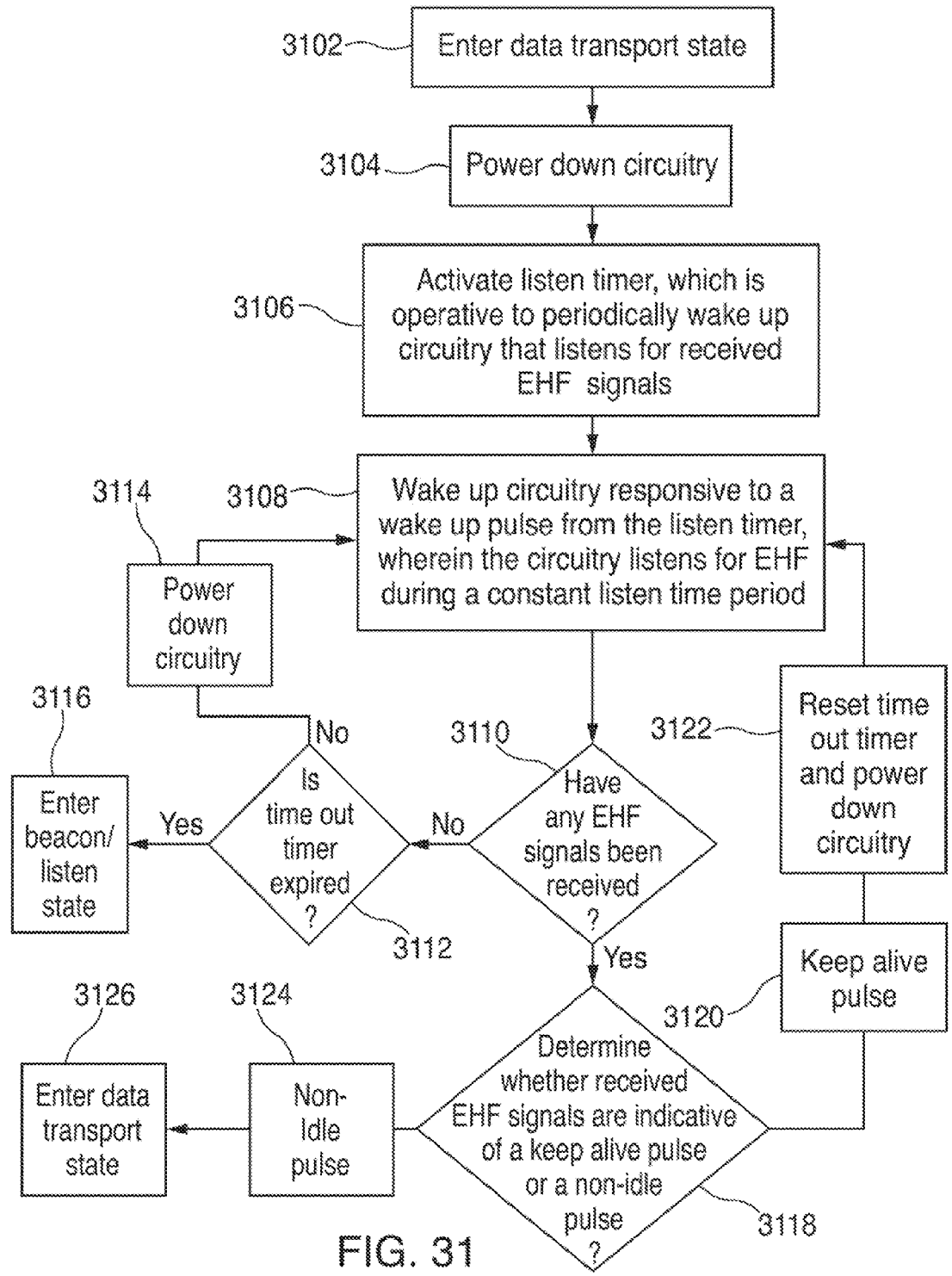
FIG. 31 shows an illustrative flowchart of steps that may be taken by a receiver unit during a data transport idle state, according to an embodiment.
Figure 32:
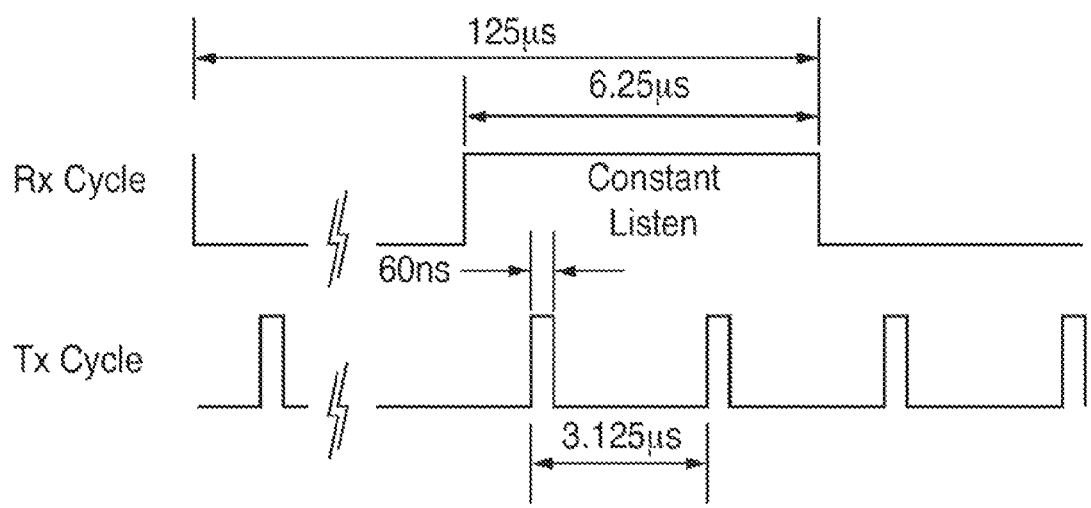
FIG. 32 shows illustrative timing diagrams of a data transport idle keep alive cycle, according to an embodiment.

Reference is now made to FIGS. 30-32 to discuss in more detail the data transport idle state according to various embodiments. FIG. 30 shows an illustrative flowchart of steps that may be taken by a transmitter unit during the data transport idle state. FIG. 31 shows an illustrative flowchart of steps that may be taken by a receiver unit during the data transport idle state. FIG. 32 shows illustrative timing diagrams of a data transport idle keep alive cycle. In general, as previously discussed above, the data transport idle state may enable quick entry and exit low power states for one or more data transport modes (e.g., USB 2.0, USB 3.0, and Display-Port).

Beginning with step 3002 in FIG. 30, a transmitter unit may have entered into a data transport idle state. The conditions for entering into the data transport idle state were discussed above in connection with FIG. 6. At step 3004, various circuitry, including circuitry operative for transmitting EHF signals, may be powered down. In some embodiments, the circuitry being shut down can be the same circuitry that is powered down during when the unit is in the beacon/listen state. Then, at step 3006, a keep alive timer may be activated. The keep alive timer may periodically wake up the powered down circuitry to enable that circuitry to transmit an EHF keep alive pulse signal (discussed below). At step 3008, circuitry may wake up responsive to an instruction from the keep awake timer, and at step 3010, that circuitry may transmit the EHF keep alive pulse. The EHF keep alive pulse may include a series of 1's that span a fixed number of clock cycles (e.g., 16 clock cycles) every fixed period of time (e.g., every 3.125 µs). Examples of this EHF keep alive pulse are shown in FIG. 32. After the EHF keep alive pulse is transmitted, the circuitry is shut down, as indicated by step 3012. After the circuitry is shutdown, the process may loop back to step 3008. The transmitter unit may continue transmitting EHF keep alive pulses until it returns to the data transport state or the beacon/listen state. These transitions are now discussed.

The flowchart may have two other loops that are running concurrent with the keep alive timer loop. For example, one of the other loops transitions to step 3020 from step 3002. At step 3020, a determination is made as to whether any data is received on an input buffer. For example, the transmitter unit may determine whether any data has been received on it high speed or low speed data pins. If no data is received, the process loops back to step 3020. If data is received, the transmitter unit may enter into the data transport state.

The other one of the loops begins at step 3030. At step 3030, a determination is made whether the transmitter unit's CP6 pin has gone to '0'. If not, the process proceeds to step 3032, which determines whether the transmitter unit's CP5 pin has remained at 0 for a certain predefined period of time. If not, the process proceeds back to step 3030. If, at step 3030, the determination was yes, the process may proceed to step 3034, which may cause the unit to enter into the beacon/listen state. If, at step 3032, the determination is yes, the process may proceed to step 3034.

Beginning with step 3102 in FIG. 31, a receiver unit may have entered into a data transport idle state. The conditions for entering into the data transport idle state were discussed above in connection with FIG. 6. At step 3104, various circuitry, including circuitry operative to for detecting presence of EHF signals, may be powered down. In some embodiments, the circuitry being shut down can be the same circuitry that is powered down during when the unit is in the beacon/listen state. Then, at step 3106, a listen timer may be activated. The listen timer may periodically wake up the powered down circuitry to enable that circuitry to listen for EHF signals. At step 3108, circuitry may wake up responsive to an instruction from the listen timer, such that the circuitry can listen for EHF signals during a constant listen time period every fixed period of time. The constant listen time period may be set by the listen timer. For example, the listen time may cause the circuitry to listen for EHF signals for 6.25 µs every 125 µs. An examples of this receiver listen pulse is shown in FIG. 32.

At step 3110, a determination is made as to whether any EHF signals have been received. If no EHF signals have been received, the process may proceed to step 3112, which checks whether a time out timer has timed out. The time out timer may control whether receiver should transition to the beacon/listen state due to non-occurrence of EHF activity. Thus, if the time out timer has timed out, then the receiver unit may enter the beacon/listen state, as shown in step 3116, but if the timer has not timed out, the process may proceed to step 3114. At step 3114, the circuitry may be powered down, and the process may loop back to step 3108. If, at step 3110, EHF signals have been received, the process may proceed to step 3118.

At step 3118, a determination is made whether the received EHF signals are indicative of a keep alive pulse or a non-idle pulse. This determination may be based on a burst length of the received EHF signals. The received EHF signals may include a series of 1's and/or 0's that are grouped together to form a burst. If the burst length of the received signals exceeds a non-idle time threshold, then the received EHF signals may be classified as a non-idle pulse and the process can proceed to step 3124 and then enter into the data transport state, at step 3126. If the burst length of the received signals includes a burst of 1's that falls within a keep alive pulse time range, then the received EHF signals may be classified as a keep-alive pulse. The keep alive pulse time range may include a lower time bound and an upper time bound centered around the pulse length of the EHF keep-alive pulse signal. For example, if the pulse length of the EHF keep-alive pulse signal is 60 ns, the lower time boundary may be 40 ns and the upper time boundary may be 80 ns. The idle time threshold may be greater than the upper time boundary of the keep alive pulse range. For example, the idle time threshold may be 1.2 µs. Upon determining that the received EHF signals are keep-alive pulse, the process may proceed to step 3120, and then proceed to step 3122, which resets the time out timer, before looping back to step 3108.

FIG. 32 shows illustrative timing diagrams of an idle keep-alive cycle for both transmitter and receiver units. The Tx cycle shows illustrative keep-alive pulses having a pulse width of about 60 ns every 3.125 µs. The Rx cycle shows illustrative listen cycle in which the receiver circuitry listens for EHF signals during the constant listen period for every listen cycle.

Reference is now made to FIGS. 33-36 to discuss an alternative approach to establishing an EHF communications link between two EHF communication units, according to an embodiment. This alternative approach differs from the approach discussed above in connection with FIG. 9 in that the wake up loop only requires two EHF communication units to establish an EHF communications link. This approach eliminates the need for a wake up loop to use both wired and contactless connections to communicate data and signals between EHF communications units. Thus, in this approach the two EHF communication units may directly communicate with each other using contactless EHF signals to establish the link.

Figure 33:
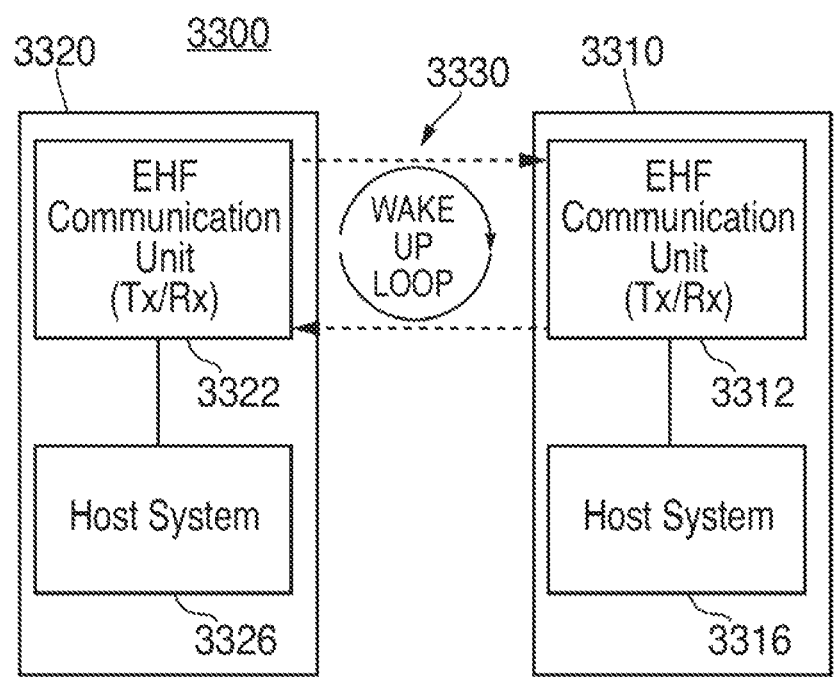
FIG. 33 illustrates a communications system wherein two electronic devices communicate with one another over a contactless communications link, according to an embodiment.

FIG. 33 illustrates a communications system 3300 wherein two electronic devices 3310 and 3320 may communicate with one another over a contactless communications link, according to an embodiment. System 3300 may be similar to systems 100 and 200 in many respects. First device 3310 may include EHF communication unit 3312 and host system 3316. Host system 3316 may communicate with EHF communication unit 3312. Similarly, second device 3320 may include EHF communication unit 3322 and host system 3326. Host system 3326 may communicate with EHF communication unit 3322. Host systems 3316 and 3326 may be similar to host systems 104 and 124, both of which include circuitry specific to their respective devices and thereby enable devices 3310 and 3320 to operate for their intended functionality.

In some embodiments, each of EHF communication units 3312 and 3324 can be the same as EHF communication unit 106 or 126, discussed above. As such, EHF communication units 3312 and 3324 include transceivers capable of transmitting and receiving EHF signals, and thus can conduct bi-directional EHF communications. This bi-directional EHF communications link is shown as contactless communications link 3330. As also shown, a single link wake-up loop only includes EHF communication units 3312 and 3322, and link 3330.

In order for devices 3310 and 3320 to communicate with each other via link 3330, EHF units 3312 and 3322 may have to progress through a series of steps before data can be transferred between the devices. These steps may be controlled by one or more state machines. The state machines may be similar to the progression of consciousness (POC) state machine, as discussed above. In some embodiments, each of units 3312 and 3322 may progress through the same states as POC state machine, but differ in how state change notifications are provided and the conditions for satisfying one or more of the states may also be different. For example, the POC state machine operating in connection with the system of FIG. 9 uses wired paths to communicate state notifications, whereas a POC state machine operating in connection with FIG. 33 does not use any wired paths to communicate state notifications, but only uses communications link 3330 to provide state change notifications. Moreover, because no wired paths are being used to propagate state changes, EHF communication units 3312 and 3322 may take turns transmitting and receiving EHF signals over communications link 3330.

The single link wake-up loop employed in system 3300 may require each of EHF communication units 3312 and 3322 to switch between transmitter and receiver modes. For example, if a unit (e.g., 3313) is in a first state and is transmitting data via link 3330, that unit may operate in a transmitter mode to transmit the data for a first period of time, and then switch to a receiver mode to listen for data that may transmitted by the other unit for a second period of time. After the second period of time lapses, the unit may switch back to the transmitter mode, and repeat this cycle until a condition is satisfied that causes the unit to switch to a different state. For example, the unit may transition to a different state if a notification is received when it is operating in the receiver mode.

Figure 34:
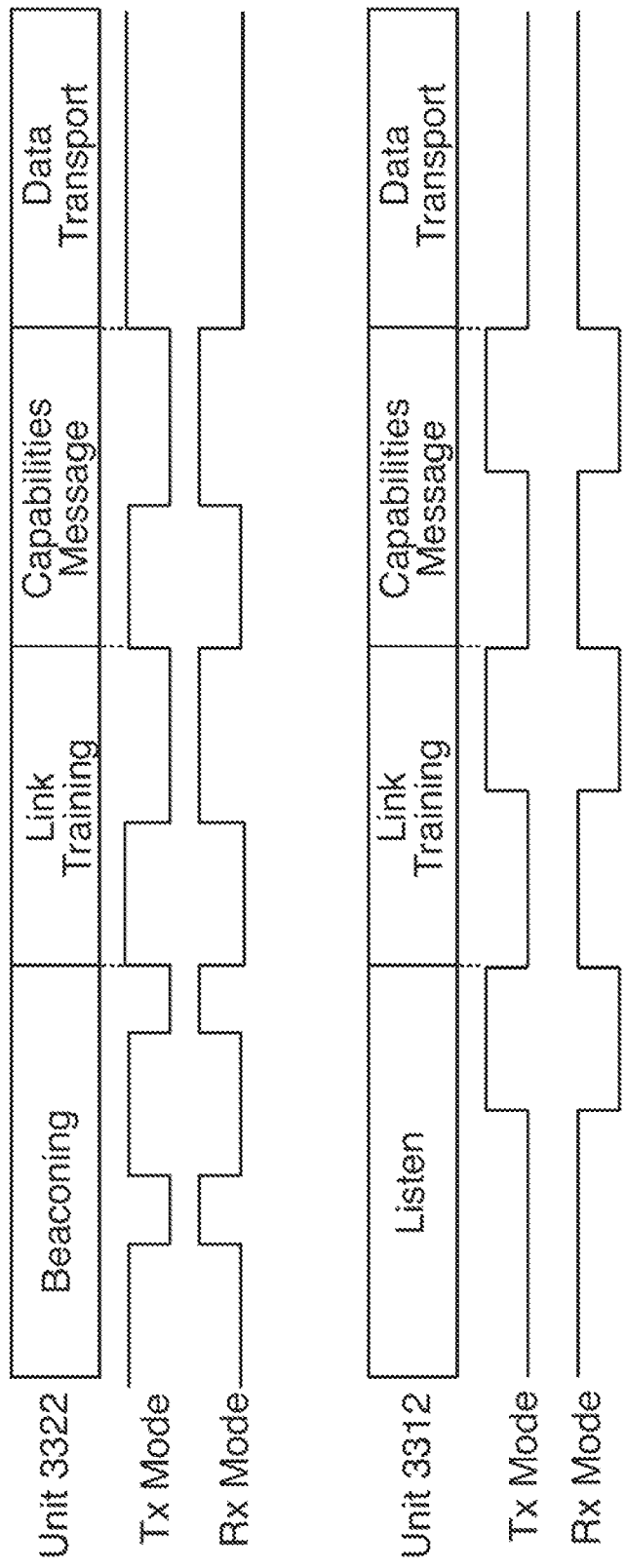
FIG. 34 shows an illustrative timing diagram, according to an embodiment.

FIG. 34 shows an illustrative timing diagram showing the POC states of units 3310 and 3320 and the transmitter and receiver modes of operation, according to an embodiment. As shown, units 3322 and 3312 transition through the beaconing or listening, link training, capabilities message, and data transport states. For each state, the timing diagram shows the Tx and Rx modes of operation for each unit. The Tx and Rx modes of operation are merely illustrative, however, the FIG. does show how each unit can switch between modes during one or more states. In addition, the modes of operations illustrate how each unit operates its transceiver in order to progress through its respective POC state machine. For example, unit 3322 is shown to switch between modes in the beaconing state. In the transmit mode, unit 3322 may transmit an EHF signal, and in the receive mode signal, unit 3322 may listen for a signal to determine whether to transition to the link training state. Continuing with this example, unit 3312 may be in a listen state, wherein in a receive mode it listens for EHF signals, and in a transmit mode, it can transmit an EHF signal acknowledging it has received the EHF signals. It may also transition to the link training state. When unit 3322 receives the acknowledgment signal from unit 3312, it too may transition to the link training state. This cycle of switching between modes to advance through states may continue until both units enter into the data transport state or fail out of progression due to one or more factors.

Figure 35:
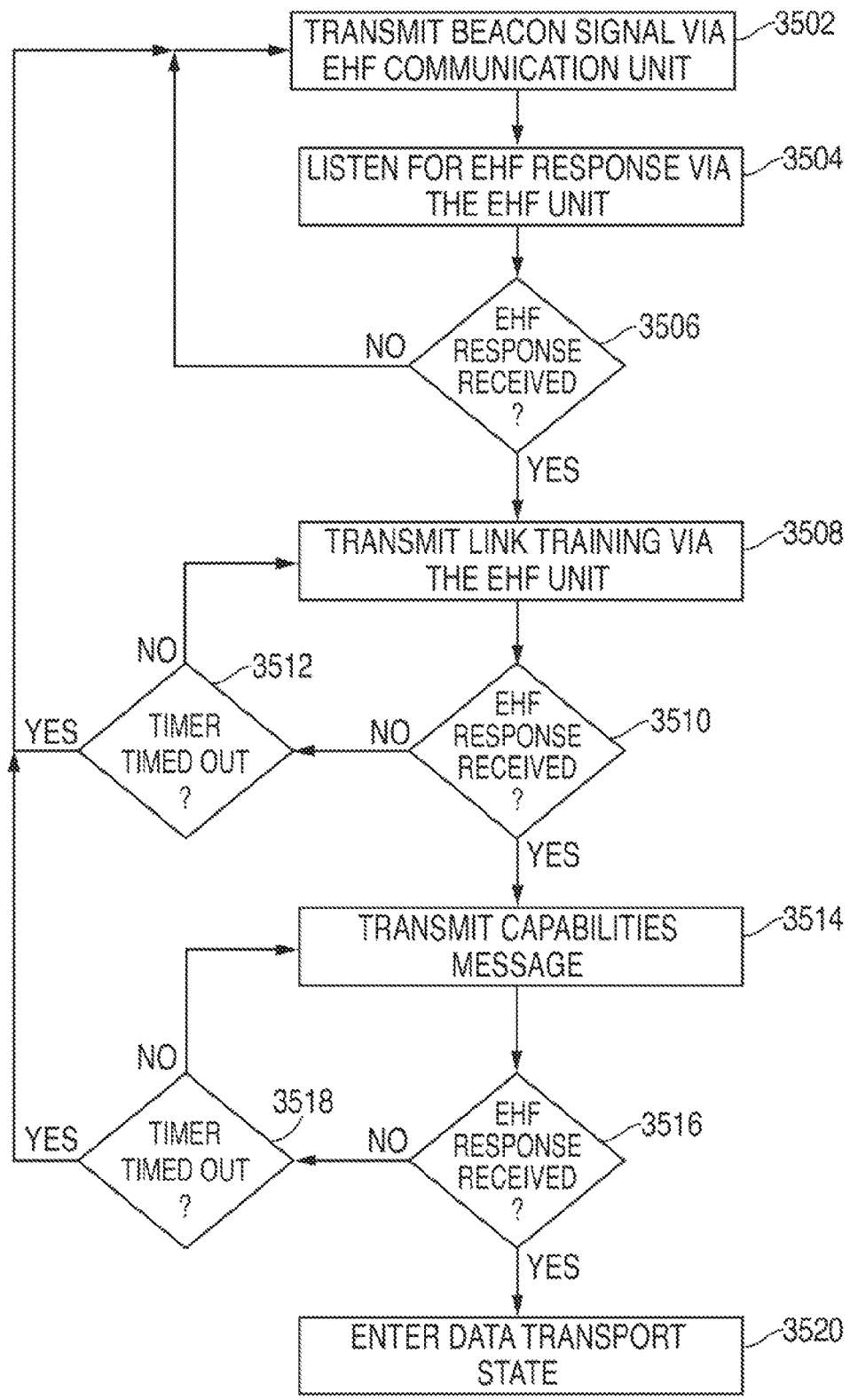
FIG. 35 shows an illustrative flowchart of steps that may be taken by an EHF communication unit that is operating primarily as a transmitter unit according to an embodiment.

FIG. 35 shows an illustrative flowchart of steps that may be taken by an EHF communication unit (e.g., unit 3322) that is operating primarily as a transmitter unit according to an embodiment. It is understood that although this unit is operating primarily as a transmitter unit, it can also operate as a receiver unit to receive signals from another unit (e.g., unit 3312). Starting at step 3502, a beacon signal can be transmitted by an EHF communication unit (e.g., unit 3322). Here, the unit is operating in a transmitter mode. At 3504, the EHF unit may listen for an EHF response from another unit (e.g., unit 3312). Here the unit is operating in a receiver mode. At step 3506, a determination is made whether an EHF response is received. If NO, the flowchart reverts back to step 3502. If YES, the flowchart proceeds to step 3508, where the EHF unit can transmit link training data. In this step, the unit is operating in a transmitter mode.

At step 3510, a determination is made as to whether an EHF response is received. In this step, the unit is operating a receiver mode. If the determination is NO, the process proceeds to step 3512, which makes a determination if a timer has timed out. If the timer has not timed out, the process returns to step 3508. If the timer has timed out, the process can return to step 3502. If the determination at step 3510 is YES, the process can proceed to step 3514, where the EHF unit transmits a capabilities message. At step 3516, a determination is made whether an EHF response is received. If the determination is NO, the process can proceed to step 3518, which makes a determination if a timer has timed out. If the timer has not timed out, the process returns to step 3514. If the timer has timed out, the process can return to step 3502. If the determination at step 3516 is YES, the process can proceed to step 3514, where the unit can enter into a data transport state.

Figure 36:
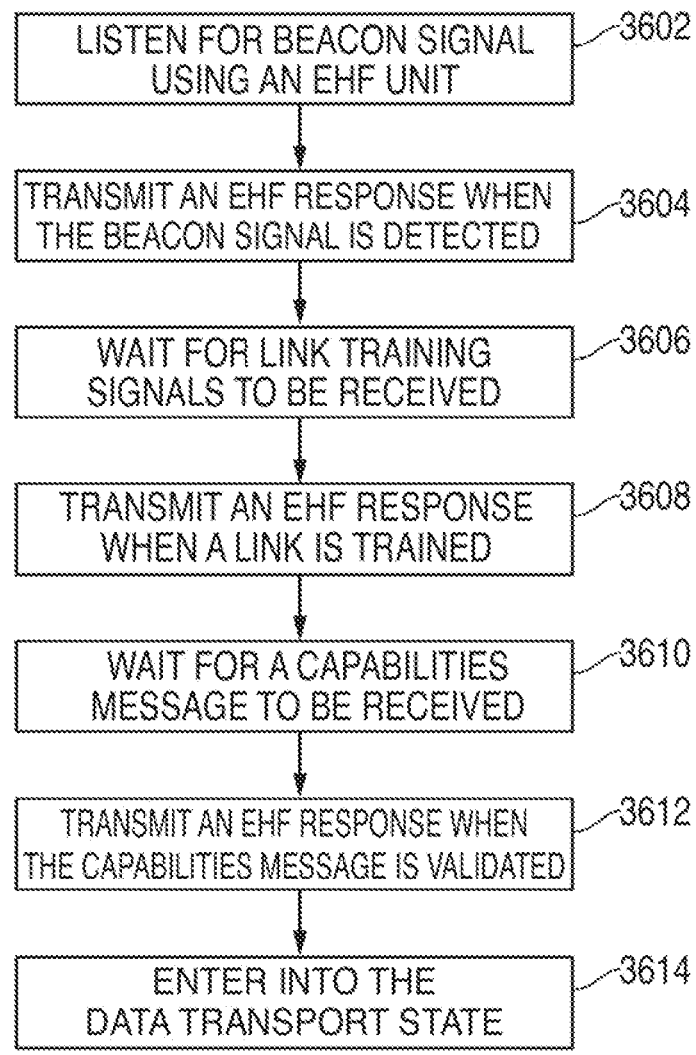
FIG. 36 shows an illustrative flowchart of steps that may be taken by an EHF communication unit that is operating primarily as a receiver unit according to an embodiment.

FIG. 36 shows an illustrative flowchart of steps that may be taken by an EHF communication unit (e.g., unit 3312) that is operating primarily as a receiver unit according to an embodiment. It is understood that although this unit is operating primarily as a receiver unit, it is can also operate as a transmitter unit to receive signals from another unit (e.g., unit 3322). Starting at step 3602, an EHF unit can listen for a beacon signal. In this step, the EHF unit may be operating in a receiver mode. At step 3604, the EHF unit may switch to a transmitter mode and transmit an EHF response signal when the beacon signal is detected. At step 3606, the EHF unit may switch back to a receiver mode and wait for a link training signals to be received. At step 3608, the EHF unit may switch to a transmitter mode and transmit an EHF response signal when a link is trained.

At step 3610, the EHF unit may switch back to the receiver mode and wait for a capabilities message to be received. At step 3612, the EHF unit may switch to the transmitter mode and transmit an EHF response signal when the capabilities message is validated. At step 3614, the unit may enter into the data transport state.

Paragraph 1: A system including:
    first and second devices each including a plurality of contactless communication units, wherein each communication unit is operative to execute its own state machine to enable at least one contactless communications link between the first and second devices, and wherein the state machines transition their respective communication units through a plurality of states to establish at least one contactless communications link.

Paragraph 2: The system of paragraph 1, wherein a wake up loop defining upstream and downstream relationships exists among the plurality of contactless communication units.

Paragraph 3: The system of paragraph 2, wherein the upstream communication unit provides a signal to a downstream communication unit.

Paragraph 4: The system of paragraph 3, wherein when the upstream communication unit is a transmitter unit, and the downstream communication unit is a receiver unit, the signal is communicated via an extremely high frequency (EHF) contactless connection.

Paragraph 5: The system of paragraph 3, wherein when the upstream communication unit is a receiver unit, and the downstream communication unit is a transmitter unit, the signal is communicated via a wired connection.

Paragraph 6: The system of paragraph 2, wherein a state transition of any downstream communication unit depends on a signal of it upstream communication unit.

Paragraph 7: The system of paragraph 1, wherein a failure to satisfy a condition for any state transition for any state machine causes that state machine to revert back to an initialization state.

Paragraph 8: The system of paragraph 1, wherein the plurality of states comprises an initialization state, a link training state, a capabilities message state, and the data transport state.

Paragraph 9. The system of paragraph 8, wherein the initialization state comprises a beaconing state.

Paragraph 10: The system of paragraph 8, wherein the initialization state comprises a listening state.

Paragraph 11: A system including:

a plurality of contactless communication units arranged in a wake up loop via a combination of wired and contactless connections; and wherein each contactless communication unit uses the wake up loop to transition through a plurality of states to establish at least one EHF communications link.

Paragraph 12: The system of paragraph 11, further including:

a first device comprises at least two of the plurality of contactless communication units; and a second device including at least two of the plurality of contactless communication units, wherein the wired connections enable intra-device communication among the communication units, and wherein the contactless connections enable inter-device communication among the communication units.

Paragraph 13: The system of paragraph 12, wherein the at least two of the plurality of contactless communication units of the first device comprise a first receiver unit and a first transmitter unit, wherein the first receiver and transmitter units communicate with each other via at least a first wired connection, wherein the least two of the plurality of contactless communication units of the second device comprise a second receiver unit and second transmitter unit, wherein the second receiver and transmitter units communicate with each other via at least a second wired connection, wherein the first transmitter unit communicates with the second receiver unit via a first contactless connection, and wherein the second transmitter unit communicates with the first receiver unit via a second contactless connection.

Paragraph 14: The system of paragraph 11, wherein execution of a state transition for any communication unit depends on a signal provided by an upstream communication unit arranged immediately before it according to the wake up loop.

Paragraph 15: The system of paragraph 14, wherein when the upstream communication unit is a transmitter unit, the transmitter unit communicates the signal via the contactless connection.

Paragraph 16: The system of paragraph 14, wherein when the upstream communication unit is a receiver unit, the receiver unit communicates the signal via the wired connection.

Paragraph 17: The system of paragraph 11, wherein the plurality of states comprises a link training state, a capabilities messaging state, and a data transporting state.

Paragraph 18: A contactless communications receiver unit (CCRU) for use in establishing a contactless communications link with a first contactless communications transmitter unit and for use in communicating with at least a second contactless communications transmitter unit via at least one wired path, the contactless communication receiver unit including:

a plurality of pins, wherein at least a first pin is used to communicate with the second transmitter unit via a wired path;

a transducer for receiving extremely high frequency (EHF) contactless signals from the first transmitter unit; and circuitry operative to:

execute a CCRU state machine that tracks a state of the CCRU during the establishment of the contactless communications link, wherein the state machine transitions through a plurality of states in response to signals received by the transducer; and selectively drive a signal on the at least one pin used to communicate with the second transmitter unit in response to a state transition.

Paragraph 19: The contactless communications receiver unit of paragraph 18, wherein the plurality of states comprises a link training state, a capabilities state, and a data transport state.

Paragraph 20: The contactless communications receiver unit of paragraph 19, wherein the state machine transitions to the link training state when the transducer receives a beacon signal.

Paragraph 21: The contactless communications receiver unit of paragraph 19, wherein the state machine transitions to the capabilities after the contactless communications link between the CCRU and the first contactless communications transmitter unit is trained.

Paragraph 22: The contactless communications receiver unit of paragraph 19, wherein the state machine transitions to the data transport state after a capabilities message is received from the first contactless communications transmitter unit and validated by the CCRU.

Paragraph 23: The contactless communications receiver unit of paragraph 22, wherein the plurality of states comprise a holdoff state, wherein the state machine transitions from the capabilities message state to the holdoff state before transitioning to data transport state.

Paragraph 24: The contactless communication receiver of paragraph 19, wherein the plurality of states comprise a data transport idle state, wherein the state machine transitions from the data transport state to the data transport idle state to save power.

Paragraph 25: The contactless communications receiver unit of paragraph 19, wherein the plurality of states comprise at least one initialization state, and wherein the circuitry is operative to drive a signal on a second pin that is used to communicate with the second transmitter unit in response to state transition from the at least one initialization state to the link training state.

Paragraph 26: The contactless communications receiver unit of paragraph 18, wherein the plurality of pins comprise at least one transport mode selection pin, wherein the contactless communications link transports data according to a transport mode set by the at least one transport mode selection pin.

Paragraph 27: The contactless communications receiver unit of paragraph 19, wherein the data transport mode is a standards based transport mode.

Paragraph 28: A contactless communications transmitter unit (CCTU) for use in establishing a contactless communications link with a first contactless communications receiver unit and for use in communicating with a second contactless communications receiver unit via at least one wired path, the contactless communication transmitter unit including:
 a plurality of pins, wherein at least one pin is used to communicate with the second receiver unit via a wired path;
 a transducer for transmitting extremely high frequency (EHF) contactless signals to the first receiver unit;
 circuitry operative to:
  execute a CCTU state machine that tracks a state of the CCTU during the establishment of the contactless communications link, wherein the state machine transitions through a plurality of states in response to signals received by the at least one pin; and
  selectively transmit EHF signals, using the transducer, in response to a state transition.

Paragraph 29: The contactless communication transmitter unit of paragraph 28, wherein the at least one pin is used to communicate with the second receiver unit via the wired path is an inter chip communications pin.

Paragraph 30: The contactless communication transmitter unit of paragraph 29, wherein the inter chip communications pin receives a signal that causes the state machine to transition to a new state.

Paragraph 31: The contactless communications transmitter unit of paragraph 28, wherein the selectively transmitted EHF signal determines a future state of the state machine.

Paragraph 32: The contactless communications transmitter unit of paragraph 28, wherein a signal received by the at least one pin is derived from a state change transition in the CCTU state machine.

Paragraph 33: The contactless communications transmitter unit of paragraph 28, wherein the CCTU is part of a wake up loop including at least the first and second receiver units, the CCTU, and a second transmitter unit, the second transmitter operatively coupled to the first and second receiver units.

Paragraph 34: The contactless communications transmitter unit of paragraph 33, wherein the CCTU state machine uses the wake up loop to advance state change transitions.

Paragraph 35: The contactless communication transmitter unit of paragraph 28, wherein the plurality of states comprises at least one initialization state, wherein one of the plurality of pins is a beacon enable pin, and wherein when the beacon enable pin is driven HIGH, the state machine transitions to the at least one initialization state.

Paragraph 36: The contactless communication transmitter unit of paragraph 35, wherein when the beacon enable pin is driven LOW, the state machine transitions to an OFF state.

Paragraph 37: The contactless communication transmitter unit of paragraph 35, wherein the at least one initialization state comprises a beaconing state that causes the circuitry to emit a beaconing EHF signal via the transducer.

Paragraph 38: The contactless communication transmitter unit of paragraph 28, wherein the plurality of states comprises a link training state, a capabilities state, and a data transport state.

Paragraph 39: A method for establishing an EHF communications link, including:
 executing a state machine that tracks a state of a first EHF communication unit to establish the EHF communications link, the state machine operative to transition through a plurality of states responsive to signals provided by an upstream EHF communication unit, wherein executing the state machine comprises:
  determining whether to transition to a selected one of the plurality of states in response to a signal received by the upstream EHF communication unit;
  transitioning to the selected state when it is determined to transition to the selected state; and
  communicating a signal to a downstream EHF communication unit in response to the state transition.

Paragraph 40: The method of paragraph 39, wherein the first, upstream, and downstream communication units are included as part of a wake up loop.

Paragraph 41: The method of paragraph 40, further including using the wake up loop to transition through the plurality of states.

Paragraph 42: The method of paragraph 39, wherein the signal communicated to the downstream EHF communication unit determines a future state of the state machine.

Paragraph 43: The method of paragraph 39, wherein executing the state machine comprises transitioning to a beacon/listen state when it is determined not to transition to the selected state.

Paragraph 44: The method of paragraph 39, wherein executing the state machine comprises transitioning to a serial interface control mode.

Paragraph 45: The method of paragraph 39, wherein the selected state comprises a link training state.

Paragraph 46: The method of paragraph 45 further including transmitting link training data to the downstream communication unit.

Paragraph 47: The method of paragraph 45 further including:
 receiving link training data from the upstream communication unit; and
 calibrating the first communication unit based on the received link training data.

Paragraph 48: The method of paragraph 39, wherein the selected state comprises a capabilities message state.

Paragraph 49: The method of paragraph 48 further including transmitting capabilities message data to the downstream communication unit.

Paragraph 50: The method of paragraph 48 further including:
 receiving capabilities message data from the upstream communication unit; and
 validating the received capabilities message data.

Paragraph 51: The method of paragraph 39, wherein the selected state comprises a data transport state.

Paragraph 52: The method of paragraph 39 further including:
- determining a data transport mode for use with the communications link;
- contactlessly transporting data according to the data transport mode using an established communications link.

Paragraph 53: The method of paragraph 39 further including:
- periodically activating circuitry to perform one of a beaconing operation and a listening operation.

Paragraph 54: A method for using an extremely high frequency (EHF) communication unit to transmit an EHF beaconing signal, the EHF communication unit including a tinier and circuitry operative to transmit the EHF beaconing signal, the method including:
- activating the timer in response to the EHF communication unit entering a beaconing state, wherein the timer is operative to provide a pulse once a period to periodically wake up the circuitry that transmits the EHF beaconing signal, wherein the pulse has a fixed time duration;
- waking up the circuitry in response to the pulse provided by the timer;
- transmitting, from the circuitry, the EHF beaconing signal for the fixed time duration;
- shutting down the circuitry after the fixed time duration has elapsed; and
- repeating a sequence including the waking up, the transmitting, and the shutting down.

Paragraph 55: The method of paragraph 54, wherein the EHF beaconing signal is an EHF contactless signal including a logic value of HIGH.

Paragraph 56: The method of paragraph 54, wherein the tinier operates according to a selected one of a plurality of different clock speeds, wherein the fixed time duration remains the same regardless of the selected clock speed.

Paragraph 57: The method of paragraph 54, wherein the timer operates according to a selected one of a plurality of different clock speeds, wherein the period changes based on the selected clock speed.

Paragraph 58: The method of paragraph 57, wherein the period is based on a fixed number of clock cycles.

Paragraph 59: The method of paragraph 58, wherein the fixed number of clock cycles is a fraction of a second fixed number of clock cycles that defines a constant listening period of a counterpart EHF communication unit that receives the EHF beaconing signal.

Paragraph 60: The method of paragraph 54, wherein the sequence is repeated until the EHF communication unit is instructed to cease transmitting the beaconing signal.

Paragraph 61: The method of paragraph 54, further including:
- receiving an indication that a counterpart EHF communication unit has received the transmitted EHF beaconing signal; and
- ceasing the transmitting of the EHF beaconing signal in response to the received indication.

Paragraph 62: The method of paragraph 54, further including:
- receiving an indication that a counterpart EHF communication unit has received the transmitted EHF beaconing signal;
- powering on the circuitry and other circuitry in response to the received indication.

Paragraph 63: A method for using an extremely high frequency (EHF) communication unit to listen for an EHF beaconing signal, the EHF communication unit including a timer and circuitry operative to receive the EHF beaconing signal, the method including:
- activating the timer in response to the EHF communication unit entering a listen state, wherein the timer is operative to provide a constant listen pulse once a cycle period to periodically wake up the circuitry that receives EHF signals;
- waking up the circuitry in response to the constant listen pulse provided by the timer;
- determining whether at least one EHF beaconing signal was received during the constant listen pulse;
- shutting down the circuitry if it is determined that no EHF signal was received during the constant listen pulse; and
- repeating a sequence including the waking up, the monitoring, the determining, and the shutting down until the EHF communication unit is instructed to cease monitoring for the EHF beaconing signals.

Paragraph 64: The method of paragraph 63, wherein the EHF beaconing signal is an EHF contactless signal including a logic value of HIGH.

Paragraph 65: The method of paragraph 63, further including:
- transitioning to another state when it is determined that the EHF beaconing signal is received during the constant listen period.

Paragraph 66: The method of paragraph 65, wherein the other state is a link training state.

Paragraph 67: The method of paragraph 63, wherein the timer operates according to a clock speed, wherein the constant listen period is based on a first number of clock cycles and the cycle period is based on a second number of clock cycles, wherein the second number of clock cycles is larger than the first number of clock cycles.

Paragraph 68: The method of paragraph 67, wherein the timer operates according to a selected one of a plurality of different clock speeds, wherein the constant listen period and the cycle period change based on the selected clock speed.

Paragraph 69: The method of paragraph 67, wherein the first number of clock cycles is a multiple of a third number of clock cycles that defines a cycle period of the EHF beaconing signal.

Paragraph 70: The method of paragraph 63, wherein the EHF communication unit transitions from the listen state to an attentive state in response to the constant listen pulse.

Paragraph 71: The method of paragraph 70, wherein the EHF communication unit remains in the attentive state until at least one of the constant listen period ends and it is determined that the EHF beacon signal is received during the constant listen period.

Paragraph 72: The method of paragraph 63, wherein the EHF communication unit cycles through at least two states before re-entering into the listen state.

Paragraph 73: The method of paragraph 63, wherein the at least two states comprise a transmitter/receiver check state and an attentive state.

Paragraph 74: The method of paragraph 73, wherein the received EHF beaconing signal is an unsecured EHF signal.

Paragraph 75: The method of paragraph 63, further including:
- communicating with another EHF communication unit when it is determined that the EHF beaconing signal is received during the constant listen period.

Paragraph 76: The method of paragraph 75, wherein the EHF communication unit communicates with the other EHF communication unit by driving a pin that is coupled to the other EHF communication unit via a wired path.

Paragraph 77: A first apparatus including:
an extremely high frequency (EHF) transceiver; and
control circuitry coupled to the EHF transceiver, the control circuitry operative to:
control establishment of an EHF communications link with a second apparatus by executing a state machine that tracks a state of the first apparatus by transitioning through a plurality of states in response to satisfaction of any one of a plurality of conditions; and
selectively execute one of a beaconing cycle and a listening cycle based on a configuration of the first apparatus, wherein the beaconing cycle is executed if the configuration is a transmitter configuration, and wherein the listening cycle is executed if the configuration is a receiver configuration.

Paragraph 78: The first apparatus of paragraph 77, wherein when the beaconing cycle is selectively executed, the control circuitry is further operative to:
transmit, using the EHF transceiver, an EHF beaconing signal on a periodic basis.

Paragraph 79: The first apparatus of paragraph 78, wherein the control circuitry is further operative to:
monitor a plurality of communication nodes for at least one signal that indicates that one of the conditions has been satisfied; and
cease using the EHF transceiver to transmit the EHF beaconing signal in response to the at least one monitored signal.

Paragraph 80: The first apparatus of paragraph 77, wherein when the listening cycle is selectively executed, the control circuitry is further operative to:
monitor the EHF transceiver on a periodic basis to determine whether an EHF signal has been received.

Paragraph 81: The first apparatus of paragraph 80, wherein the control circuitry is further operative to:
cause the state machine to transition to a new state when the EHF signal is received.

Paragraph 82: The first apparatus of paragraph 80, wherein the control circuitry is further operative to:
provide at least one signal on at least one of a plurality of communication nodes when one of the conditions is satisfied.

Paragraph 83: The first apparatus of paragraph 77, further including a timer that operates according to a clock cycle and provides a pulse once a period to periodically wake up the EHF transceiver.

Paragraph 84: The first apparatus of paragraph 83, wherein when the listening cycle is selectively executed, the pulse spans a first number of clock cycles and the period spans a second number of clock cycles, and wherein when the beaconing cycle is selectively executed, the pulse is held high for a fixed period of time and the period spans a third number of clock cycles, wherein the third number is a fraction of the first number, and wherein the second number is greater than the second number.

Paragraph 85: The first apparatus of paragraph 83, wherein when the beaconing cycle is selectively executed, the control circuitry is further operative to:
wake up the EHF transceiver in response to the pulse provided by the timer;
transmit, from the EHF transceiver, the EHF beaconing signal for a fixed time duration;
shut down the EHF transceiver after the fixed time duration has elapsed; and
repeat a sequence including the wake up, the transmit, and the shut down until the state machine transitions to a new state.

Paragraph 86: The first apparatus of paragraph 83, wherein when the listening cycle is selectively executed, the control circuitry is further operative to:
wake up the circuitry in response to the pulse provided by the timer;
monitor the EHF transceiver for EHF signals being received during the pulse;
determine whether at least one EHF signal was received during the pulse;
shut down the circuitry if it is determined that no EHF signal was received during the pulse; and
repeat a sequence including the wake up, the monitor, the determine, and the shut down.

Paragraph 87: A method for communicating a capabilities message between extremely high frequency (EHF) communication units, the method including:
running a clock that has a clock cycle;
responsive to entering into a capabilities message state, transmitting a repeating stream of messages via an EHF transceiver,
wherein each message comprises a header field and a plurality of message fields, the header field defining a start of each message, and wherein each field is encoded with at least one pulse-width-coded (PWC) symbol that is serialized according to the clock such that one of 1-level EHF signal and a 0-level EHF signal is associated with each clock cycle.

Paragraph 88: The method of paragraph 87, wherein each symbol spans a fixed number of clock cycles, begins with a rising edge, ends with a falling edge, and terminates with a 0-level EHF signal.

Paragraph 89: The method of paragraph 88, wherein a logic 0 symbol comprises between 1 and 3 1-level EHF signals.

Paragraph 90: The method of paragraph 88, wherein a logic 1 symbol comprises between 7 and 11 1-level EHF signals.

Paragraph 91: The method of paragraph 88, where a header symbol comprises between 4 and 6 1-level EHF signals.

Paragraph 92: The method of paragraph 87, wherein the transmitting comprises:
inserting at least one gap cycle in between the repeated messages, wherein a gap cycle is expressed as a 0-level EHF signal.

Paragraph 93: The method of paragraph 87, wherein the header field comprises at least one header symbol.

Paragraph 94: The method of paragraph 87, wherein each message field comprises any combination of logic 0 and logic 1 symbols.

Paragraph 95: The method of paragraph 87, wherein at least one of the message fields is populated with at least one symbol based on a state of at least one of a plurality of pins.

Paragraph 96: The method of paragraph 87, wherein at least one of the message fields is populated with at least one symbol based on data stored within the EHF communication unit.

Paragraph 97: The method of paragraph 87, further including:
obtaining the states of a plurality of pins; determining an operating mode based on the obtained states; and using symbols indicative of the determined operating mode in one of the message fields.

Paragraph 98: The method of paragraph 87, further including:
retrieving message data from storage; and
using symbols indicative of the retrieved message data in one of the message fields.

Paragraph 99: The method of paragraph 87, further including:
receiving an indication that another EHF communication unit has received the message; and
instructing the state machine to transition to a new state in response to the received indication that the other EHF communication unit has received the message.

Paragraph 100: The method of paragraph 87, further including:
instructing the state machine to transition to a beaconing state if no indication is received within a fixed period of time that indicates that another EHF communication unit has received the message.

Paragraph 101: A method for using a first extremely high frequency (EHF) communication unit to validate a capabilities message, the method including:
receiving a counterpart capabilities message via an EHF transceiver from a second EHF communication unit, wherein each message comprises a header field and a plurality of counterpart message fields, the header field defining a start of each message, and the counterpart message fields defining parameters of the counterpart device;
retrieving a local capabilities message from the first EHF communication unit, the local capabilities message including a plurality of local message fields; and
comparing at least one counterpart message field to an equivalent local message field to validate the received counterpart capabilities message.

Paragraph 102: The method of paragraph 101, further including:
determining whether to validate the counterpart message; and
instructing the first EHF communication unit to transition to a new state when it is determined that the counterpart message is validated.

Paragraph 103: The method of paragraph 102, further including:
providing at least one signal on at least one of a plurality of communication nodes when the first EHF communication unit transitions to the new state.

Paragraph 104: The method of paragraph 101, further including:
validating the counterpart message, wherein the validated counterpart message identified a data transport mode; and
configuring the first EHF communication unit to process received EFH signals according to the identified data transport mode.

Paragraph 105: The method of paragraph 101, wherein the at least one counterpart message field and the equivalent local message field are vendor identification fields, the method further including:
rejecting the counterpart capabilities message if the contents of the vendor identification fields are not the same; and
advancing acceptance of the capabilities message if the contents of the vendor identification fields are the same.

Paragraph 106: The method of paragraph 101, wherein the at least one counterpart message field and the equivalent local message field are data transport mode fields, the method further including:
rejecting the counterpart capabilities message if the contents of the data transport mode fields are not validated; and
advancing acceptance of the capabilities message if the contents of the data transport mode fields are validated.

Paragraph 107: The method of paragraph 101, wherein the at least one counterpart message field and the equivalent local message field are data transport mode fields, wherein the counterpart message field includes a counterpart USB mode and the local message field includes a local USB mode, the method further including:
comparing the counterpart USB mode to the local USB mode to determine validity of the counterpart capabilities message.

Paragraph 108: The method of paragraph 101, wherein the at least one counterpart message field and the equivalent local message field are USB code fields, wherein the counterpart message field includes a counterpart USB code and the local message field includes a local USB code, the method further including:
comparing the counterpart USB code to the local USB code; and
performing an action based on the comparison of the USB codes.

Paragraph 109: The method of paragraph 108, wherein performing the action comprises invalidating the counterpart capabilities message.

Paragraph 110: The method of paragraph 108, wherein performing the action comprises validating the counterpart capabilities message.

Paragraph 111: The method of paragraph 108, wherein performing the action comprises:
validating the counterpart capabilities message; and
driving a configuration pin of the EHF communication unit to one of a logic 1 state and a logic 0 state.

Paragraph 112: A first apparatus including:
an extremely high frequency (EHF) transceiver; and
control circuitry coupled to the EHF transceiver, the control circuitry operative to:
control establishment of an EHF communications link with a second apparatus by executing a state machine that tracks a state of the first apparatus by transitioning through a plurality of states in response to satisfaction of any one of a plurality of conditions; and
selectively execute one of a transmission of a capabilities message and a validation of a received capabilities message based on a configuration of the first apparatus, wherein the transmission of the capabilities message is executed if the configuration is a transmitter configuration, and wherein the validation of the received capabilities message is executed if the configuration is a receiver configuration.

Paragraph 113: The first apparatus of paragraph 112, wherein when the transmission of the capabilities message is selected, the control circuitry is operative to:
instruct the EHF transceiver to contactlessly communicate the capabilities message.

Paragraph 114: The first apparatus of paragraph 112, further including a clock that operates according to a clock cycle, wherein when the transmission of the capabilities message is selected, the capabilities message comprises a header field and a plurality of message fields, the header field defining a start of each message, and wherein each field is encoded with at least one pulse-width-coded (PWC) symbol that is serialized according to the clock such that one of 1-level EHF signal and a 0-level EHF signal is associated with each clock cycle.

Paragraph 115: The first apparatus of paragraph 114, wherein each symbol spans a fixed number of clock cycles, begins with a rising edge, ends with a falling edge, and terminates with a 0-level EHF signal.

Paragraph 116: The first apparatus of paragraph 114, further including a plurality of pins, wherein the control circuitry is operative to:
evaluate a state on at least one of the pins to ascertain a data transport mode; and
encode one of the message fields with symbols that identify the data transport mode.

Paragraph 117: The first apparatus of paragraph 114, further including data storage that stores data, wherein the control circuitry is operative to:
access the data storage to obtain the data; and
encode one of the message fields with symbols that correspond to the data.

Paragraph 118: The first apparatus of paragraph 114, wherein the control circuitry is operative to:
identify a USB mode of operation; and
encode one the message fields with symbols that correspond to the identified USB mode of operation.

Paragraph 119: The first apparatus of paragraph 114, wherein the control circuitry is operative to:
instruct the EHF transceiver to transmit the selected one of the 1-level EHF signal and the 0-level EHF signal.

Paragraph 120: The first apparatus of paragraph 114, further including at least one control pin, wherein the control circuitry is operative to:
monitor the at least one control pin for a signal that indicates that one of the conditions has been satisfied; and
cease transmitting the capabilities message in response to the monitored signal.

Paragraph 121: The first apparatus of paragraph 112, wherein when the validation of a received capabilities message is being executed, the control circuitry is operative to:
process the received capabilities message, wherein the received capabilities message comprises a header field and a plurality of received message fields, the header field defining a start of the message, and the received message fields defining parameters of a counterpart EHF communication unit;
retrieve a local capabilities message from the first EHF communication unit, the local capabilities message including a plurality of local message fields; and
comparing at least one received message field to an equivalent local message field to validate the received capabilities message.

Paragraph 122: The first apparatus of paragraph 121, wherein the control circuitry is further operative to:
determine whether to validate the received message; and
instructing the first EHF communication unit to transition to a new state when it is determined that the received message is validated.

Paragraph 123: The first apparatus of paragraph 121, further including a plurality of configuration pins, wherein the control circuitry is operative to:
evaluate a state on each of the configuration pins to ascertain a local data transport mode; and
validate whether the local data transport mode works with a received data transport mode of the received capabilities message.

Paragraph 124: The apparatus of paragraph 123, wherein the control circuitry is operative to:
process data received via the EHF transceiver according to the local data transport mode when it has been validated that it will work with the received data transport mode.

Paragraph 125: The apparatus of paragraph 121, further including a plurality of control pins, wherein the control circuitry is operative to:
assert a signal on at least one of the control pins in response to a determination that the receive capabilities message is validated.

Paragraph 126: An first apparatus including:
an extremely high frequency (EHF) transceiver; and
control circuitry coupled to the first EHF transceiver, the control circuitry operative to:
control establishment of an EHF communications link with a second apparatus by executing a state machine that tracks a state of the first apparatus by transitioning through a plurality of states in response to satisfaction of any one of a plurality of conditions; and
selectively execute one of a transmission of a link training pattern and a calibration of at least one parameter based on a configuration of the first apparatus, wherein the transmission of the link training pattern is executed if the configuration is a transmitter configuration, and wherein the calibration of at least one parameter is executed if the configuration is a receiver configuration.

Paragraph 127: The apparatus of paragraph 126, wherein the link training pattern comprises a repeating pattern of HIGH and LOW bits.

Paragraph 128: The apparatus of paragraph 126, further including a reference signal parameter, wherein when the transmission of the link training pattern is being executed, the control circuitry is operative to:
base an amplitude of the link training pattern on the reference signal parameter.

Paragraph 129: The apparatus of paragraph 128, wherein the reference signal parameter is a reference voltage level derived from a bandgap.

Paragraph 130: The apparatus of paragraph 126, wherein when the transmission of the link training pattern is being executed, the control circuitry is operative to:
selectively map the link training pattern to one a full carrier for a logic 1 state, a partial carrier for a logic 0 state, and no carrier for an idle state.

Paragraph 131: The apparatus of paragraph 130, wherein the partial carrier is a percentage of the full carrier.

Paragraph 132: The apparatus of paragraph 126, wherein when the calibration of at least one parameter is being executed, the control circuitry is operative to:
process a link training pattern received via the EHF transceiver, wherein the received link training pattern comprises a logic 1 state, a logic 0 state, and an idle state, and wherein each state is represented by a different carrier amplitude;
differentiate among the different carrier amplitudes in the processed link training pattern; and
associate each state with one of the different carrier amplitudes.

Paragraph 133: The apparatus of paragraph 126, wherein when the calibration of at least one parameter is being executed, the control circuitry is operative to:
track an amplitude of a received signal envelope; and
calibrate the tracked amplitude to one of a logic 1 state, a logic 0 state, and an idle state.

Paragraph 134: The apparatus of paragraph 126, wherein when the calibration of at least one parameter is being executed, the control circuitry is operative to:
use a slicer to sample received EHF signals, wherein the slicer samples the received EHF signals based on a clock; and
calibrate a phase angle of the clock to optimize sampling of the received EHF signals.

Paragraph 135: A method for using an extremely high frequency (EHF) communication unit to transmit a keep alive signal, the EHF communication unit including a timer and circuitry operative to transmit the keep alive signal, the method including:
activating the timer in response to the EHF communication unit entering an idle state, wherein the timer is operative to provide a pulse once a period to periodically wake up the circuitry that transmits the keep alive signal;
waking up the circuitry in response to the pulse provided by the timer;
transmitting, from the circuitry, the keep alive signal;
shutting down the circuitry; and
repeating a sequence including the waking up, the transmitting, and the shutting down.

Paragraph 136: The method of paragraph 135, further including:
monitoring whether any data is received on an input buffer of the EHF communication unit; and
transitioning to a data transport state in response to a determination that data has been monitored as received on the input buffer.

Paragraph 137: The method of paragraph 136, further including:
powering on the circuitry in response to the transitioning to the data transport state.

Paragraph 138: The method of paragraph 135, further including:
monitoring at least one control pin to determine whether to execute a state change transition;
transitioning to a beacon/listen state in response to a determination to execute a state change determination.

Paragraph 139: The method of paragraph 138, wherein the monitoring comprises monitoring whether a signal on one of the control pins has gone LOW.

Paragraph 140: The method of paragraph 138, wherein the monitoring comprises monitoring whether there has been no activity on one of the control pins for at least a period of time.

Paragraph 141: The method of paragraph 135, wherein the keep alive pulse is operative to prevent a counterpart EHF communication unit from transitioning away from its idle state, wherein counterpart EHF communication unit receives the keep alive pulse via its EHF transceiver.

Paragraph 142: A method for using a first extremely high frequency (EHF) communication unit, the method including:
entering the first EHF communication unit into a power savings state of operation after an extremely high frequency (EHF) communications link has been established with a second EHF communication unit, wherein when the first EHF communication unit is operating in the power saving mode, the method further including:
power cycling EHF transceiver circuitry ON and OFF;
monitoring whether any EHF signals are being received via the EHF transceiver circuitry when the EHF transceiver circuitry is ON; and
determining if received EHF signals are indicative of one of a first pulse and a second pulse,
wherein in determining that the received EHF signals are indicative of the first pulse, transitioning the first EHF communication unit to a first state; and
wherein in determining that the received EHF signals are indicative of the second pulse, instructing the first EHF communication unit to continue operating in the power savings state of operation.

Paragraph 143: The method of paragraph 142, wherein the first state is a data transport state.

Paragraph 144: The method of paragraph 142, wherein the instructing the first EHF communication unit to continue operating in the power savings state of operation comprises:
resetting a time out timer; and
power cycling the EHF transceiver OFF.

Paragraph 145: The method of paragraph 142, wherein when no EHF signals are received when the EHF transceiver is ON, the method further including:
determining whether a time out timer has expired.

Paragraph 146: The method of paragraph 145, further including:
in response to determining that the time out timer has expired, transitioning the EHF communication unit to a second state.

Paragraph 147: The method of paragraph 146, wherein the second state is a beacon/listen state.

Paragraph 148: The method of paragraph 142, wherein the first pulse comprises a burst of logical 1s and 0s that exceeds a first burst length.

Paragraph 149: The method of paragraph 142, wherein the second pulse comprises a burst of logical 1's that falls within a fixed range burst length.

Paragraph 150: A first apparatus including:
an extremely high frequency (EHF) transceiver; and
control circuitry coupled to the EHF transceiver, the control circuitry operative to:
control establishment of an EHF communications link with a second apparatus by executing a state machine that tracks a state of the first apparatus by transitioning through a plurality of states in response to satisfaction of any one of a plurality of conditions;
establish the EHF communication link with the apparatus to selectively enable one of transmission and reception of data;
after the EHF communication link with the apparatus is established, monitor an absence of data being communicated over the EHF communication link; and
enter into a power savings state in response to the monitored absence of data being communicated over the EHF communication link until the state machine transitions to a new state.

Paragraph 151: The first apparatus of paragraph 150, wherein when in the power savings state, the control circuitry is further operative to:
power cycle the EHF transceiver ON and OFF;
monitor whether any EHF signals are being received via the EHF transceiver circuitry when the EHF transceiver circuitry is ON; and
determine if received EHF signals are indicative of one of a first pulse and a second pulse, wherein in determining that the received EHF signals are indicative of the first pulse, transition the EHF commmunication unit to a first state; and wherein in determining that the received EHF signals are indicative of the second pulse, instruct the EHF communication unit to continue operating in the power savings state of operation.

Paragraph 152: The first apparatus of paragraph 151, wherein the first state is a data transport state.

Paragraph 153: The first apparatus of paragraph 151, wherein in response to determining that the received EHF signals are indicative of the second pulse the control circuitry is operative to:

reset a time out timer in response; and
power cycle the EHF transceiver OFF.

Paragraph 154: The first apparatus of paragraph 151, wherein when no EHF signals are received when the EHF transceiver is ON, the control circuitry is operative to:

determine whether a time out timer has expired;
transition the apparatus to a second state in response to the determination that the time out timer has expired.

Paragraph 155: The first apparatus of paragraph 154, wherein the second state is a beacon/listen state.

Paragraph 156: The first apparatus of paragraph 150, wherein when in the power savings state, the control circuitry is further operative to:

activate a timer, wherein the timer is operative to provide a pulse once a period to periodically wake up the EHF transceiver;
wake up the EHF transceiver in response to the pulse provided by the timer; transmit, from the EHF transceiver, the keep alive signal; and
shut down the EHF transceiver.

Paragraph 157: The first apparatus of paragraph 156, wherein the control circuitry is further operative to:

monitor whether any data is received on an input buffer of the EHF communication unit; and
transition to a data transport state in response to a determination that data has been monitored as received on the input buffer.

Paragraph 158: The first apparatus of paragraph 156, wherein when in the power savings state, the control circuitry is further operative to:

monitor at least one control pin to determine whether to execute a state change transition;
transition to a beacon/listen state in response to a determination to execute a state change determination.

Paragraph 159: The first apparatus of paragraph 156, wherein the keep alive pulse is operative to prevent the other apparatus from transitioning away from its power savings state, wherein the second apparatus receives the keep alive pulse via its EHF transceiver.

Paragraph 160: A first contactless communications transceiver unit (CCTU) for use in establishing a contactless communications link with a second CCTU, the first CCTU including:

a transducer for selectively transmitting and receiving extremely high frequency (EHF) contactless signals; and circuitry operative to:
execute a first CCTU state machine that tracks a state of the first CCTU during the establishment of the contactless communications link, wherein the state machine transitions through a plurality of states in response to satisfaction of any one of a plurality of conditions;

for at least one of the plurality of states, instruct the transducer to alternate between transmitting EHF contactless signals to the second CCTU and monitoring for EHF contactless signals transmitted by the second CCTU to determine whether one of the conditions is satisfied.

Paragraph 161: The first CCTU of paragraph 160, wherein the circuitry is operative to:

transmit a EHF signal for a first time period; and
after the first time period expires, monitor for a EHF response signal from the second CCTU for a second time period.

Paragraph 162: The first CCTU of paragraph 161, wherein the EHF signal comprises an EHF beaconing signal.

Paragraph 163: The first CCTU of paragraph 161, wherein the EHF signal comprises a link training signal.

Paragraph 164: The first CCTU of paragraph 161, wherein the EHF signal comprises a capabilities message signal.

Paragraph 165: The first CCTU of paragraph 161, wherein the circuitry is operative to:

receive the EHF response signal during the second time period; and
determine that the received EHF response signal satisfies one of the conditions.

Paragraph 166: The first CCTU of paragraph 160, wherein the circuitry is operative to:

monitor for a EHF signal being transmitted by the second CCTU for a third time period.

Paragraph 167: The first CCTU of paragraph 166, wherein the monitored EHF signal comprises a beaconing EHF signal.

Paragraph 168: The first CCTU of paragraph 166, wherein the monitored EHF signal comprises a link training EHF signal.

Paragraph 169: The first CCTU of paragraph 166, wherein the monitored EHF signal comprises a capabilities message EHF signal.

Paragraph 170: The first CCTU of paragraph 166, wherein the circuitry is operative to;

receive the EHF signal during the third time period;
validate the EHF signal; and
after the third time period expires, transmit an EHF response signal to the second CCTU if the received EHF signal is validated.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A contactless communications receiver unit (CCRU) for use in establishing a contactless communications link with a first contactless communications transmitter unit and for use in communicating with at least a second contactless communications transmitter unit via at least one wired path, wherein the CCRU and the second contactless communications transmitter unit are associated with a first device and wherein the first contactless communications transmitter unit is associated with a second device, the CCRU comprising:
  a plurality of pins, wherein at least a first pin is used to communicate with the second contactless communications transmitter unit via a wired path within the first device;
  a transducer for receiving extremely high frequency (EHF) contactless signals from the first contactless communications transmitter unit located in the second device; and
  circuitry operative to:
    execute a CCRU state machine that tracks a state of the CCRU during the establishment of the contactless communications link, wherein the state machine transitions through a plurality of states in response to signals received by the transducer; and
    selectively drive a signal on the at least one pin used to communicate with the second contactless communications transmitter unit in response to a state transition, wherein the CCRU is part of a wake up loop comprising the CCRU, the first and second contactless transmitter communication units; and a second contactless communications receiver unit, which is associated with the second device, and wherein the CCRU uses the wake up loop to advance state change transitions.

2. The contactless communications receiver unit of claim 1, wherein the plurality of states comprises a link training state, a capabilities message state, and a data transport state.

3. The contactless communications receiver unit of claim 2, wherein the state machine transitions to the link training state when the transducer receives a beacon signal.

4. The contactless communications receiver unit of claim 2, wherein the state machine transitions to the capabilities state after the contactless communications link between the CCRU and the first contactless communications transmitter unit is trained.

5. The contactless communications receiver unit of claim 2, wherein the state machine transitions to the data transport state after a capabilities message is received from the first contactless communications transmitter unit and validated by the CCRU.

6. The contactless communications receiver unit of claim 5, wherein the plurality of states comprise a holdoff state, wherein the state machine transitions from the capabilities message state to the holdoff state before transitioning to data transport state.

7. The contactless communication receiver of claim 2, wherein the plurality of states comprise a data transport idle state, wherein the state machine transitions from the data transport state to the data transport idle state to save power.

8. The contactless communications receiver unit of claim 2, wherein the plurality of states comprise at least one initialization state, and wherein the circuitry is operative to drive a signal on a second pin that is used to communicate with the second transmitter unit in response to state transition from the at least one initialization state to the link training state.

9. The contactless communications receiver unit of claim 2, wherein the data transport mode is a standards based transport mode.

10. The contactless communications receiver unit of claim 1, wherein the plurality of pins comprise at least one transport mode selection pin, wherein the contactless communications link transports data according to a transport mode set by the at least one transport mode selection pin.

11. A contactless communications transmitter unit (CCTU) for use in establishing a contactless communications link with a first contactless communications receiver unit and for use in communicating with a second contactless communications receiver unit via at least one wired path, wherein the CCTU and the second contactless communications receiver unit are associated with a first device and wherein the first contactless communications receiver unit is associated with a second device, the CCTU comprising:
  a plurality of pins, wherein at least one pin is used to communicate with the second contactless communications receiver unit via a wired path within the first device;
  a transducer for transmitting extremely high frequency (EHF) contactless signals to the first contactless communications receiver unit;
  circuitry operative to:
    execute a CCTU state machine that tracks a state of the CCTU during the establishment of the contactless communications link, wherein the state machine transitions through a plurality of states in response to signals received by the at least one pin; and
    selectively transmit EHF signals, using the transducer, in response to a state transition, wherein the CCTU is part of a wake up loop comprising at least the first and second receiver units, the CCTU, and a second transmitter unit, which is associated with the second device, and wherein the CCTU state machine uses the wake up loop to advance state change transitions.

12. The contactless communication transmitter unit of claim 11, wherein the at least one pin is used to communicate with the second receiver unit via the wired path is an inter chip communications pin.

13. The contactless communication transmitter unit of claim 12, wherein the inter chip communications pin receives a signal that causes the state machine to transition to a new state.

14. The contactless communications transmitter unit of claim 11, wherein the selectively transmitted EHF signal determines a future state of the state machine.

15. The contactless communications transmitter unit of claim 11 wherein a signal received by the at least one pin is derived from a state change transition in the CCTU state machine.

16. The contactless communication transmitter unit of claim 11, wherein the plurality of states comprises at least one initialization state, wherein one of the plurality of pins is a beacon enable pin, and wherein when the beacon enable pin is driven HIGH, the state machine transitions to the at least one initialization state.

17. The contactless communication transmitter unit of claim 16, wherein when the beacon enable pin is driven LOW, the state machine transitions to an OFF state.

18. The contactless communication transmitter unit of claim 16, wherein the at least one initialization state comprises a beaconing state that causes the circuitry to emit a beaconing EHF signal via the transducer.

19. The contactless communication transmitter unit of claim 11, wherein the plurality of states comprises a link training state, a capabilities message state, and a data transport state.

20. The contactless communications transmitter unit of claim 19, wherein the data transport mode is a standards based transport mode.

21. A method for establishing an EHF communications link among at least four EHF communications units, comprising:
executing a state machine that tracks a state of a first EHF communication unit of the at least four EHF communications units to establish the EHF communications link, the state machine operative to transition through a plurality of states responsive to signals provided by an upstream EHF communication unit, wherein executing the state machine comprises:
determining whether to transition to a selected one of the plurality of states in response to a signal received by the upstream EHF communication unit;
transitioning to the selected state when it is determined to transition to the selected state; and
communicating a signal to a downstream EHF communication unit in response to the state transition, wherein the upstream and downstream EHF communication units are included in the at least four EHF communications units, and wherein the first EFH communication unit, the upstream communications unit, the downstream communication unit, and a fourth EHF communications unit are included as part of a wake up loop that is used by the state machine to transition through the plurality of states.

22. The method of claim 21, wherein the signal communicated to the downstream EHF communication unit determines a future state of the state machine.

23. The method of claim 21, wherein executing the state machine comprises transitioning to a beacon/listen state when it is determined not to transition to the selected state.

24. The method of claim 21, wherein executing the state machine comprises transitioning to a serial interface control mode.

25. The method of claim 21, wherein the selected state comprises a link training state.

26. The method of claim 25 further comprising transmitting link training data to the downstream communication unit.

27. The method of claim 25 further comprising:
receiving link training data from the upstream communication unit; and
calibrating the first communication unit based on the received link training data.

28. The method of claim 21, wherein the selected state comprises a capabilities message state.

29. The method of claim 28 further comprising transmitting capabilities message data to the downstream communication unit.

30. The method of claim 28 further comprising:
receiving capabilities message data from the upstream communication unit; and
validating the received capabilities message data.

31. The method of claim 21, wherein the selected state comprises a data transport state.

32. The method of claim 31, wherein the data transport mode is a standards based transport mode.

33. The method of claim 21 further comprising:
determining a data transport mode for use with the communications link;
contactlessly transporting data according to the data transport mode using an established communications link.

34. The method of claim 21 further comprising:
periodically activating circuitry to perform one of a beaconing operation and a listening operation.

* * * * *

UNITED STATES PATENT AND TRADEMARK OFFICE
CERTIFICATE OF CORRECTION

PATENT NO. : 9,888,507 B2  Page 1 of 2
APPLICATION NO. : 14/209988
DATED : February 6, 2018
INVENTOR(S) : Kyles et al.

It is certified that error appears in the above-identified patent and that said Letters Patent is hereby corrected as shown below:

On the Title Page

In Column 1, Item (71), in 'Applicant', delete "Inc." and insert -- Inc., Campbell, CA (US) --, therefor.

In the Drawings

On Sheet 17 of 32, for Box "1804", Line 2, delete "vender" and insert -- vendor --, therefor.

On Sheet 19 of 32, for Action "1", delete "Capabilties" and insert -- Capabilities --, therefor.

On Sheet 19 of 32, for Action "6", delete "Capabilties" and insert -- Capabilities --, therefor.

On Sheet 19 of 32, for Action "16", delete "Capabilties" and insert -- Capabilities --, therefor.

On Sheet 26 of 32, for Box "3010", Line 2, delete "EMF" and insert -- EHF --, therefor.

In the Specification

In Column 4, Line 63, delete "fill" and insert -- full --, therefor.

In Column 6, Lines 47-48, delete "embodiment." and insert -- embodiment; --, therefor.

In Column 26, Line 39, delete "it CP6" and insert -- its CP6 --, therefor.

In Column 31, Line 36, delete "tinier" and insert -- timer --, therefor.

In Column 31, Line 37, delete "tinier" and insert -- timer --, therefor.

In Column 31, Line 39, delete "tinier" and insert -- timer --, therefor.

Signed and Sealed this
Twelfth Day of May, 2020

Andrei Iancu
*Director of the United States Patent and Trademark Office*

CERTIFICATE OF CORRECTION (continued)
U.S. Pat. No. 9,888,507 B2

In Column 32, Line 8, delete "tinier" and insert -- timer --, therefor.

In Column 32, Line 9, delete "tinier" and insert -- timer --, therefor.

In Column 32, Line 11, delete "tinier" and insert -- timer --, therefor.

In Column 37, Line 36, delete "it own" and insert -- its own --, therefor.

In Column 47, Line 17, delete "tinier" and insert -- timer --, therefor.

In Column 47, Line 37, delete "tinier" and insert -- timer --, therefor.

In Column 51, Line 57, delete "EFH" and insert -- EHF --, therefor.

In the Claims

In Column 59, Claim 1, Line 34, delete "units;" and insert -- units, --, therefor.

In Column 59, Claim 7, Line 60, delete "receiver" and insert -- receiver unit --, therefor.

In Column 60, Claim 9, Line 5, delete "mode" and insert -- state --, therefor.

In Column 60, Claim 15, Line 54, delete "11" and insert -- 11, --, therefor.

In Column 61, Claim 20, Line 8, delete "mode" and insert -- state --, therefor.

In Column 61, Claim 21, Line 31, delete "EFH" and insert -- EHF --, therefor.

In Column 62, Claim 32, Line 29, delete "mode" and insert -- state --, therefor.